United States Patent
Patel et al.

(10) Patent No.: US 9,547,859 B2
(45) Date of Patent: Jan. 17, 2017

(54) METHOD AND SYSTEM FOR PERFORMING MOBILE DEVICE-TO-MACHINE PAYMENTS

(71) Applicant: PayRange Inc., Portland, OR (US)

(72) Inventors: Paresh K. Patel, Portland, OR (US); Chau M. Doan, Beaverton, OR (US)

(73) Assignee: PAYRANGE INC., Portland, OR (US)

( * ) Notice: Subject to any disclaimer, the term of this patent is extended or adjusted under 35 U.S.C. 154(b) by 0 days.

(21) Appl. No.: 14/335,762

(22) Filed: Jul. 18, 2014

(65) Prior Publication Data

US 2015/0227928 A1 Aug. 13, 2015

Related U.S. Application Data

(63) Continuation of application No. 14/214,644, filed on Mar. 14, 2014, now Pat. No. 8,856,045, and a
(Continued)

(51) Int. Cl.
*G06Q 99/00* (2006.01)
*G06Q 20/38* (2012.01)
(Continued)

(52) U.S. Cl.
CPC .......... *G06Q 20/3821* (2013.01); *G06Q 20/18* (2013.01); *G06Q 20/32* (2013.01);
(Continued)

(58) Field of Classification Search
CPC .. G06Q 20/40; G06Q 20/327; G06Q 20/3823; G06Q 20/3829
(Continued)

(56) References Cited

U.S. PATENT DOCUMENTS 5,844,808 A * 12/1998 Konsmo et al. ............. 700/244
5,880,733 A    3/1999 Horvitz et al.
(Continued)

FOREIGN PATENT DOCUMENTS

WO   WO2007/015610 A1   2/2007
WO   WO2008/083022 A1   7/2008
(Continued)

OTHER PUBLICATIONS

Bing, Bing Images Search: "dongle", http://www.bing.com/images/search?q=dongle&FORM+HDRSC2, Dec. 5, 2013, 2 pgs.
(Continued)

*Primary Examiner* — James D Nigh
(74) *Attorney, Agent, or Firm* — Morgan, Lewis & Bockius LLP

(57) ABSTRACT

A device with one or more processors, memory, and two or more communication capabilities obtains, from a payment module, an authorization request via a first communication capability (e.g., Bluetooth). The device sends, to a server, the authorization request via a second communication capability distinct from the first communication capability (e.g., cellular or WiFi technology). In response to sending the authorization request, the device obtains, from the server, authorization information via the second communication capability. After obtaining the authorization information, the device detects a trigger condition to perform a transaction with a payment accepting unit associated with the payment module. In response to detecting the trigger condition, the device sends, to the payment module, at least a portion of the authorization information via the first communication capability.

27 Claims, 44 Drawing Sheets

Related U.S. Application Data continuation-in-part of application No. 29/477,025, filed on Dec. 18, 2013.

(60) Provisional application No. 61/917,936, filed on Dec. 18, 2013.

(51) Int. Cl.
- *G06Q 20/40* (2012.01)
- *G06Q 20/32* (2012.01)
- *G06Q 20/18* (2012.01)
- *G06Q 20/36* (2012.01)
- *G06Q 30/06* (2012.01)

(52) U.S. Cl.
CPC ......... *G06Q 20/322* (2013.01); *G06Q 20/327* (2013.01); *G06Q 20/3278* (2013.01); *G06Q 20/36* (2013.01); *G06Q 20/38* (2013.01); *G06Q 20/3829* (2013.01); *G06Q 20/40* (2013.01); *G06Q 20/401* (2013.01); *G06Q 30/06* (2013.01); *G06Q 20/3823* (2013.01)

(58) Field of Classification Search
USPC .................................. 705/64, 71, 76, 79
See application file for complete search history.

(56) References Cited

U.S. PATENT DOCUMENTS

| | | | |
|---|---|---|---|
| 5,892,900 A | | 4/1999 | Ginter et al. |
| D412,154 S | | 7/1999 | Lok |
| D416,230 S | | 11/1999 | Narumo et al. |
| D461,476 S | | 8/2002 | Evers et al. |
| 6,462,644 B1 | * | 10/2002 | Howell et al. ............... 340/5.92 |
| D467,935 S | | 12/2002 | Coleman |
| D474,154 S | | 5/2003 | Lai |
| 6,584,309 B1 | * | 6/2003 | Whigham .................. 455/414.1 |
| D496,370 S | | 9/2004 | Gildred |
| 6,793,134 B2 | | 9/2004 | Clark |
| 6,810,234 B1 | | 10/2004 | Rasanen et al. |
| D519,465 S | | 4/2006 | Sirichai et al. |
| 7,085,556 B2 | * | 8/2006 | Offer ........................... 455/414.1 |
| 7,127,236 B2 | * | 10/2006 | Khan et al. ................. 455/414.1 |
| D547,761 S | | 7/2007 | Hui |
| D578,135 S | | 10/2008 | Nathan et al. |
| 7,455,223 B1 | | 11/2008 | Wilson et al. |
| 7,464,867 B1 | | 12/2008 | Kolls |
| D594,024 S | | 6/2009 | King |
| D599,806 S | | 9/2009 | Brown et al. |
| D601,142 S | | 9/2009 | Lindley |
| 7,672,680 B1 | | 3/2010 | Lee et al. |
| D613,300 S | | 4/2010 | Chaudhri |
| D614,640 S | | 4/2010 | Viegers et al. |
| 7,721,958 B2 | * | 5/2010 | Belfer et al. ................. 235/381 |
| 7,848,980 B2 | * | 12/2010 | Carlson ........................... 705/35 |
| D631,060 S | | 1/2011 | Flik et al. |
| D638,853 S | | 5/2011 | Brinda |
| D640,282 S | | 6/2011 | Woo et al. |
| D640,284 S | | 6/2011 | Woo et al. |
| D644,240 S | | 8/2011 | Arnold et al. |
| D651,608 S | | 1/2012 | Allen et al. |
| D651,609 S | | 1/2012 | Pearson et al. |
| D656,947 S | | 4/2012 | Vance et al. |
| D658,667 S | | 5/2012 | Cho et al. |
| D662,508 S | | 6/2012 | Kim |
| D662,942 S | | 7/2012 | Trabona et al. |
| D664,988 S | | 8/2012 | Gleasman et al. |
| D669,899 S | * | 10/2012 | Cheng ....................... D14/435.1 |
| 8,346,670 B2 | * | 1/2013 | Hasson et al. ................. 705/75 |
| 8,356,754 B2 | * | 1/2013 | Johnson et al. ............ 235/472.01 |
| 8,376,227 B2 | * | 2/2013 | Hammad et al. ............ 235/384 |
| 8,396,589 B2 | * | 3/2013 | Katzenstein Garibaldi et al. ............ 700/232 |
| D681,050 S | | 4/2013 | Ray et al. |
| 8,412,626 B2 | | 4/2013 | Hirson et al. |
| D681,660 S | | 5/2013 | Matas |
| 8,438,066 B1 | | 5/2013 | Yuen |
| D687,056 S | | 7/2013 | Matas et al. |
| 8,479,190 B2 | | 7/2013 | Sueyoshi et al. |
| 8,489,140 B2 | * | 7/2013 | Weiner et al. ............. 455/550.1 |
| 8,517,766 B2 | * | 8/2013 | Golko et al. .............. 439/607.41 |
| D691,140 S | | 10/2013 | Huang |
| D692,456 S | | 10/2013 | Brinda et al. |
| 8,548,426 B2 | | 10/2013 | Smith |
| 8,583,496 B2 | | 11/2013 | Yoo et al. |
| D695,305 S | | 12/2013 | Bhatia et al. |
| 8,596,528 B2 | * | 12/2013 | Fernandes et al. ........... 235/380 |
| 8,600,899 B1 | | 12/2013 | Davis |
| 8,615,445 B2 | * | 12/2013 | Dorsey et al. ............... 705/26.1 |
| 8,645,971 B2 | * | 2/2014 | Carlson .................. G06Q 20/10 705/17 |
| D701,527 S | | 3/2014 | Brinda et al. |
| 8,700,530 B2 | | 4/2014 | Smith |
| 8,707,276 B2 | | 4/2014 | Hill et al. |
| 8,712,893 B1 | | 4/2014 | Brandmaier et al. |
| D705,244 S | | 5/2014 | Arnold et al. |
| D706,802 S | | 6/2014 | Myung et al. |
| D707,234 S | | 6/2014 | Tan |
| 8,769,643 B1 | * | 7/2014 | Ben Ayed ......................... 726/5 |
| 8,810,430 B2 | | 8/2014 | Proud |
| 8,819,659 B2 | | 8/2014 | Ramer et al. |
| 8,838,481 B2 | * | 9/2014 | Moshfeghi ...................... 705/16 |
| 8,850,421 B2 | | 9/2014 | Proud |
| D716,339 S | | 10/2014 | Lee |
| 8,856,045 B1 | | 10/2014 | Patel et al. |
| D717,747 S | | 11/2014 | Nishimoto et al. |
| 8,898,620 B2 | | 11/2014 | Eizenman et al. |
| D720,765 S | | 1/2015 | Xie et al. |
| D721,374 S | | 1/2015 | Liu |
| D724,603 S | | 3/2015 | Williams et al. |
| D726,736 S | | 4/2015 | Smirin et al. |
| D726,757 S | | 4/2015 | Angelides |
| D727,337 S | | 4/2015 | Kim et al. |
| D727,341 S | | 4/2015 | Park |
| 9,001,047 B2 | | 4/2015 | Forstall et al. |
| 9,037,492 B2 | | 5/2015 | White |
| D730,904 S | | 6/2015 | Liu |
| D735,236 S | | 7/2015 | Keavney et al. |
| D735,751 S | | 8/2015 | Hwang et al. |
| D736,248 S | | 8/2015 | Chen et al. |
| D741,897 S | | 10/2015 | Wilkinson et al. |
| 9,210,247 B2 | | 12/2015 | Vance et al. |
| D746,866 S | | 1/2016 | Memoria et al. |
| D748,113 S | | 1/2016 | Gray |
| D755,183 S | | 5/2016 | Patel |
| 2002/0164953 A1 | | 11/2002 | Curtis |
| 2003/0110097 A1 | | 6/2003 | Lei |
| 2003/0158891 A1 | | 8/2003 | Lei et al. |
| 2004/0049454 A1 | * | 3/2004 | Kanno et al. .................... 705/39 |
| 2004/0117262 A1 | * | 6/2004 | Berger ................... G06Q 20/00 705/16 |
| 2005/0101295 A1 | | 5/2005 | Rupp et al. |
| 2005/0177798 A1 | | 8/2005 | Thomson et al. |
| 2005/0181804 A1 | | 8/2005 | Misikangas et al. |
| 2005/0232421 A1 | | 10/2005 | Simons et al. |
| 2006/0052157 A1 | | 3/2006 | Walker et al. |
| 2006/0123335 A1 | | 6/2006 | Sanchez et al. |
| 2007/0050083 A1 | | 3/2007 | Signorelli et al. |
| 2007/0187491 A1 | | 8/2007 | Godwin et al. |
| 2008/0033880 A1 | * | 2/2008 | Fiebiger et al. ................. 705/44 |
| 2008/0126213 A1 | | 5/2008 | Robertson et al. |
| 2008/0141033 A1 | | 6/2008 | Ginter et al. |
| 2008/0154727 A1 | * | 6/2008 | Carlson ............................ 705/14 |
| 2008/0154735 A1 | * | 6/2008 | Carlson ............................ 705/16 |
| 2008/0163257 A1 | * | 7/2008 | Carlson et al. ............... 719/318 |
| 2008/0167991 A1 | * | 7/2008 | Carlson et al. ................. 705/50 |
| 2008/0183480 A1 | * | 7/2008 | Carlson et al. ................... 705/1 |
| 2008/0201226 A1 | * | 8/2008 | Carlson et al. ................. 705/14 |
| 2008/0208762 A1 | * | 8/2008 | Arthur et al. ................... 705/79 |
| 2008/0254853 A1 | | 10/2008 | Wright et al. |
| 2008/0255947 A1 | * | 10/2008 | Friedman ........................ 705/14 |
| 2008/0319913 A1 | * | 12/2008 | Wiechers ............ G06Q 20/367 705/67 |
| 2009/0037284 A1 | | 2/2009 | Lewis et al. |

(56) References Cited

U.S. PATENT DOCUMENTS

| | | | |
|---|---|---|---|
| 2009/0099961 A1* | 4/2009 | Ogilvy | 705/39 |
| 2009/0119190 A1* | 5/2009 | Realini | 705/30 |
| 2009/0171682 A1 | 7/2009 | Dixon et al. | |
| 2009/0306818 A1 | 12/2009 | Slagley et al. | |
| 2009/0313132 A1 | 12/2009 | McKenna et al. | |
| 2009/0327089 A1 | 12/2009 | Kanno et al. | |
| 2010/0094456 A1 | 4/2010 | Simpkins et al. | |
| 2011/0040686 A1 | 2/2011 | Carlson | |
| 2011/0153436 A1* | 6/2011 | Krampe | 705/16 |
| 2011/0153442 A1* | 6/2011 | Krampe | 705/21 |
| 2011/0251910 A1* | 10/2011 | Dimmick | 705/17 |
| 2011/0276636 A1 | 11/2011 | Cheng et al. | |
| 2011/0289023 A1 | 11/2011 | Forster et al. | |
| 2012/0011024 A1* | 1/2012 | Dorsey et al. | 705/26.41 |
| 2012/0016731 A1 | 1/2012 | Smith et al. | |
| 2012/0029691 A1 | 2/2012 | Mockus et al. | |
| 2012/0036045 A1 | 2/2012 | Lowe et al. | |
| 2012/0078735 A1* | 3/2012 | Bauer et al. | 705/16 |
| 2012/0158172 A1 | 6/2012 | Wencslao | |
| 2012/0197740 A1 | 8/2012 | Grigg et al. | |
| 2012/0231844 A1* | 9/2012 | Coppinger | 455/558 |
| 2012/0246074 A1 | 9/2012 | Annamalai et al. | |
| 2012/0254631 A1 | 10/2012 | Skillman et al. | |
| 2012/0276845 A1* | 11/2012 | Wikander | 455/41.1 |
| 2012/0290472 A1 | 11/2012 | Mullen et al. | |
| 2012/0296826 A1 | 11/2012 | Bergdale et al. | |
| 2012/0303528 A1* | 11/2012 | Weiner et al. | 705/44 |
| 2012/0316963 A1 | 12/2012 | Moshfeghi | |
| 2013/0030931 A1* | 1/2013 | Moshfeghi | 705/16 |
| 2013/0054395 A1 | 2/2013 | Cyr et al. | |
| 2013/0067365 A1 | 3/2013 | Shrufi et al. | |
| 2013/0085835 A1 | 4/2013 | Horowitz | |
| 2013/0110296 A1 | 5/2013 | Khoo et al. | |
| 2013/0117738 A1 | 5/2013 | Livingston et al. | |
| 2013/0124289 A1* | 5/2013 | Fisher | 705/14.23 |
| 2013/0143498 A1 | 6/2013 | Niemi | |
| 2013/0166448 A1 | 6/2013 | Narayanan | |
| 2013/0185150 A1 | 7/2013 | Crum | |
| 2013/0217333 A1 | 8/2013 | Sprigg et al. | |
| 2013/0246171 A1 | 9/2013 | Carapelli | |
| 2013/0246364 A1 | 9/2013 | Bhavith | |
| 2013/0267121 A1* | 10/2013 | Hsu | 439/625 |
| 2013/0267176 A1 | 10/2013 | Hertel et al. | |
| 2013/0278622 A1 | 10/2013 | Sun et al. | |
| 2013/0297422 A1 | 11/2013 | Hunter et al. | |
| 2013/0311379 A1 | 11/2013 | Smith | |
| 2013/0311382 A1 | 11/2013 | Fosmark et al. | |
| 2013/0332293 A1 | 12/2013 | Ran | |
| 2013/0346305 A1 | 12/2013 | Mendes | |
| 2014/0019367 A1 | 1/2014 | Khan et al. | |
| 2014/0040028 A1* | 2/2014 | King et al. | 705/14.53 |
| 2014/0040117 A1* | 2/2014 | Jain | 705/39 |
| 2014/0064116 A1* | 3/2014 | Linde | H04W 4/021 370/252 |
| 2014/0067542 A1 | 3/2014 | Everingham | |
| 2014/0074714 A1 | 3/2014 | Melone et al. | |
| 2014/0074723 A1* | 3/2014 | Kamat | G06Q 20/20 705/71 |
| 2014/0100977 A1 | 4/2014 | Davis | |
| 2014/0122298 A1 | 5/2014 | Oyer | |
| 2014/0136301 A1 | 5/2014 | Valdes | |
| 2014/0136411 A1 | 5/2014 | Cho et al. | |
| 2014/0180852 A1* | 6/2014 | Kamat | 705/16 |
| 2014/0201066 A1 | 7/2014 | Roux et al. | |
| 2014/0249995 A1 | 9/2014 | Ogilvy | |
| 2014/0279101 A1 | 9/2014 | Duplan et al. | |
| 2014/0317611 A1 | 10/2014 | Wojcik et al. | |
| 2014/0361872 A1 | 12/2014 | Garcia et al. | |
| 2014/0378057 A1 | 12/2014 | Ramon et al. | |
| 2015/0073980 A1 | 3/2015 | Griffin et al. | |
| 2015/0081462 A1 | 3/2015 | Ozvat et al. | |
| 2015/0088698 A1 | 3/2015 | Ackerman | |
| 2015/0100152 A1 | 4/2015 | Barrag n Trevi o et al. | |
| 2015/0105901 A1 | 4/2015 | Joshi et al. | |
| 2015/0149992 A1 | 5/2015 | Wade et al. | |
| 2015/0154579 A1 | 6/2015 | Teicher | |
| 2015/0235202 A1 | 8/2015 | Zabala | |
| 2015/0346994 A1 | 12/2015 | Chanyontpatanakul | |
| 2016/0019604 A1 | 1/2016 | Kobayashi et al. | |

FOREIGN PATENT DOCUMENTS

| | | |
|---|---|---|
| WO | WO2008/083025 A2 | 7/2008 |
| WO | WO2008/083078 A2 | 7/2008 |
| WO | WO2008/083089 A1 | 7/2008 |
| WO | WO2008/083105 A2 | 7/2008 |
| WO | WO2008/083115 A1 | 7/2008 |
| WO | WO2008/083119 A1 | 7/2008 |
| WO | WO 2013/132995 A1 | 9/2013 |
| WO | WO2013/177416 A2 | 11/2013 |

OTHER PUBLICATIONS

Google, Chromecast, htttp://www.google.com/intl/devices/chromecast/, Dec. 12, 2013, 4 pgs.

Madlmayr et al., "Near Field Communication Based Mobile Payment System," Austrian Research Funding Agency, Project 811408, Mar. 6, 2008, 13 pgs.

Patel, Office Action U.S. Appl. No. 14/320,534, dated Oct. 29, 2014, 18 pgs.

Patel, Office Action U.S. Appl. No. 14/321,717, dated Dec. 19, 2014, 16 pgs.

Patel, Office Action U.S. Appl. No. 14/456,683, dated Jan. 2, 2015, 10 pgs.

Patel, Office Action U.S. Appl. No. 14/458,199, dated Jan. 5, 2015, 7 pgs.

U.S. Appl. No. 60/871,898, Value Based Offers, inventor Mark Carlson, filed Dec. 26, 2006. US Patent and Trademark Office, 169 pgs.

Kadambi, Near-Field Communication-based Secure Mobile Payment Service, Aug. 2009, 10 pgs.

Patel, Final Office Action U.S. Appl. No. 14/320,534, dated Apr. 16, 2015, 21 pgs.

Patel, Final Office Action U.S. Appl. No. 14/321,717, dated Jun. 18, 2015, 22 pgs.

Patel, Final Office Action U.S. Appl. No. 14/456,683, dated Jun. 8, 2015, 14 pgs.

Patel, Final Office Action U.S. Appl. No. 14/458,199, dated Jun. 24, 2015, 8 pgs.

Balan et al., mFerio: the design and evalution of a peer-to-peer mobile payment system, Jun. 2009, 14 pgs.

Balfe et al., e-EMV: emulating EMV for internet payments with trusted computing Technologies, Oct. 2008, 12 pgs.

Patel, Final Office Action U.S. Appl. No. 14/321,733, dated Nov. 14, 2014, 11 pgs.

Patel, Office Action U.S. Appl. No. 14/321,733, dated Aug. 21, 2014, 9 pgs.

Patel, Notice of Allowance, U.S. Appl. No. 14/321,733, dated Feb. 27, 2015, 9 pgs.

Patel, Office Action U.S. Appl. No. 14/456,192, dated Jan. 30, 2015.

Patel, Office Action U.S. Appl. No. 14/321,724, dated May 15, 2015, 19 pgs.

Patel, Office Action U.S. Appl. No. 14/641,236, dated May 29, 2015, 10 pgs.

Patel, Office Action U.S. Appl. No. 14/614,336, dated May 27, 2015, 17 pgs.

PayRange, Inc., International Search Report and Written Opinion, PCT/US2014/071284, Mar. 25, 2015, 9 pgs.

Patel, Office Action U.S. Appl. No. 14/458,199, dated Mar. 28, 2016, 8 pgs.

Patel, Quayle Office Action U.S. Appl. No. 29/524,725, dated Mar. 30, 2016, 7 pgs.

Patel, Notice of Allowance, U.S. Appl. No. 29/524,726, Mar. 29, 2016, 10 pgs.

Patel, Office Action, U.S. Appl. No. 29/524,727, dated Apr. 1, 2016, 7 pgs.

PayRange, Office Action, CA164958, Feb. 5, 2016, 4 pgs.

PayRange Office Action, CA164959, Feb. 5, 2016, 1 pg.

(56) References Cited

OTHER PUBLICATIONS

Square Mobile Credit Card Processing for iPhone, iPod, iPad, posted at youtube.com, posting date Apr. 30, 2011, © 2016 YouTube, LLC, [online], [site visited Mar. 2, 2016]. Available from internet, <URL: https://www.youtube.com/watch?v=v6sKb3CFSKw>.
Patel, Final Office Action U.S. Appl. No. 14/320,534, dated Apr. 8, 2016, 21 pgs.
Patel, Notice of Allowance, U.S. Appl. No. 29/524,730, dated Apr. 6, 2016, 8 pgs.
PayRange Office Action, CA164960, Feb. 5, 2016, 6 pgs.
PayRange Office Action, CA164961, Feb. 5, 2016, 4 pgs.
PayRange Office Action, CA164962, Feb. 5, 2016, 3 pgs.
Patel, Office Action U.S. Appl. No. 29/477,025, dated Aug. 14, 2015, 5 pgs.
Patel, Final Office Action U.S. Appl. No. 14/456,192, dated Sep. 16, 2015, 26 pgs.
Patel, Notice of Allowance, U.S. Appl. No. 14/456,683, dated Oct. 8, 2015, 15 pgs.
Patel, Final Office Action U.S. Appl. No. 14/321,724, dated Oct. 8, 2015, 19 pgs.
Patel, Final Office Action U.S. Appl. No. 14/641,236, dated Mar. 11, 2016, 16 pgs.
Patel, Notice of Allowance, U.S. Appl. No. 29/524,728, dated Mar. 23, 2016, 8 pgs.
PayRange New Product Launch, posted at youtube.com, posting date Jun. 27, 2015, © 2016 YouTube, LLC, [online], [site visited Mar. 2, 2016]. Available from Internet, <URL1: https://www.youtube.com/watch?v=NTvvV03XFeg.
Smart Vending Machine Demo at TechCrunch Disrupt 2013, posted at youtube.com, posting date Dec. 3, 2013, © 2016 YouTube, Llc, [online], [site visited Mar. 2, 2016]. Available from internet URL: https://www.youtube.com/watch?v=XEz1H-gxLj8>.
Patel, Notice of Allowance, U.S. Appl. No. 29/477,025, dated Dec. 16, 2015, 7 pgs.
PayRange Office Action, JP2015-023452, Jul. 8, 2016, 5 pgs.
PayRange Office Action, JP2015-023453, Jul. 8, 2016, 5 pgs.
PayRange Office Action, JP2015-023454, Jul. 8, 2016, 5 pgs.
PayRange Office Action, J2015-023455, Jul. 8, 2016, 5 pgs.
PayRange Office Action, JP2015-023456, Jul. 8, 2016, 5 pgs.
PayRange, Inc., International Preliminary PCT/US2014/071284, Jun. 21, 2016, 6 pgs.
Patel, Notice of Allowance, U.S. Appl. No. 29/557,541, Jul. 27, 2016, 6 pgs.
PayRange, Examination Report No. 1, AU201515576, Jun. 28, 2016, Received Aug. 3, 2016, 8 pgs.
PayRange, Examination Report No. 1, AU201515578, May 6, 2016, Received Aug. 9, 2016, 3 pgs.
PayRange, Examination Report No. 1, AU201515579, May 6, 2016, Received Aug. 3, 2016, 3 pgs.
PayRange, Communication Pursuant to Rules 161(1) and 162, EP14828617.2, Sep. 21, 2016, 2 pgs.
PayRange, Inc., International Search Report and Written Opinion, PCT/US2016/015763, Aug. 4, 2016, 9 pgs.

* cited by examiner

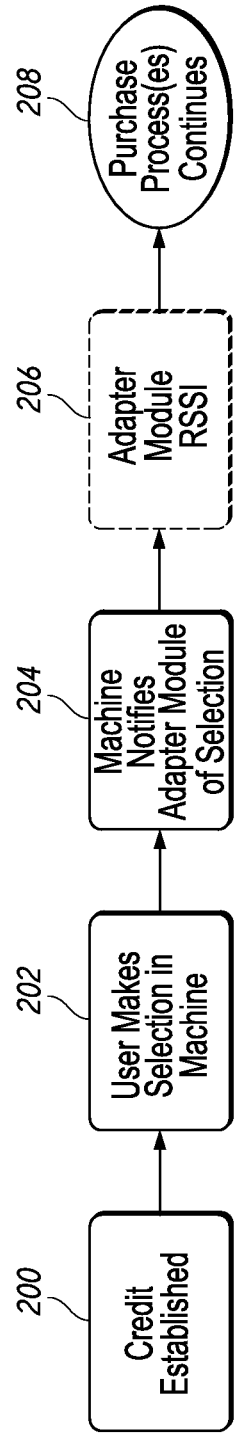

| Tab | Favorite? | Alert | View to User |
|---|---|---|---|
| All | Yes | No | User can make Hands-free Credit with the connected vending machine |
| All | No | Yes | User needs to launch Mobile Device and then swipe to make transaction manually |
| Favorite | Yes | No | Hands-free transction will be available to the user via vending machine |
| Favorite | No | No | User is not alerted for the vending machine which is not a favorite machine. Hands-free mode will not work, manual swipe for transaction required by user. |
| Either All or Favorite | Yes | Yes | BUT Hands-free Credit is not available (disabled by module, expired AuthGrant, insufficient balance, or other issue), then user will get an alert so that user can swipe credit manually. |

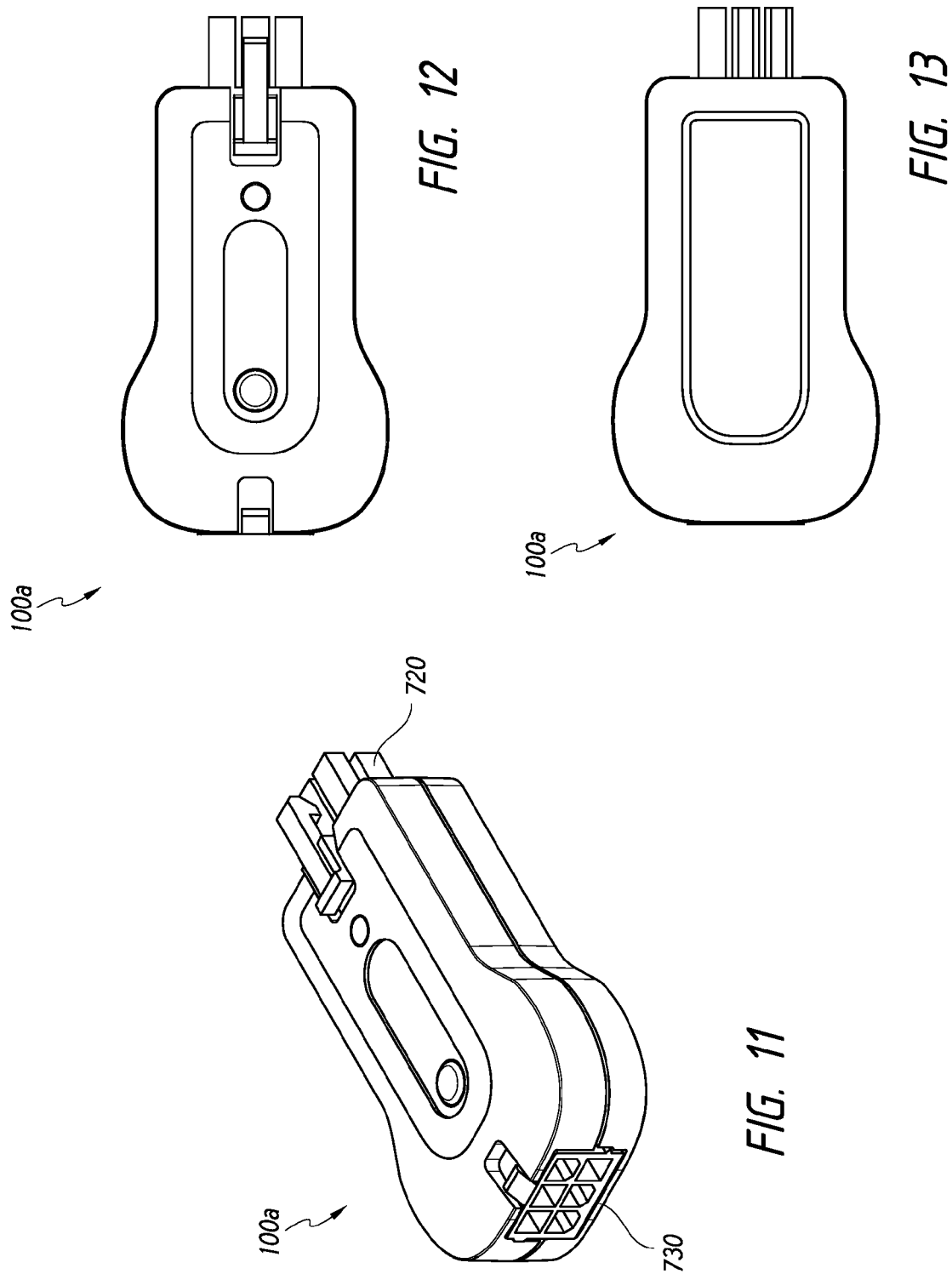

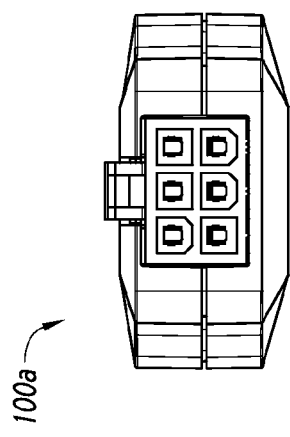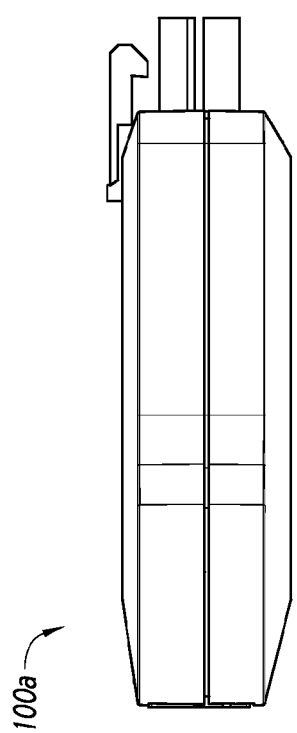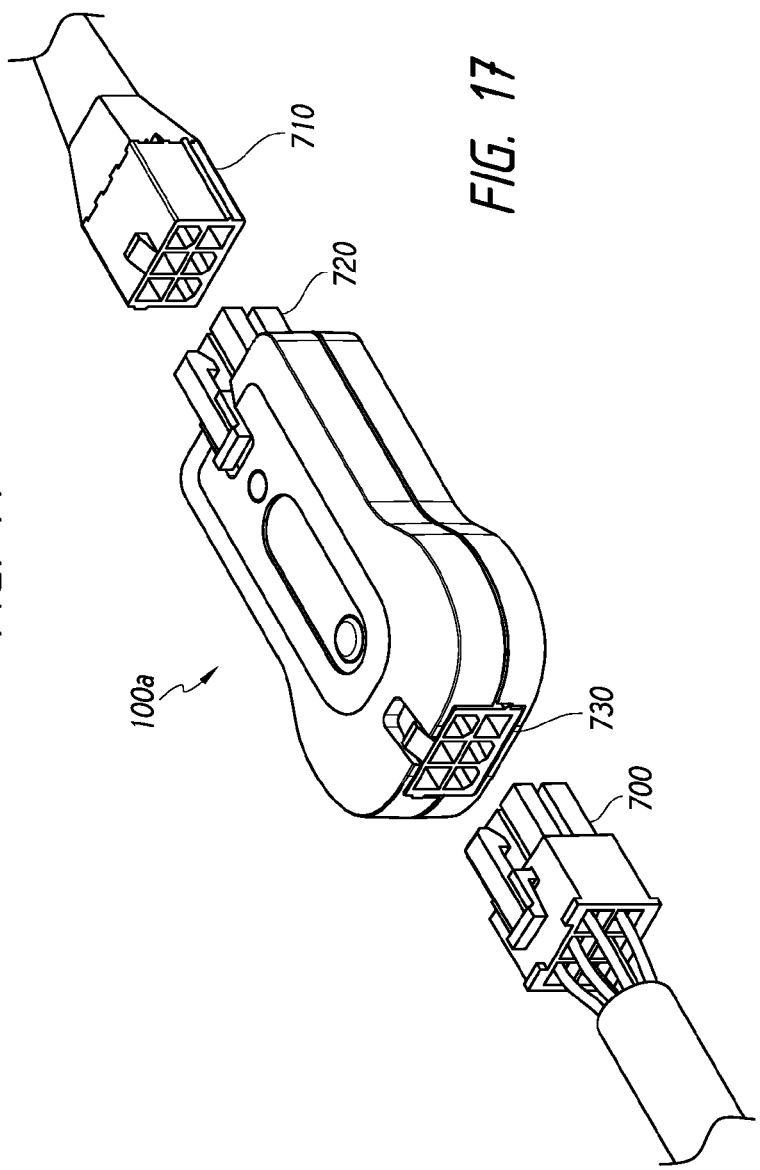

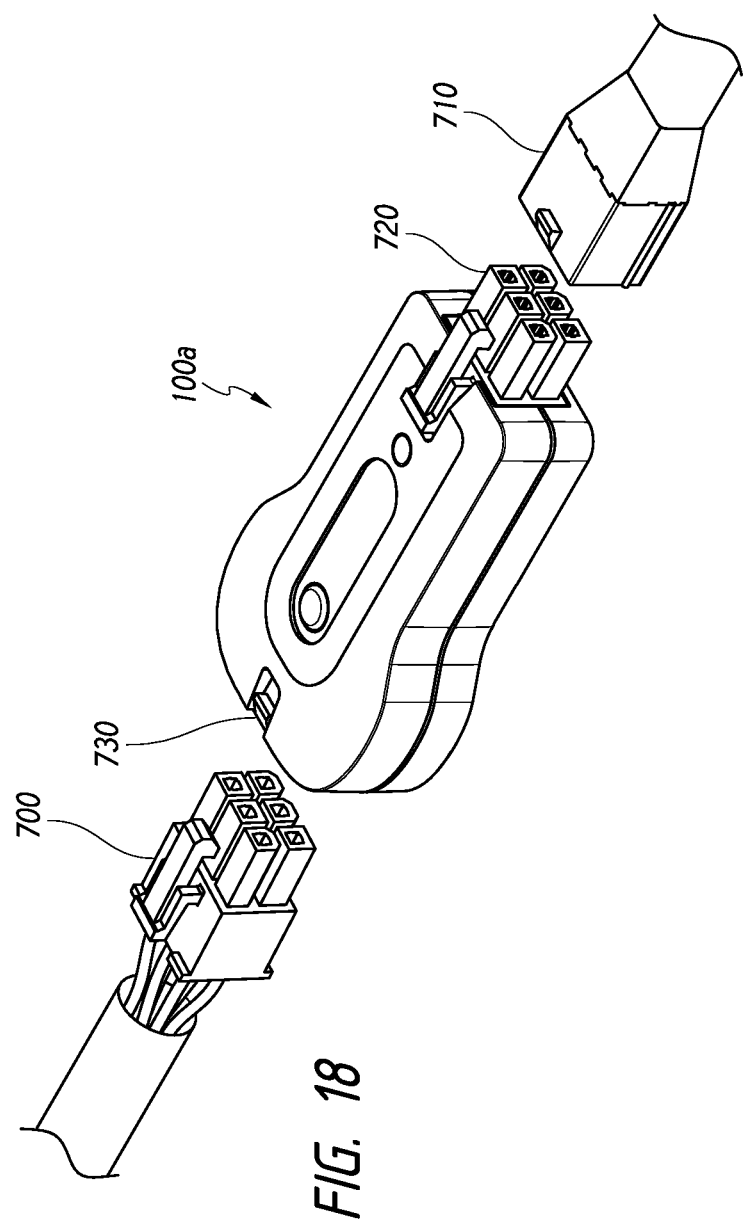

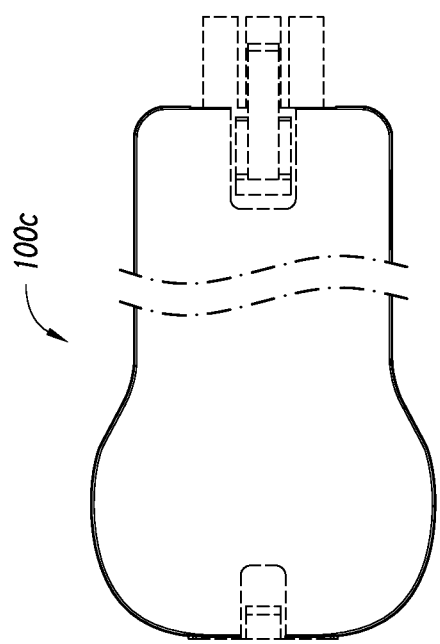
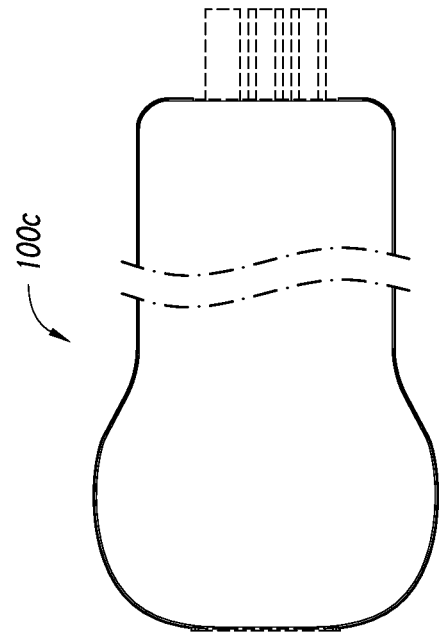
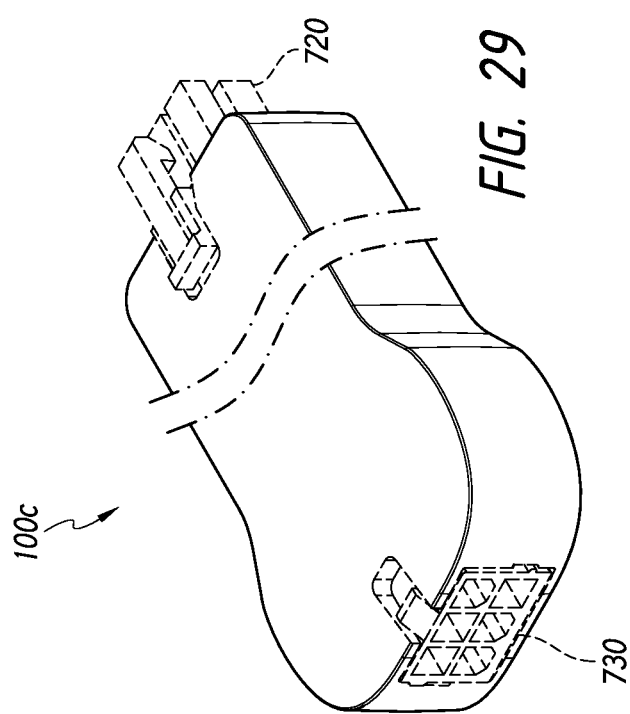

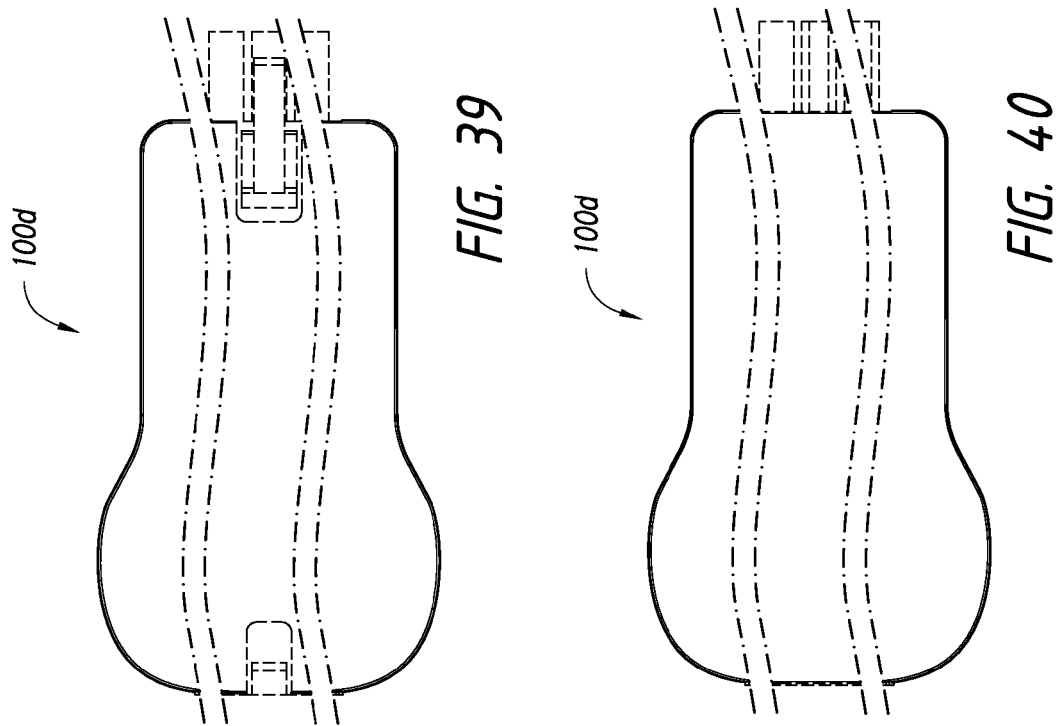
FIG. 39
FIG. 40
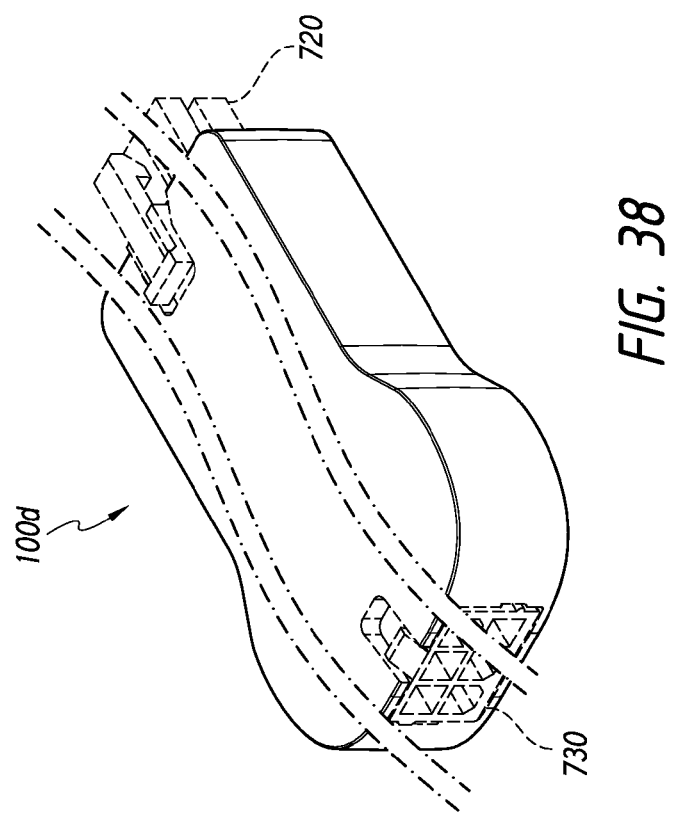
FIG. 38

METHOD AND SYSTEM FOR PERFORMING MOBILE DEVICE-TO-MACHINE PAYMENTS

PRIORITY CLAIM

The present application is a continuation of U.S. patent application Ser. No. 14/214,644, filed Mar. 14, 2014, which claims priority to U.S. Provisional Patent Application No. 61/917,936, filed Dec. 18, 2013, and is a continuation-in-part of U.S. Design patent application Ser. No. 29/477,025, filed Dec. 18, 2013. The present application is based on and claims priority from these applications, the disclosures of which are hereby expressly incorporated by reference.

BACKGROUND OF THE INVENTION

Disclosed herein are mobile-device-to-machine payment systems and, more specifically, mobile-device-to-machine payment systems over a non-persistent network connection and featuring hands-free and manual modes.

Vending machines (or "automatic retailing" machines), in the broadest sense, have been around for thousands of years. The first simple mechanical coin operated vending machines were introduced in the 1880s. Modern vending machines stock many different types of products including, but not limited to drinks (e.g. water, juice, coffee, and soda) and edible food products/items (e.g. snacks, candy, fruit, and frozen meals), as well as a wide variety of non-food items. In this fast paced world, vending machines are ubiquitous.

Vending machines are one type of "payment accepting unit" (payment accepting units are also referred to herein generically as "machines"). A payment accepting unit (or machine) is equipment that requires payment for the dispensing of products and/or services. In addition to vending machines, payment accepting units can also be other machines that require payment for the dispensing of a product and/or services including, but not limited to parking meters, toll booths, laundromat washers and dryers, arcade games, kiosks, photo booths, toll booths, transit ticket dispensing machines, and other known or yet to be discovered payment accepting units.

In using a payment accepting unit, a user will (1) approach the payment accepting unit, (2) determine from the face of the payment accepting unit the product (or service) he desires, (3) insert payment (e.g. coins, bills, or payment cards), and (4) input his selection into the payment accepting unit using a user interface (e.g. a series of buttons, a key pad, touch screen, or other input mechanism using, for example, the column and row at which a product is located). Based on the user's inputted selection, technology within the payment accepting unit provides the desired product (or service) to the user.

As the number of people with internet-connected mobile devices proliferates, so does the variety of uses for such devices. Mobile payment is a logical extension.

There is a large development effort around bringing mobile payment to the retail sector in an effort to not only provide options to the user, but also increased convenience.

In recent years, many improvements to modern vending machines have been suggested. Many of the innovations relate to means for communicating with the vending machine. Some of these communication innovations are detailed in U.S. Pat. No. 6,584,309 to Whigham (the "Whigham reference"), U.S. Pat. No. 7,085,556 to Offer (the "Offer reference"), U.S. Pat. No. 7,127,236 to Khan et al. (the "Khan reference"), U.S. Pat. No. 7,721,958 to Belfer et al. (the "Belfer reference"), U.S. Pat. No. 8,396,589 to Katzenstein Garibaldi et al. (the "Garibaldi reference"), U.S. Pat. No. 8,489,140 to Weiner et al. (the "Weiner reference"), and International Publication No. WO/2008/083025 to Carlson (the "Carlson reference").

The Whigham reference is directed to a system and method for purchasing a product from an automatic vending machine by means of a consumer's cellular telephone. The consumer requests a product available from the vending machine by dialing a specified telephone number that connects the consumer's cellular telephone to a server operated by a billing agency. The server recognizes the request for the product, creates a transaction record, and communicates a vend code to the consumer. Upon receiving the vend code from the server, the consumer transmits the vend code to the vending machine. The vend code may be an RF code, an audible tone code, or a manual code. Upon receipt of the vend code from the consumer, the vending machine dispenses the requested product.

The Offer reference is directed to a vending machine that is designed to communicate with a cellular phone such that it dispenses a product when it receives information indicating that the product has been selected. The Offer reference teaches permitting the cashless utilization of a vending machines via a communications service, such as a cellular telephone. A response to a signal from the cellular telephone from
the vending machine that indicates that a connection has been established between the vending machine and the cellular phone may be a visual indication that is displayed on the cellular telephone. The vending machine outputs the cost of the product and that cost is debited from an account to pay for the product.

The Khan reference describes a point of sale MicroAdapter device that enables payment transactions to be effected through a purchaser's personal trusted device (e.g. the user selecting the micropayment application on his personal trusted device and confirming or cancelling the purchase thereon) without relying upon tokens or prepayment cards. In one embodiment, the MicroAdapter includes a transceiver configured to receive a purchase signal from the personal trusted device including order and payment information. In response, the MicroAdapter communicates via wireless telephony with a transaction authorizer to receive authorization for effectuating the purchase transaction. The MicroAdapter can effectuate micropayment transactions authorized by a Billing On Behalf of Others program administered through a wireless carrier/ISP or third party.

The Belfer reference is directed to a system wherein a vending machine has an audio code collector and a code validator that is adapted to receive audio tones from a mobile device. The audio tones include authentication codes and dispense codes to control dispensing of product from the vending machine. To start the transaction, the consumer dials a unique set of symbols and digits to route the call to a verification server. The symbols and digits may correspond to a unique vending machine identification number and product identification numbers.

The Garibaldi reference is directed to an electronic device for the sale of intangible products through vending machines that include interfaces to communicate with external peripherals through the MDB protocol, the RS232 standard, and the DEX protocol, an interface to communicate with users, a communications system that enables it to act as part of a network and communicate with a central system, and a controller, that articulates the communication among the above-mentioned components, so as to enable a central system to perform diverse actions on a vending machine.

The Weiner reference is directed to a system and method for providing product or service with a cellular telephone. The problem identified in the Weiner reference is that mobile communication devices are long-range electronic devices designed to be used for long-range communications. Eschewing the use of near-field communication because it requires special design or modification of the mobile station (e.g. the vending machine), the Weiner reference teaches a mobile communication device identifier, consisting of: a shielding defining a coverage area, the shielding arranged to reduce radio signals originating externally of the coverage area to be less than a pre-determined signal strength; an antenna associated within the defined coverage area; a transceiver coupled to the antenna, the transceiver communicating with a mobile station inserted within the defined coverage area utilizing a signal strength greater than the pre-determined signal strength; and a service control unit responsive to the transceiver, the service control unit responsive to the communication to output a signal indicative of an authorization to provide a product or service.

The Carlson reference is directed to a system and a method for using a portable consumer device such as a mobile phone for payments and the like. One embodiment of the Carlson system is directed to a method that includes the steps of receiving a payment request message (that includes a request to pay for a product from a vending machine) from a portable consumer device operated by a consumer, sending an authorization response message back to the vending machine wherein the vending machine subsequently prompts the consumer to enter a selection if the authorization response message indicates that the consumer is authorized to make a purchase, and receiving an acknowledgement message from the vending machine that the product was purchased. The step of "sending an authorization response message back to the vending machine" is performed by a remote payment server and would require a persistent network connection.

BRIEF SUMMARY OF THE INVENTION

Disclosed herein are mobile-device-to-machine payment systems and, more specifically, mobile-device-to-machine payment systems over a non-persistent network connection and featuring hands-free and manual modes.

Described herein is a mobile-device-to-machine payment system for facilitating a cashless transaction for purchase of at least one product or service by a user from a payment accepting unit that preferably has input mechanisms. The user has a mobile device that has both short-range communication technology and long-range communication technology. The payment accepting unit is capable of dispensing at least one product or service. The system includes an adapter module and a server. The adapter module is associated with the payment accepting unit and has short-range communication technology for communicating with the short-range communication technology of the mobile device. The server has long-range communication technology for communicating with the long-range communication technology of the mobile device. The adapter module is for sending an authorization request for funds to the mobile device using short-range communication technology. The mobile device then forwards the authorization request for funds to the server using long-range communication technology. The server is for sending an authorization grant for funds to the mobile device using long-range communication technology. The mobile device the forwards the authorization grant for funds to the adapter module using short-range communication technology. The payment accepting unit dispenses the at least one product or service in response to receiving user input to the payment accepting unit input mechanism if the adapter module has received the authorization grant.

The adapter module may have security technology and the server may have security technology. The authorization request may be secured by the adapter module security technology to create a secured authorization request. The authorization grant may be secured by the server security technology to create a secured authorization grant. The secured authorization request and the secured authorization grant are preferably undecipherable to the mobile device.

The adapter module and the server may share a unique private key. The adapter module may have encryption/decryption technology and the server may have encryption/decryption technology. The authorization request may be encrypted by the adapter module encryption/decryption technology using the unique private key to create an encrypted authorization request. The encrypted authorization request may be decrypted by the server encryption/decryption technology using the unique private key. The authorization grant may be encrypted by the server encryption/decryption technology using the unique private key to create an encrypted authorization grant. The encrypted authorization grant may be decrypted by the adapter module encryption/decryption technology using the unique private key. The encrypted authorization request and the encrypted authorization grant are preferably undecipherable to the mobile device.

The adapter module is preferably surrounded by two zones, a payment zone and an authorization zone, wherein the payment zone is within the authorization zone. The adapter module sends the authorization request when the mobile device is within the authorization zone. The mobile device forwards the authorization grant for funds to the adapter module when the mobile device is within the payment zone. A third zone possible zone is a communication zone, the authorization zone being within the communication zone. The mobile device preferably receives advertising broadcast signals from the adapter module within the communication zone.

The system may have a hands-free mode in which the payment accepting unit dispenses the at least one product or service without the user interacting with the mobile device. A display of the payment accepting unit may be used for displaying funds available based on information from the authorization grant. The input mechanisms of the payment accepting unit may be used for receiving user selection input when the user interacts with the input mechanisms to select the at least one product or service to be dispensed.

The adapter module may be an in-line dongle for in-line insertion within a multi-drop bus of the payment accepting unit. Further, the payment accepting unit may have a multi-drop bus to a payment receiving mechanism. The multi-drop bus may have a male adapter and a female adapter. The adapter module may have a male adapter and a female adapter. The adapter module is preferably insertable in serial with the multi-drop bus by connecting the male adapter of the adapter module to the female adapter of the multi-drop bus and by connecting the female adapter of the adapter module to the male adapter of the multi-drop bus.

Also described herein is a method for using a mobile-device-to-machine payment system for facilitating a cashless transaction for purchase of at least one product or service by a user from a payment accepting unit may have input mechanisms. The user may have a mobile device having both short-range communication technology and long-range communication technology. The payment accepting unit is preferably capable of dispensing at least one product or service. The method includes the steps of: (a) sending an authorization request for funds to the mobile device using short-range communication technology of an adapter module associated with the payment accepting unit; (b) receiving the authorization request for funds from the short-range communication technology of the adapter module at the short-range communication technology of the mobile device; (c) forwarding the authorization request for funds to a server using the long-range communication technology of the mobile device; (d) receiving the authorization request for funds from the long-range communication technology of the mobile device at long-range communication technology of the server; (e) sending an authorization grant for funds to the mobile device using the long-range communication technology of the server; (f) receiving the authorization grant for funds from long-range communication technology of the server at the long-range communication technology of the mobile device; (g) forwarding the authorization grant for funds to the adapter module using the short-range communication technology of the mobile device; and (h) receiving the authorization grant for funds from the short-range communication technology of the mobile device at short-range communication technology of the adapter module. At least one product or service may then be dispensed from the payment accepting unit in response to receiving user input to the payment accepting unit input mechanism if the adapter module has received the authorization grant.

The method may include the steps of securing the authorization request using security technology associated with the adapter module to create a secured authorization request, securing the authorization grant using security technology associated with the server to create a secured authorization grant, and the secured authorization request and the secured authorization grant are preferably undecipherable to the mobile device.

The method may include the steps of (a) sharing a unique private key between the adapter module and the server, (b) encrypting using the unique private key the authorization request using encryption/decryption technology associated with the adapter module to create an encrypted authorization request, (c) decrypting using the unique private key the encrypted authorization request using encryption/decryption technology associated with the server, (d) encrypting using the unique private key the authorization grant using the encryption/decryption technology associated with the server to create an encrypted authorization grant, (e) decrypting using the unique private key the encrypted authorization grant using encryption/decryption technology associated with the adapter module, and (e) the encrypted authorization request and the encrypted authorization grant are preferably undecipherable to the mobile device.

The method may include the steps of (a) surrounding the adapter module with two zones, a payment zone and an authorization zone, wherein the payment zone is within the authorization zone, (b) the adapter module sending the authorization request when the mobile device is within the authorization zone; and (c) the mobile device forwarding the authorization grant for funds to the adapter module when the mobile device is within the payment zone. The adapter module may also include a third zone, a communication zone, wherein the authorization zone is within the communication zone. The mobile device receives advertising broadcast signals from the adapter module within the communication zone.

The method may have a hands-free mode in which the payment accepting unit dispenses the at least one product or service without the user interacting with the mobile device. The method may further include the steps of (a) displaying funds available on a display of the payment accepting unit, the funds available may be based on information from the authorization grant; and (b) receiving user selection input when the user interacts with input mechanisms of the payment accepting unit to select the at least one product or service to be dispensed.

The method may include the step of inserting the adapter module as an in-line dongle for in-line insertion within a multi-drop bus of the payment accepting unit. The method may include the step of inserting the adapter module in serial with the multi-drop bus by connecting a male adapter of the adapter module to a female adapter of the multi-drop bus and by connecting a female adapter of the adapter module to a male adapter of the multi-drop bus.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL VIEWS OF THE DRAWINGS

FIG. 3 is a table that illustrates the hands-free credit or alert user principle.

FIG. 4 is a flow chart showing the logging RSSI at User Input.

FIG. 11 is a perspective view of the exemplary first preferred in-line dongle adapter module.

FIG. 12 is a front plan view of the in-line dongle adapter module of FIG. 11.

FIG. 13 is a back plan view of the in-line dongle adapter module of FIG. 11.

FIG. 14 is a side view of the in-line dongle adapter module of FIG. 11 in accordance with some implementations.

FIG. 15 is a first end view of a connector receptacle of the in-line dongle adapter module of FIG. 11.

FIG. 16 is a second end view of a connector receptacle of the in-line dongle adapter module of FIG. 11.

FIG. 17 is a perspective view taken from the first end of the in-line dongle adapter module of FIG. 11, the connectors and cables between which the in-line dongle adapter module is inserted being shown in broken lines for environmental purposes.

FIG. 18 is a perspective view taken from the second end of the in-line dongle adapter module of FIG. 11, the connectors and cables between which the in-line dongle adapter module is inserted being shown in broken lines for environmental purposes.

FIG. 29 is a perspective view of the exemplary third preferred in-line dongle adapter module with a gap indicating the in-line dongle adapter module can be of any length.

FIG. 30 is a front plan view of the in-line dongle adapter module of FIG. 29.

FIG. 31 is a back plan view of the in-line dongle adapter module of FIG. 29.

FIG. 38 is a perspective view of the exemplary fourth preferred in-line dongle adapter module with two vertical gaps indicating the in-line dongle adapter module can be of any width.

FIG. 39 is a front plan view of the in-line dongle adapter module of FIG. 38.

FIG. 40 is a back plan view of the in-line dongle adapter module of FIG. 38.

DETAILED DESCRIPTION OF THE INVENTION

Figure 2:
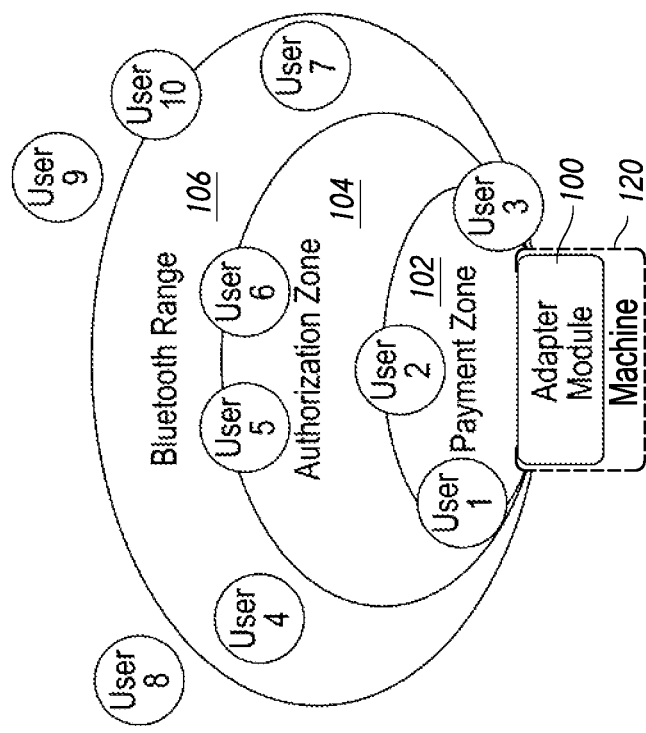
FIG. 2 is a schematic diagram that shows the three zone of FIG. 1 with multiple users therein, the mobile-device-to-machine payment systems providing for managing and resolving multiple users.

Disclosed herein are mobile-device-to-machine payment systems and, more specifically, mobile-device-to-machine payment systems over a non-persistent network connection. The mobile-device-to-machine payment systems disclosed herein focus on the unattended retail space (e.g. a payment accepting unit 120 or machine 120). More specifically, mobile-device-to-machine payment systems disclosed herein allow a user (having a mobile device 150 with a mobile application 140 thereon) to make a cashless purchase from a payment accepting unit 120 (having an adapter module 100 associated therewith).

The mobile-device-to-machine payment systems described herein can be implemented with one or more of the following features: easy installation feature, a non-persistent network connection feature; a manual (swipe to pay) mode feature; a hands-free mode feature; and a multiple vending transactions (multi-vend) feature.

Easy Installation: Installation is very easy, requires no tools, requires no configuration, and takes as little as 30 seconds. This is accomplished by using an adapter module 100 such as an in-line dongle (a hardware device with software thereon) design for in-line insertion within a multi-drop bus (MDB) of a payment accepting unit (e.g. a vending machine). Installation is as simple as "powering down" (turning off) the machine 120, identifying the "wire" that connects with a payment receiving mechanism (e.g. the coin mechanism), disconnecting the wire (so that there are two loose ends, such as a male connection end or adapter of an MDB and a female connection end or adapter of an MDB), plugging (inserting) the adapter module 100 in serial ("in-line") with the wire (for example, connecting the MDB female adapter to a male adapter of the adapter module 100 and connecting the MDB male adapter to a female adapter of the adapter module 100), tucking the wire and the installed adapter module 100 back into position, and "powering up" (turning on) the machine 120. Most vending machines made since 1995 have this industry standard MDB technology that would allow this easy 30-second installation. On machines without MDB technology, the adapter module 100 can be configured or designed to work with other serial protocols or activate a switch. In essence the adapter module 100 simulates establishing payment on payment accepting unit 120 in much the same manner as other alternative forms of payment (e.g. cash).

Non-persistent Network Connection: Although payment accepting units (or "machines") that accept only cash (e.g. paper currency and coins) may not require a connection (persistent or non-persistent) to a network, traditional payment accepting units that accept cashless payments (e.g. credit cards, debit cards, and alternative mobile device payment methods using, for example, smart phones) require a persistent connection to a network (wired or wireless) to facilitate the cashless payments. In other words, without a persistent (ongoing or accessible on demand) network connection, traditional payment accepting units cannot accept cashless payments. Most traditional payment accepting units that accept cashless payments include the technology to accomplish this persistent network connection that allows them to connect to a remote server. If the network connection to a traditional machine is temporarily interrupted, cashless payments will be temporarily unavailable. If the machine is located in a location where no signal is available, cashless payments will not be possible. The Whigham reference, the Offer reference, and the Belfer reference disclose alternative payment accepting units that accept cashless payments by using the user's cellular phone to allow the user to manually input coding to a remote server and, thereby act as an on-demand bridge network connection. These references, however, require significant user interaction with the cellular telephone to effectuate the transaction. In addition to using a mobile device 150 as an intermediary between the payment accepting units 120 and the server 130, mobile-device-to-machine payment systems described herein minimize (manual mode) or eliminate (hands-free mode) user interaction with the mobile device 150. Further, some mobile-device-to-machine payment systems described herein facilitate the acceptance of cashless payments without requiring any network connection near the payment accepting unit 120. Mobile-device-to-machine payment systems described herein that are located in a remote location where no signal is available, therefore, can accept cashless payments.

Manual (Swipe to Pay) Mode: Using a "swipe to pay" feature (or just "swipe") refers to a user's action implemented on his mobile device 150 in which he quickly brushes his finger (or other pre-determined interaction) on the mobile device's touch screen 152 (or other input device associated with the mobile device 150). From the user's perspective, when the user is within range, a pre-installed mobile application 140 automatically connects to the payment accepting unit 120 (e.g. a vending machine). The mobile application 140 might display (on the touch screen 152) a prepaid balance that the user "swipes" to transfer payment to the payment accepting unit 120. The user could observe the transferred funds on the touch screen 152 of the mobile device 150 and/or on the display 122, 124 of the payment accepting unit 120. The transaction is completed just as if cash was inserted in the machine 120 with the user inputting his selection on the payment accepting unit 120 and the payment accepting unit 120 dispensing the product or service. After the selection is made, the change is returned to the mobile device 150 and this may be shown on the touch screen 152 of the mobile device 150.

Hands-Free Mode: A "hands-free pay" feature (or just "hands-free") would most likely be used with "favorite" payment accepting units 120 (e.g. a vending machine at work or school). From the user's perspective, he would approach the favorite payment accepting unit 120 and notice that the display 122, 124 of the payment accepting unit 120 showed funds available, he would select the product or service using the payment accepting unit's input mechanisms (e.g. buttons 126 or a touch screen display 124 shown in FIG. 19), and he would retrieve his dispensed services or products. It would be that simple. More specifically, when the user is within range, a pre-installed mobile application 140 automatically connects to the payment accepting unit 120 (e.g. a vending machine). The user may leave the mobile device 150 in a pocket, purse, briefcase, backpack, or other carrier. As the user approaches the payment accepting unit 120 and is in approximately "arms-length" distance (e.g. 3 to 5 feet), the user could observe the transferred funds on the display 122, 124 of the payment accepting unit 120. The transaction is completed just as if cash was inserted in the machine 120 with the user inputting his selection on the payment accepting unit 120 and the payment accepting unit 120 dispensing the product or service. After the selection is made, the change is returned to the mobile device 150. FIG. 3 details when the hands-free mode would be available.

Multiple Vending Transactions (Multi-Vend): Both the "swipe to pay" feature and the "hands-free pay" feature could be used multiple times in sequence (implemented, for example, as a loop) so that a user may make multiple purchases. After making his first selection and receiving his product (or service), the user would observe that additional funds were available on the display 122, 124 on the payment accepting unit 120. He could make another selection (or multiple selections) and receive additional product(s) (or service(s)). More specifically, the display 122, 124 may reset as if the transaction is complete, but then, because the user is still standing in range, the mobile application 140 would send another credit to the payment accepting unit 120, allowing for a second purchase. When the walks away, the system clears (e.g. returns unused funds to the mobile application 140 on the mobile device 150.

The features described above, alone or in combination with other features described herein will revolutionize the hundred billion dollar automated retail industry. The exemplary hardware is very low cost and there are no reoccurring fees because no cellular connection is required on the machine 120. Using the mobile-device-to-machine payment systems described herein, operators can increase frequency of visits and items sold with each visit.

Mobile-device-to-machine payment systems described herein may be implemented as an apparatus and/or method for enabling payments to a machine 120 via a mobile device 150. Exemplary mobile-device-to-machine payment systems may be better understood with reference to the drawings, but the shown mobile-device-to-machine payment systems are not intended to be of a limiting nature.

Definitions

Before describing the mobile-device-to-machine payment systems and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

Figure 1:
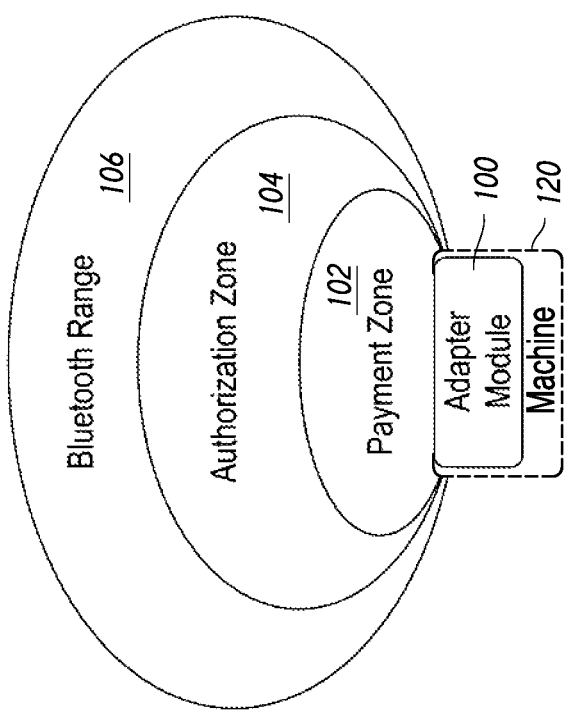
FIG. 1 is a schematic diagram that shows three zones: a first "communication zone" (e.g. "Bluetooth range"), a second "authorization zone," and a third "payment zone." The payment zone (that can't be zero) is smaller than or equal to (overlapping completely) the authorization zone.
Figure 56:
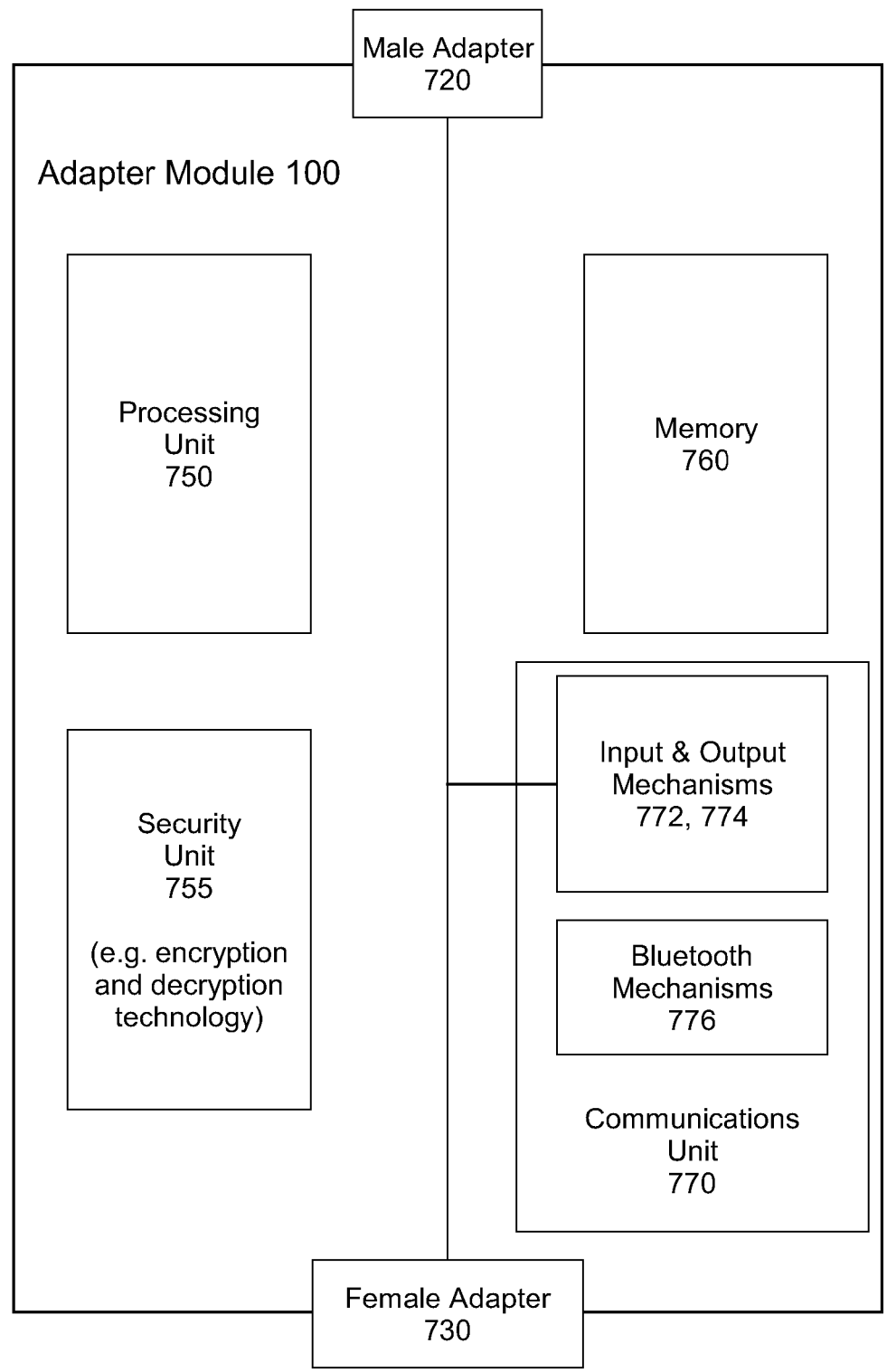
FIG. 56 is a block diagram of an exemplary adapter module.

Adapter Module 100: As shown in FIGS. 1 and 2, the adapter module 100 is a physical device that is installed in a machine 120 (a payment accepting unit 120). The shown exemplary adapter module 100 is an in-line dongle (a hardware device with software thereon) device that may be inserted in-line within a multi-drop bus (MDB) of a machine 120. The adapter module 100 bridges the communication between the machine 120 and a mobile device 150. Although described as a unique component, it should be noted that the adapter module 100 could be implemented as a plurality of devices or integrated into other devices (e.g. components of a machine 120). In its unique component form, the adapter module 100 can be easily inserted into a machine 120 so that the machine 120 is able to perform new features with the assistance of the adapter module 100. FIG. 56 shows exemplary components associated with the adapter module 100. The shown example may be divided into multiple distinct components that are associated with each other or the example may be incorporated into or drawn from other technology (e.g. a computer or a payment accepting unit) as long as the components are associated with each other.

Figure 57:
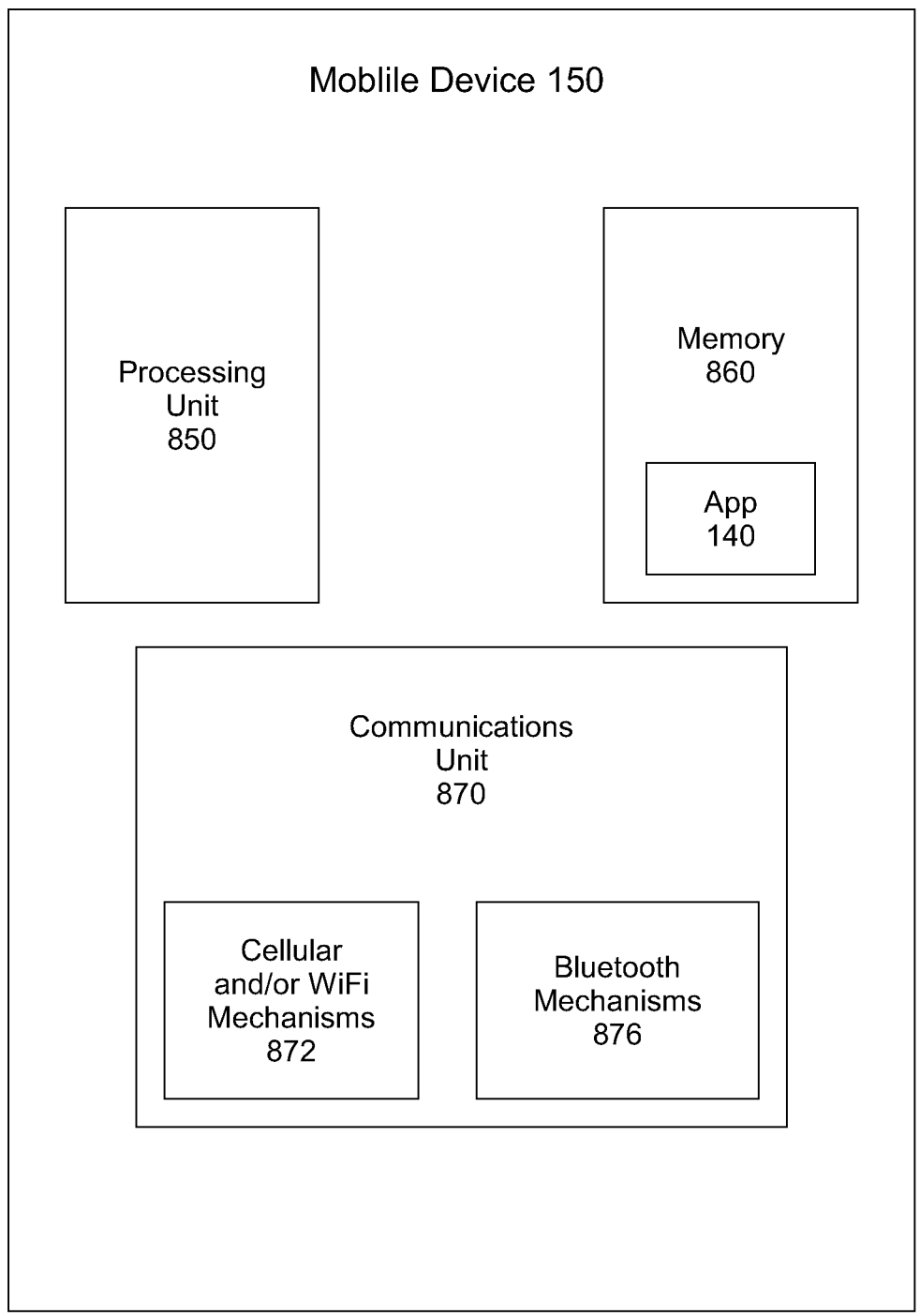
FIG. 57 is a block diagram of an exemplary mobile device.

Mobile Device 150 and Application 140 (also referred to as a "mobile application," "mobile app," or "app"): In general, a mobile device 150 may be a user's personal mobile device 150. The mobile device 150 (with a mobile application 140 thereon) acts as a communication bridge between the adapter module 100 (associated with a payment accepting unit 120) and the server 130. The mobile device 150 and application 140, however, are not "trusted" in that the communications (transmissions) it passes are encrypted. Encrypted (secured) communications are undecipherable (unencryptable, unreadable, and/or unuseable) by the mobile device 150. This keeps the passed communications secured and safe from hacking. Exemplary mobile devices include, but are not limited to smart phones, tablet or laptop computers, or personal digital assistants (PDAs), smart cards, or other technology (e.g. a hardware-software combination) known or yet to be discovered that has structure and/or capabilities similar to the mobile devices described herein. The mobile device 150 preferably has an application 140 (app 140) running on it. The term "app" is used broadly to include any software program(s) capable of implementing the features described herein. FIGS. 10A-10D show exemplary mobile devices 150 with associated apps 140 associated therewith. It should be noted that the phrase "mobile device" can be assumed to include the relevant app unless specifically stated otherwise. Similarly, it should be noted that an "app" can be assumed to be running on an associated mobile device unless specifically stated otherwise. FIG. 57 shows exemplary components associated with the mobile device 150. The shown example may be divided into multiple distinct components that are associated with each other or the example may be incorporated into or drawn from other technology (e.g. the cell phone itself) as long as the components are associated with each other.

Payment Accepting Unit 120 (or Machine 120): A payment accepting unit 120 (or machine 120) is equipment that requires payment for the dispensing of an product and/or service. Payment accepting units 120 may be vending machines, parking meters, toll booths, laundromat washers and dryers, arcade games, kiosks, photo booths, toll booths, transit ticket dispensing machines, and other known or yet to be discovered payment accepting units 120. Some payment accepting units 120 can accept cashless payments (payments other than cash (paper currency and coins)) by accepting payment from, for example, credit cards, debit cards, and mobile devices.

Network Connections: For purposes of this discussion, a persistent network connection is a wired or wireless communications connection that is ongoing (e.g. a dedicated connection, a dedicated online connection, and/or a hardwired connection) or accessible on demand (e.g. the ability for the machine to make a temporary connection to a server or the ability for the user to contact a server from his mobile device). Typically the persistent network connection has been conducted over "long-range communication technology" (e.g. hardwired, telephone network technology, cellular technology, WiFi technology, wide area network (WAN), local area network (LAN), or any wired or wireless communication technology over the internet that is known or yet to be discovered). Traditionally, machines that accept payment other than cash require a persistent (ongoing or accessible on demand) connection to a network to facilitate payment. This is true for machines that accept, for example, credit cards and debit cards. The payment accepting units 120 described herein do not require a traditional persistent network connection. The user's mobile device 150 acts as a communication bridge between the adapter module 100 and the server 130. Communications between user mobile devices 150 and the servers (e.g. a system management server 130 and/or a funding source server 160) take place using long-range communication technology. Communications between user mobile devices 150 and the adapter module 100 of the payment accepting unit 120 take place using "short-range communication technology" (e.g. Bluetooth (e.g. Bluetooth 4.0, Bluetooth Smart, Bluetooth LE (Low Energy), near-field communication, Ultra Wideband (UWB), RFID, infrared wireless, induction wireless, or any wired or wireless technology that could be used to communicate a small distance (e.g. approximately a hundred feet or closer) that is known or yet to be discovered). Neither the adapter module 100 nor the payment accepting unit 120, therefore require a traditional persistent long-range wireless network connection. The exemplary communications technology shown in the figures may be replaced with alternative like communications technology and, therefore, specific shown communications technologies are not meant to be limiting. For example WiFi technology could be replaced with another long-range communication technology.

Figure 58:
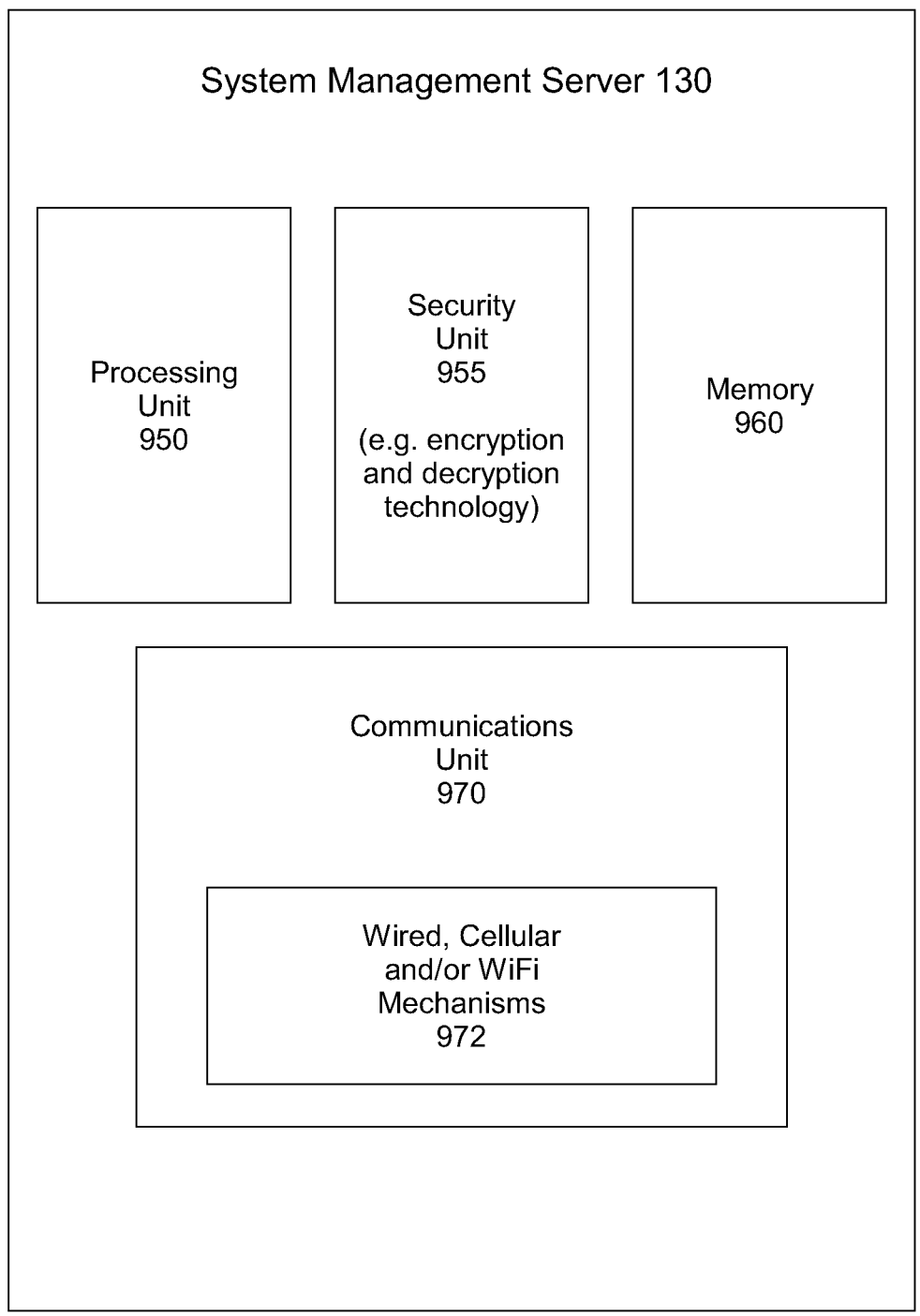
FIG. 58 is a block diagram of an exemplary server.

Server: A server is the host processing server that may be operated by the company running the system. For each user, the server 130 preferably maintains at least one "virtual wallet" having at least one "balance" (which can be $0) of designated funds for which the server 130 keeps an accounting. The balance may represent, for example, "cash" or it may be a "promotional value" that represents funds that may be spent under certain circumstances. If these funds begin to be depleted, the user may be notified (e.g. via the application 140 on the mobile device 150) that additional funds need to be designated and/or transferred. Alternatively, funds from other sources (e.g. the funding source server 160) may be automatically transferred to restore a predetermined balance. The balance may also be increased based on a promotion (e.g. points earned or coupons). As shown in FIG. 58, the server includes appropriate processors 950, memory 960 (which would keep an accounting of the user's balance in a manner similar to a gift card), and communication systems 970. As shown, the communications unit 970 of the server 130 includes long-range communication technology (e.g. cellular technology and WiFi mechanisms). The server 130 also includes a security unit 955 for encrypting and decrypting messages. The server 130 receives an AuthRequest from the adapter module 100 (via a mobile device 150) and, if funds are available, returns the AuthGrant for funds. FIG. 58 shows exemplary components associated with the server 130. The shown example may be divided into multiple distinct components that are associated with each other or the example may be incorporated into or drawn from other technology (e.g. a computer or a main frame) as long as the components are associated with each other.

Advertise Presence: Each adapter module 100 advertises its presence by broadcasting signals (advertising broadcast signals) to mobile devices in the zones 102, 104, 016. Each adapter module 100 can listen to other adapter modules' advertisements Received Signal Strength Indicator (RSSI): The adapter module 100 may have a self-calibrating signal strength to determine zone thresholds (e.g. a payment zone threshold). At the time the user selects an item (product or service) from the payment accepting unit 120, the Received Signal Strength Indicator (RSSI) is logged. At this moment, it is presumed the user is within "arms-length" (which may be a predetermined length approximating the distance of a user standing in front of a machine for the purpose of making a purchase) from the payment accepting unit 120. Mathematical computation (In-Range Heuristics) is conducted to derive the optimal RSSI threshold at which point payment should be triggered by an application 140 on a mobile device 150. The threshold may be payment accepting unit specific and can vary over a period of time. This optimal zone threshold is preferably reported to the mobile device 150 during an initial handshake.

In-Range Heuristics: Mathematical computation that determines the RSSI threshold to determine when a user is in the authorization zone 104 and/or payment zone 102. This computation can take into consideration numerous historical data points as well as transaction specific information such as which mobile device 150 is being used, payment accepting unit type, among other factors. Preferably the RSSI is logged while the user is making his selection (this is the one time in the entire process that the user definitely will be "in range" (e.g. they will be arm's length from the machine 120 because they are physically interacting with the machine 120). The type of user mobile device 150, accelerometer data (e.g. is the user moving or stationary), and/or other information may also be logged while the user is making his selection. The adapter module 100 can give a reference RSSI for the payment zone 102 for the machine 120, and the application 140 can make a +/−adjustment based on the specific mobile device 150 on which it is installed. Over a period of time, the system continues to improve itself based on additional data points.

Authorization Request (AuthRequest): When a user enters the authorization zone 104, the mobile device 150 notifies the adapter module 100 and the adapter module 100 sends the secured authorization request (e.g. the encrypted authorization request) as a "message" (also referred to as a communication or transmissions) to the server 130 via the mobile device 150. Encryption may be performed by a security unit 755 (security technology that may be associated with the processing unit 750 and/or the memory 760). Significantly, the AuthRequest is a request for authorization of funds, not a request for authorization of a transaction. The purpose of the funds is irrelevant to the server 30.

Authorization Grant Token (AuthGrant): This is a "message" (also referred to as a communication or transmissions) encrypted by the security unit 955 (security technology) of the server 130 with the unique private key for the adapter module 100. The secured authorization grant (e.g. the encrypted authorization grant) is passed from the server 130 (via the mobile device 150) to the adapter module 100 in the form of a message. The mobile device 150, however, is not able to decrypt and read the message. The authorization grant is in response to the authorization request. The amount of the funds granted by the AuthGrant may be determined by factors including, but not limited to, the amount of funds available (or, if funds are not available, a mini-loan could be granted), a pre-authorized amount (e.g. set by the server, set by the user during set-up, set by the funding source, or a standard amount), limited by time (e.g. only a certain amount per hour, or a predetermined amount at specific times of the day), limited to the maximum amount of an item on the machine (or enough for two or three items in the machine), or one or more of these and other factors. Significantly, the AuthGrant makes the funds available, but does not authorize a transaction. The AuthGrant may have an associated expiration period in that it may expire if it is not used in a pre-determined time period. The length of time before the AuthGrant expires may be determined by factors including, but not limited to, the trustworthiness of the user (e.g. the user has a long history with the system or some known provider (e.g. credit card provider, bank, or credit union), the user has a good credit rating, or the user has a large wallet balance), a pre-authorized time period (e.g. set by the server, set by the user during set-up, set by the funding source, or a standard time period), limited by time (e.g. predetermined time periods at specific times of the day such as longer times during breakfast, lunch, and dinner), limited by the machine or the products or services sold in the machine, limited by the number of other users near the machine (e.g. if it is a crowded machine, the AuthGrant may expire faster), or one or more of these and other factors. The AuthGrant remains valid until it expires or some other event occurs to end its validity (e.g. the user cancels it). This means that under normal circumstances the mobile device 150 will hold the AuthGrant authorizing use of funds for a pre-determined time period that will allow the user sufficient time to make a purchase. The authorized amount may be considered to be the "wallet balance" that is held in a virtual "wallet."

Synchronization: Time may be synchronized to the adapter module 100 from the server 130. The server 130 sends time information with encrypted messages and the adapter module 100 uses the time encoded in the messages for synchronization.

The mobile-device-to-machine payment systems and components thereof may have associated hardware, software, and/or firmware (a variation, subset, or hybrid of hardware and/or software). The term "hardware" includes at least one "processing unit," "processor," "computer," "programmable apparatus," and/or other known or yet to be discovered technology capable of executing instructions or steps (shown as processing unit 750 in FIG. 56, processing unit 850 in FIG. 57, and processing unit 950 in FIG. 58). The term "software" includes at least one "program," "subprogram," "series of instructions," or other known or yet to be discovered hardware instructions or hardware-readable program code. Software may be loaded onto hardware (or firmware) to produce a "machine," such that the software executes on the hardware to create structures for implementing the functions described herein. Further, the software may be loaded onto the hardware (or firmware) so as to direct the mobile-device-to-machine payment systems (and components thereof) to function in a particular manner described herein or to perform a series of operational steps as described herein. "Hardware" such as the adapter module 100, mobile device 150, and payment accepting unit 120 may have software (e.g. programs and apps) loaded thereon. The phrase "loaded onto the hardware" also includes being loaded into memory (shown as memory 760 in FIG. 56, memory 860 in FIG. 57, and memory 960 in FIG. 58) associated with or accessible by the hardware. The term "memory" is defined to include any type of hardware (or other technology)-readable media (also referred to as computer-readable storage medium) including, but not limited to, attached storage media (e.g. hard disk drives, network disk drives, servers), internal storage media (e.g. RAM, ROM, EPROM, FLASH-EPROM, or any other memory chip or cartridge), removable storage media (e.g. CDs, DVDs, flash drives, memory cards, floppy disks, flexible disks), firmware, and/or other known or yet to be discovered storage media. Depending on its purpose, the memory may be transitory and/or non-transitory. Appropriate "messages," "communications," "signals," and/or "transmissions" (that includes various types of information and/or instructions including, but not limited to, data, commands, bits, symbols, voltages, currents, electromagnetic waves, magnetic fields or particles, optical fields or particles, and/or any combination thereof) over appropriate "communication paths," "transmission paths," and other means for signal transmission including any type of connection between two elements on the system (the system including, for example, the adapter module 100, mobile device 150, payment accepting unit 120, hardware systems and subsystems, and memory) would be used as appropriate to facilitate controls and communications.

It should be noted that the terms "programs" and "subprograms" are defined as a series of instructions that may be implemented as software (i.e. computer program instructions or computer-readable program code) that may be loaded onto a computer to produce a "machine," such that the instructions that execute on the computer create structures for implementing the functions described herein or shown in the figures. Further, these programs and subprograms may be loaded onto a computer so that they can direct the computer to function in a particular manner, such that the instructions produce an article of manufacture including instruction structures that implement the function specified in the flow chart block or blocks. The programs and subprograms may also be loaded onto a computer to cause a series of operational steps to be performed on or by the computer to produce a computer implemented process such that the instructions that execute on the computer provide steps for implementing the functions specified in the flow chart block or blocks. The phrase "loaded onto a computer" also includes being loaded into the memory of the computer or a memory associated with or accessible by the computer. Separate, albeit interacting, programs and subprograms may be associated with the adapter modules 100, the server 130, and the mobile device 150 (including the mobile application 140) and these programs and subprograms may be divided into smaller subprograms to perform specific functions.

The terms "messages," "communications," "signals," and/or "transmissions" include various types of information and/or instructions including, but not limited to, data, commands, bits, symbols, voltages, currents, electromagnetic waves, magnetic fields or particles, optical fields or particles, and/or any combination thereof. Appropriate technology may be used to implement the "communications," "signals," and/or "transmissions" including, for example, transmitters, receivers, and transceivers. "Communications," "signals," and/or "transmissions" described herein would use appropriate technology for their intended purpose. For example, hard-wired communications (e.g. wired serial communications) would use technology appropriate for hard-wired communications, short-range communications (e.g. Bluetooth) would use technology appropriate for close communications, and long-range communications (e.g. WiFi or Cellular) would use technology appropriate for remote communications over a distance. Appropriate security (e.g. SSL or TLS) for each type of communication is included herein. Security units 755 and 955 include technology for securing messages. The security technology may be, for example, encryption/decryption technology (e.g. software or hardware). Although encryption/decryption is discussed primarily as being performed using a unique private key, alternative strategies include, but are not limited to encryption/decryption performed using public/private keys, or other encryption/decryption strategies known or yet to be discovered. Appropriate input mechanisms and/or output mechanisms, even if not specifically described, are considered to be part of the technology described herein. The exemplary communications unit 770 (shown in FIG. 56) of the adapter module 100 is shown as including appropriate input and output mechanisms 772, 774 that may be implemented in association (e.g. directly or indirectly in functional communication) with male and female adapters 720, 730 of the adapter module 100. The exemplary communications unit 870 (shown in FIG. 57) of the mobile device 150 includes mechanisms for both long-range communications (shown as Cellular and/or WiFi mechanisms 872) for communicating with the server 130 and short-range communications (shown as Bluetooth mechanisms 876) for communicating with the adapter module 100.

When used in relation to "communications," "signals," and/or "transmissions," the terms "provide" and "providing" (and variations thereof) are meant to include standard means of provision including "transmit" and "transmitting," but can also be used for non-traditional provisions as long as the "communications," "signals," and/or "transmissions" are "received" (that can also mean obtained). The terms "transmit" and "transmitting" (and variations thereof) are meant to include standard means of transmission, but can also be used for non-traditional transmissions as long as the "communications," "signals," and/or "transmissions" are "sent." The terms "receive" and "receiving" (and variations thereof) are meant to include standard means of reception, but can also be used for non-traditional methods of obtaining as long as the "communications," "signals," and/or "transmissions" are "obtained."

Figure 19:
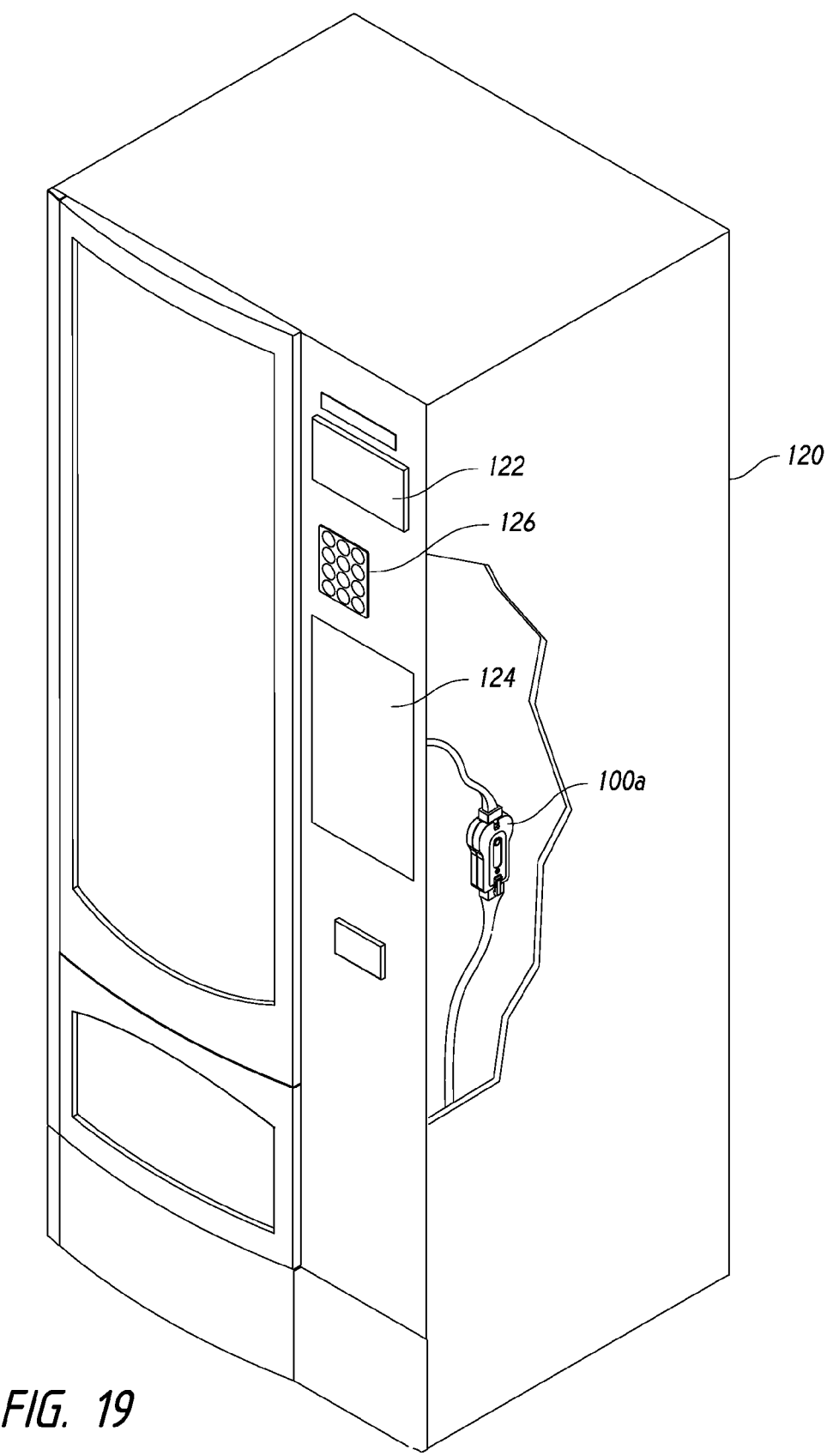
FIG. 19 is a perspective view of the in-line dongle adapter module of FIG. 11 within a vending machine.
Figure 21:
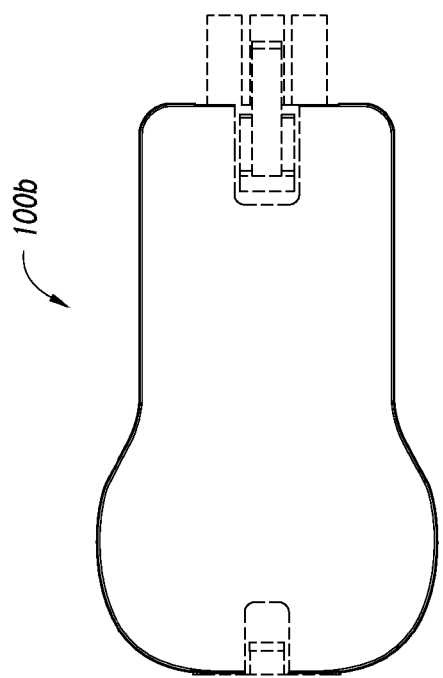
FIG. 21 is a front plan view of the in-line dongle adapter module of FIG. 20.
Figure 22:
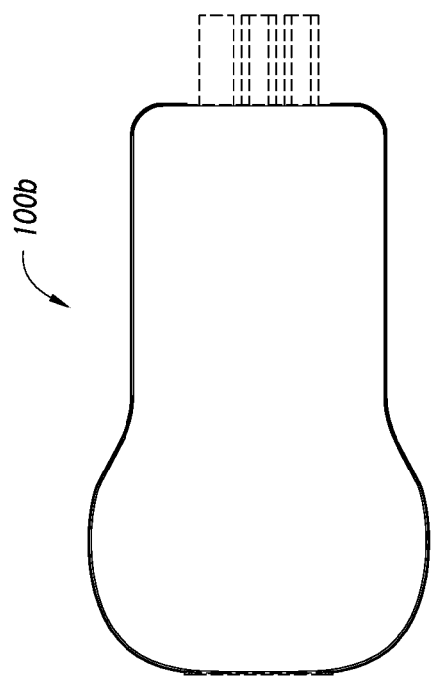
FIG. 22 is a back plan view of the in-line dongle adapter module of FIG. 20.
Figure 20:
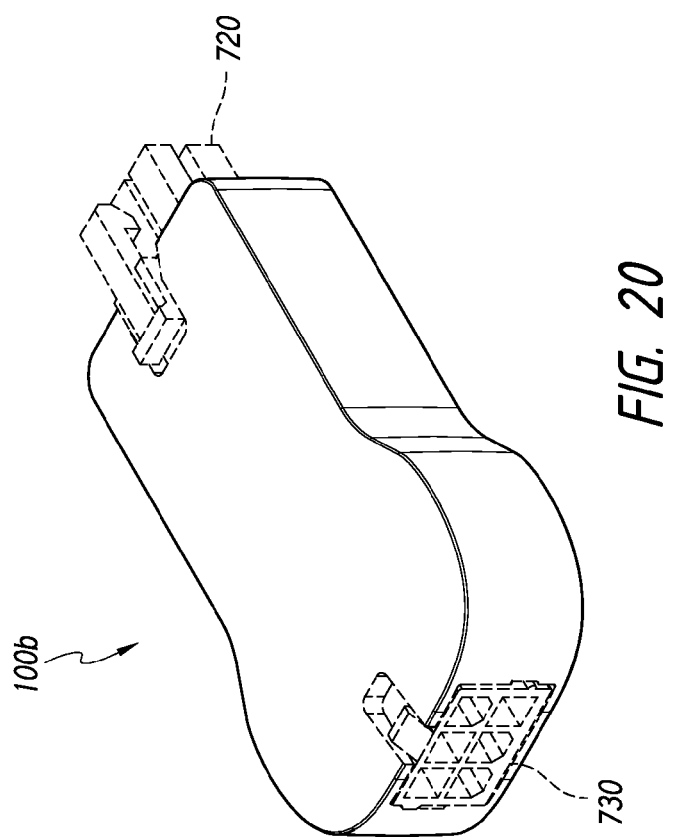
FIG. 20 is a perspective view of the exemplary second preferred in-line dongle adapter module.
Figure 25:
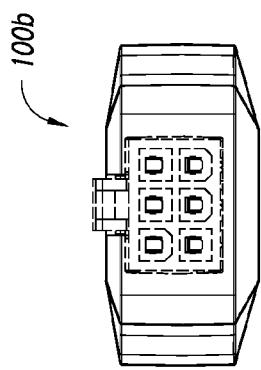
FIG. 25 is a second end view of a connector receptacle of the in-line dongle adapter module of FIG. 20.
Figure 23:
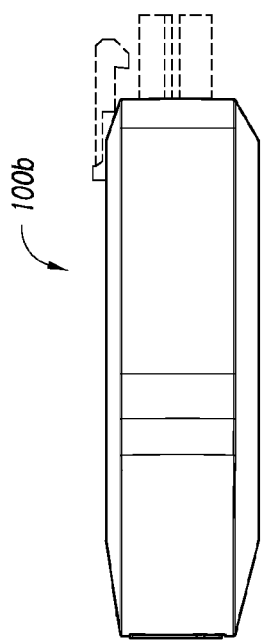
FIG. 23 is a first side view of the in-line dongle adapter module of FIG. 20, the second side being a mirror image of that shown.
Figure 24:
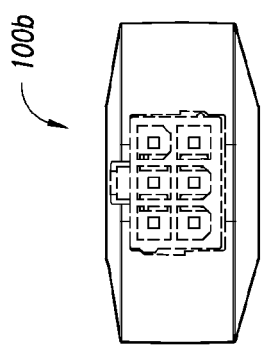
FIG. 24 is a first end view of a connector receptacle of the in-line dongle adapter module of FIG. 20.
Figure 26:
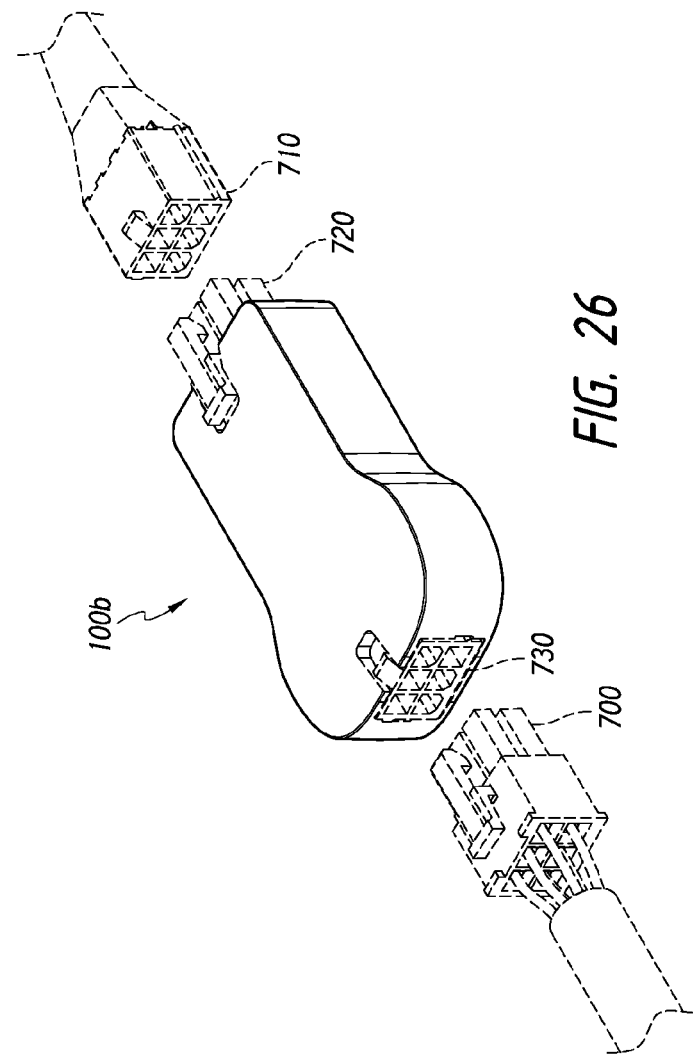
FIG. 26 is a perspective view taken from the first end of the in-line dongle adapter module of FIG. 20, the connectors and cables between which the in-line dongle adapter module is inserted being shown in broken lines for environmental purposes.
Figure 27:
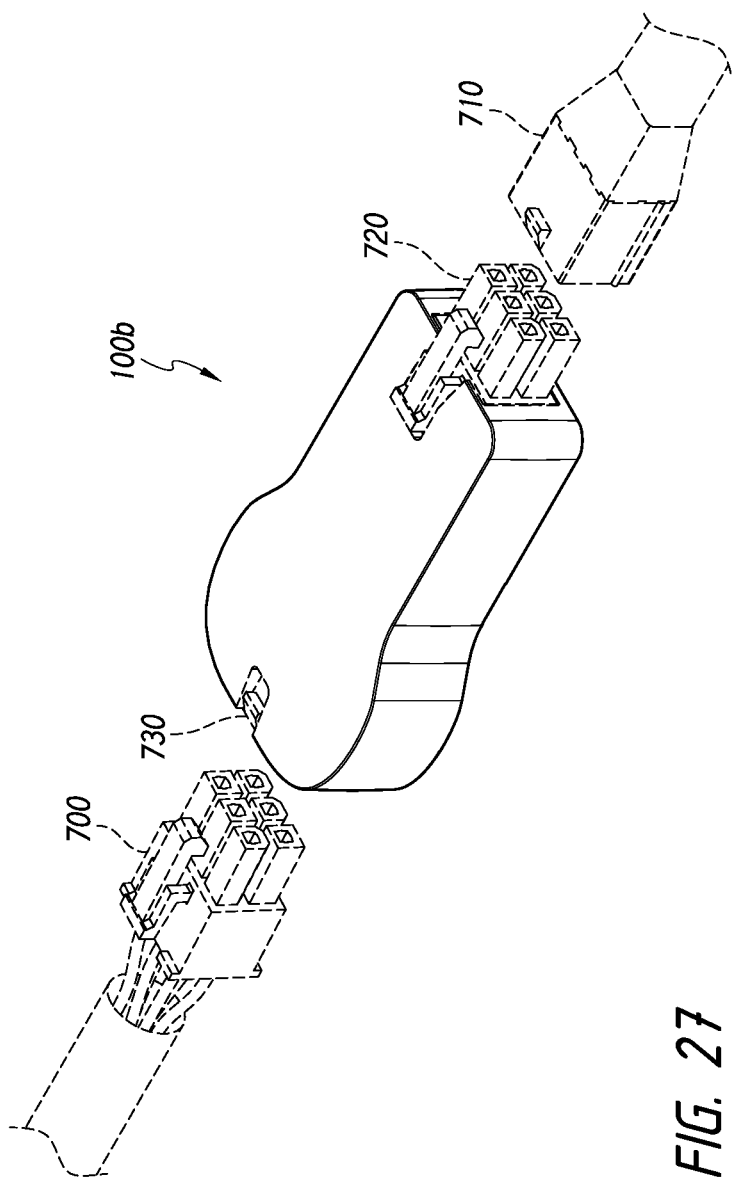
FIG. 27 is a perspective view taken from the second end of the in-line dongle adapter module of FIG. 20, the connectors and cables between which the in-line dongle adapter module is inserted being shown in broken lines for environmental purposes.
Figure 28:
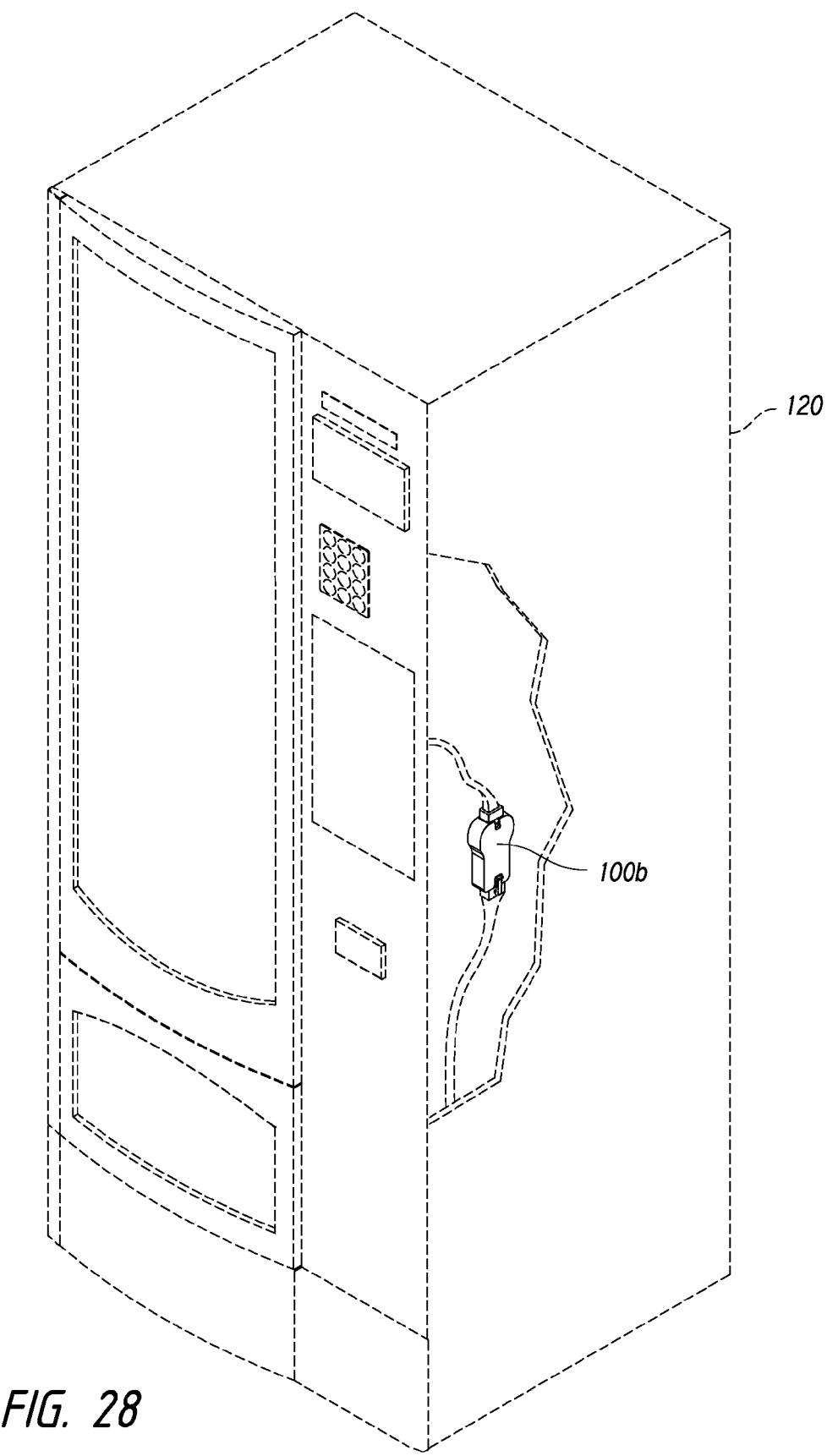
FIG. 28 is a perspective view of the in-line dongle adapter module of FIG. 20 within a vending machine.
Figure 34:
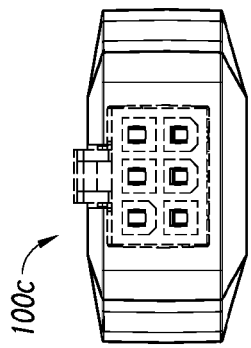
FIG. 34 is a second end view of a connector receptacle of the in-line dongle adapter module of FIG. 29.
Figure 32:
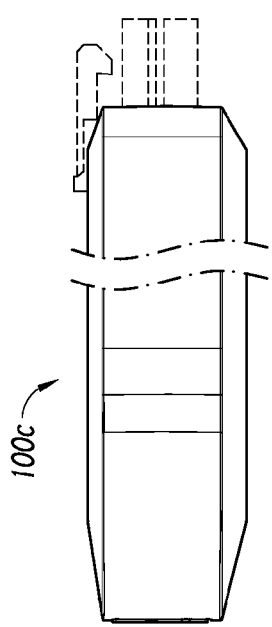
FIG. 32 is a first side view of the in-line dongle adapter module of FIG. 29, the second side being a mirror image of that shown.
Figure 33:
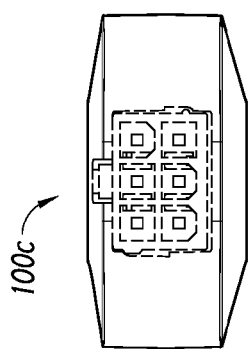
FIG. 33 is a first end view of a connector receptacle of the in-line dongle adapter module of FIG. 29.
Figure 35:
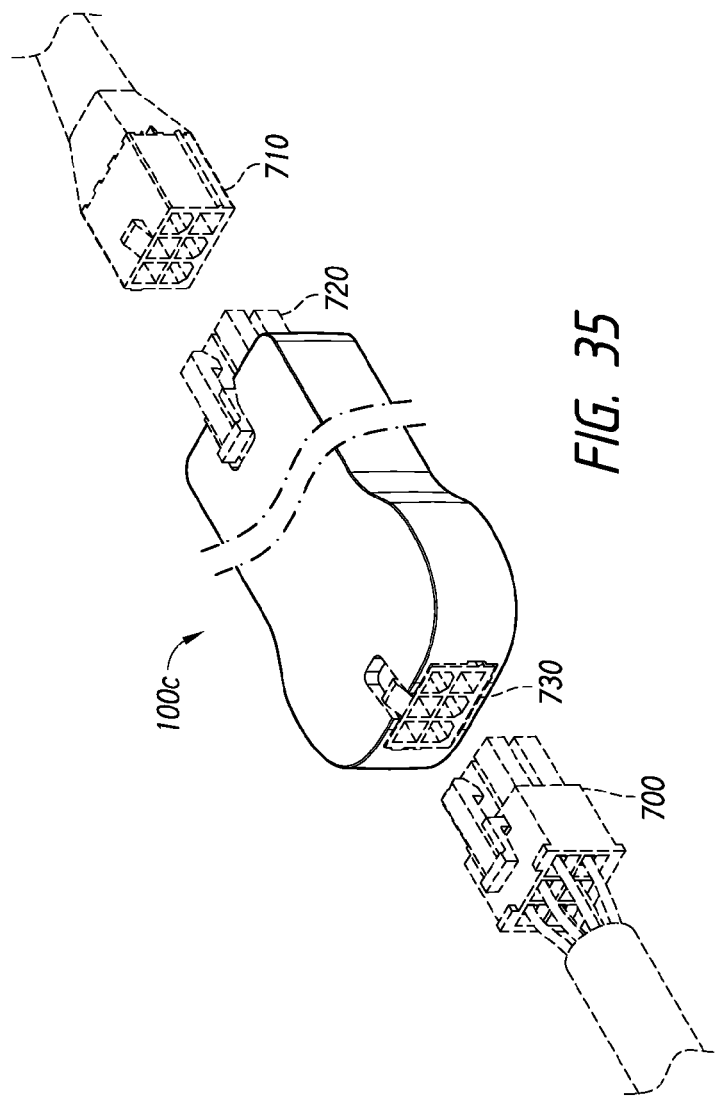
FIG. 35 is a perspective view taken from the first end of the in-line dongle adapter module of FIG. 29, the connectors and cables between which the in-line dongle adapter module is inserted being shown in broken lines for environmental purposes.
Figure 36:
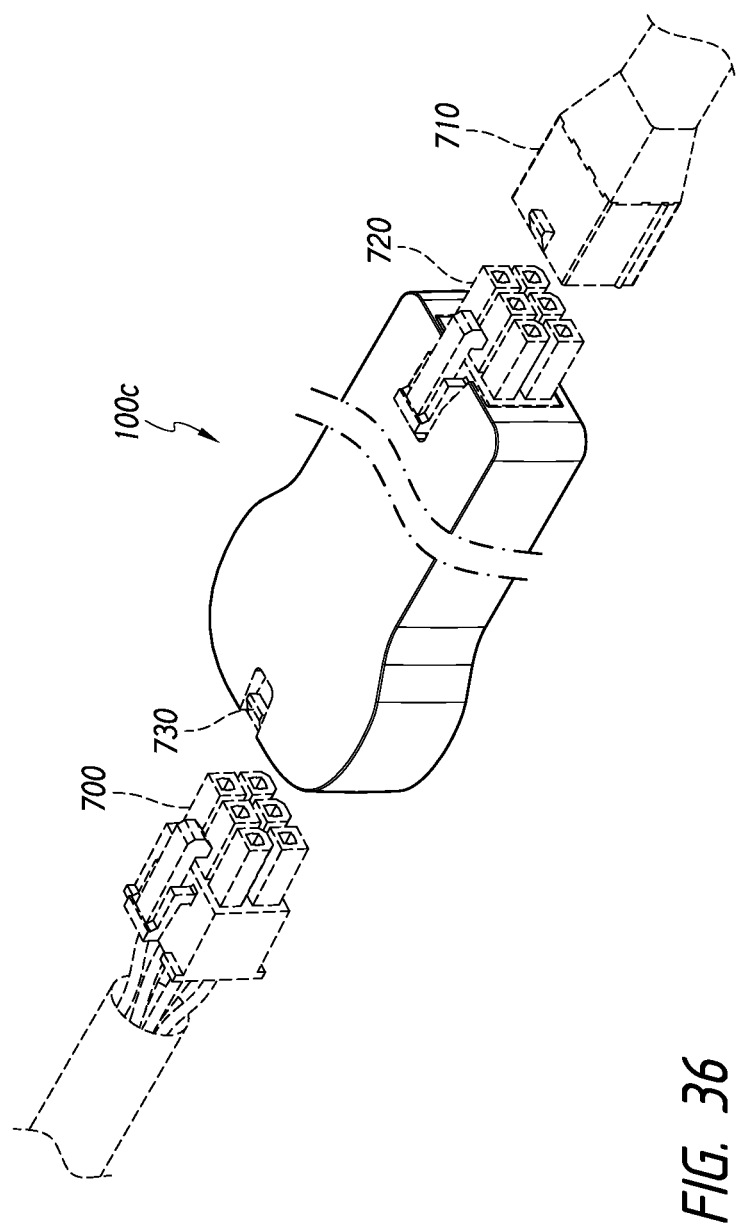
FIG. 36 is a perspective view taken from the second end of the in-line dongle adapter module of FIG. 29, the connectors and cables between which the in-line dongle adapter module is inserted being shown in broken lines for environmental purposes.
Figure 37:
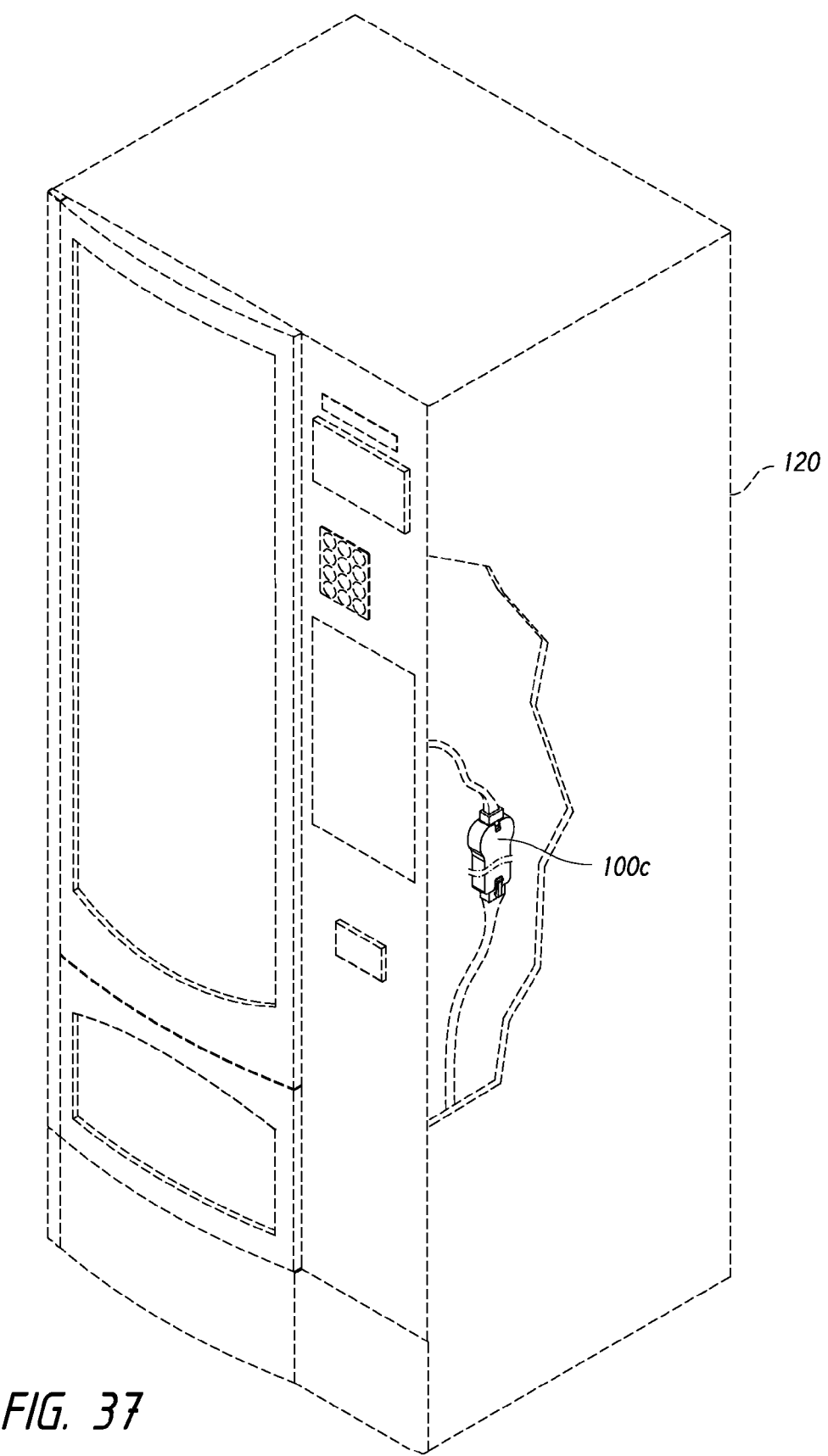
FIG. 37 is a perspective view of the in-line dongle adapter module of FIG. 29 within a vending machine.
Figure 43:
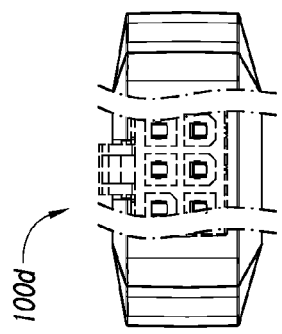
FIG. 43 is a second end view of a connector receptacle of the in-line dongle adapter module of FIG. 38.
Figure 41:
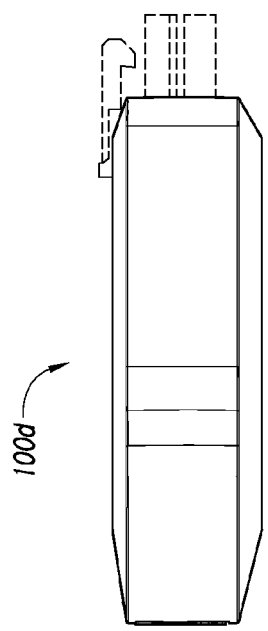
FIG. 41 is a first side view of the in-line dongle adapter module of FIG. 38, the second side being a mirror image of that shown.
Figure 42:
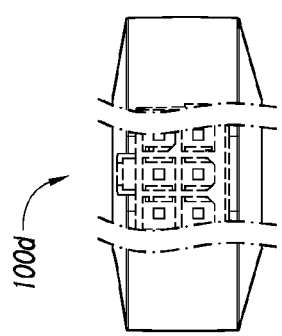
FIG. 42 is a first end view of a connector receptacle of the in-line dongle adapter module of FIG. 38.
Figure 44:
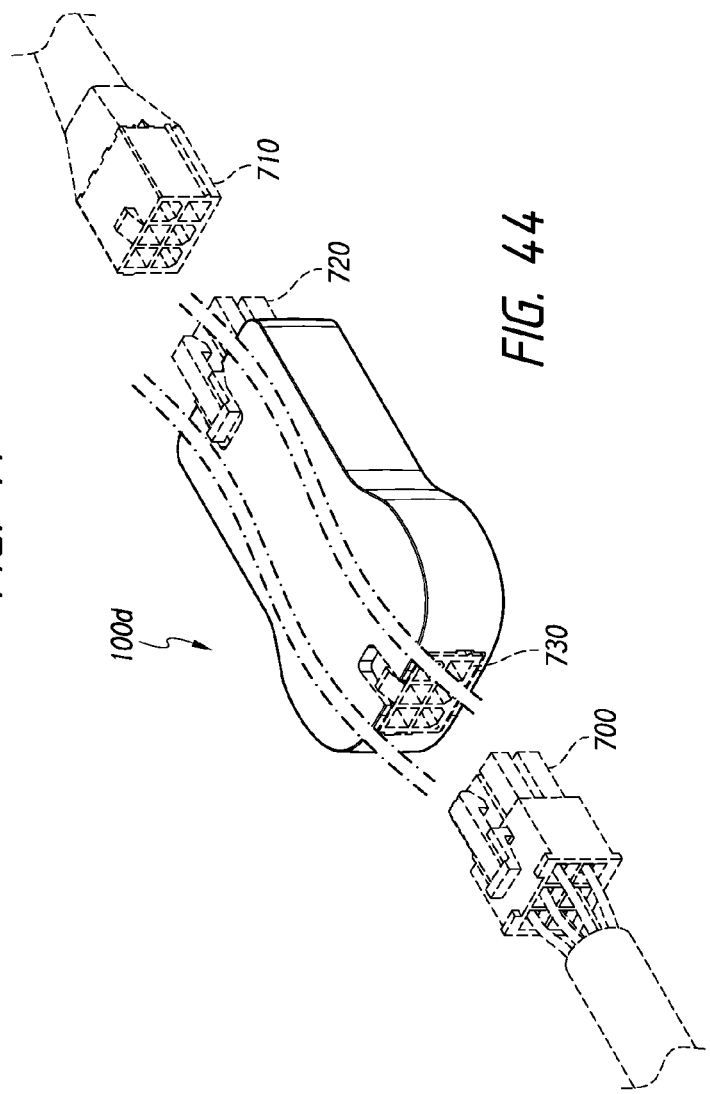
FIG. 44 is a perspective view taken from the first end of the in-line dongle adapter module of FIG. 38, the connectors and cables between which the in-line dongle adapter module is inserted being shown in broken lines for environmental purposes.
Figure 45:
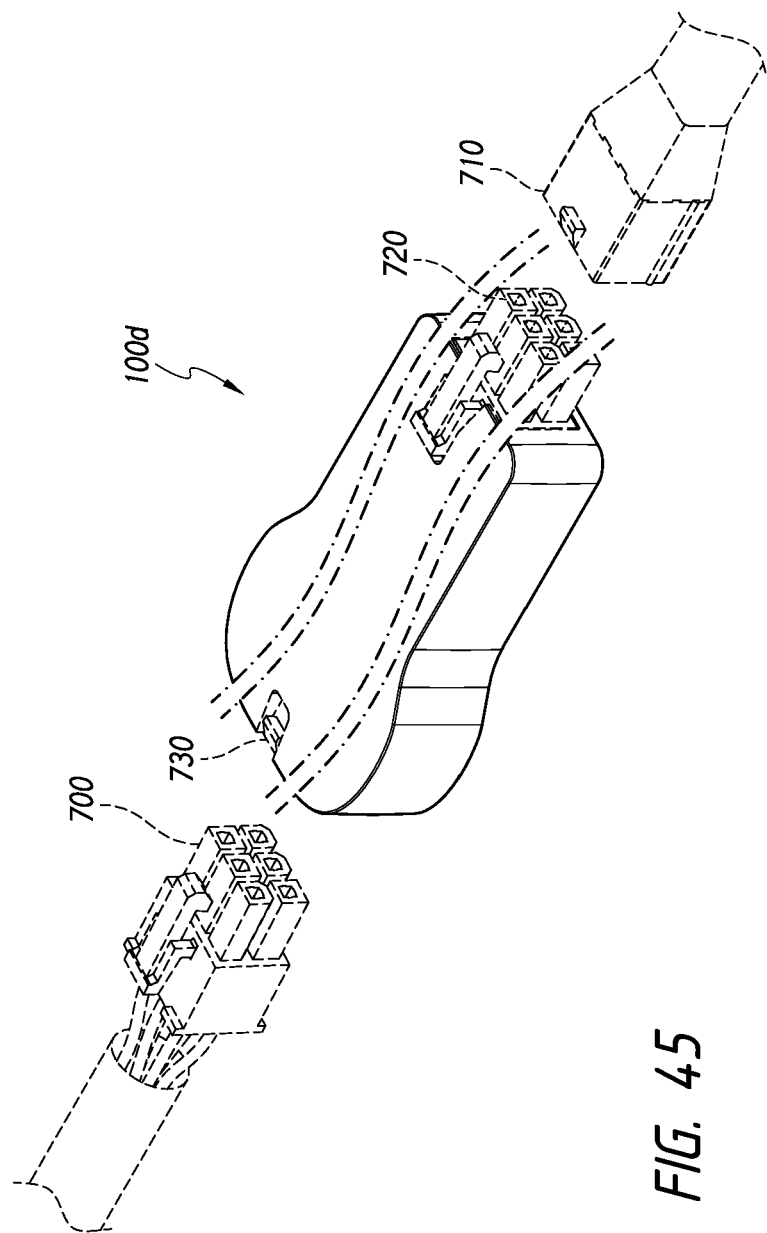
FIG. 45 is a perspective view taken from the second end of the in-line dongle adapter module of FIG. 38, the connectors and cables between which the in-line dongle adapter module is inserted being shown in broken lines for environmental purposes.
Figure 46:
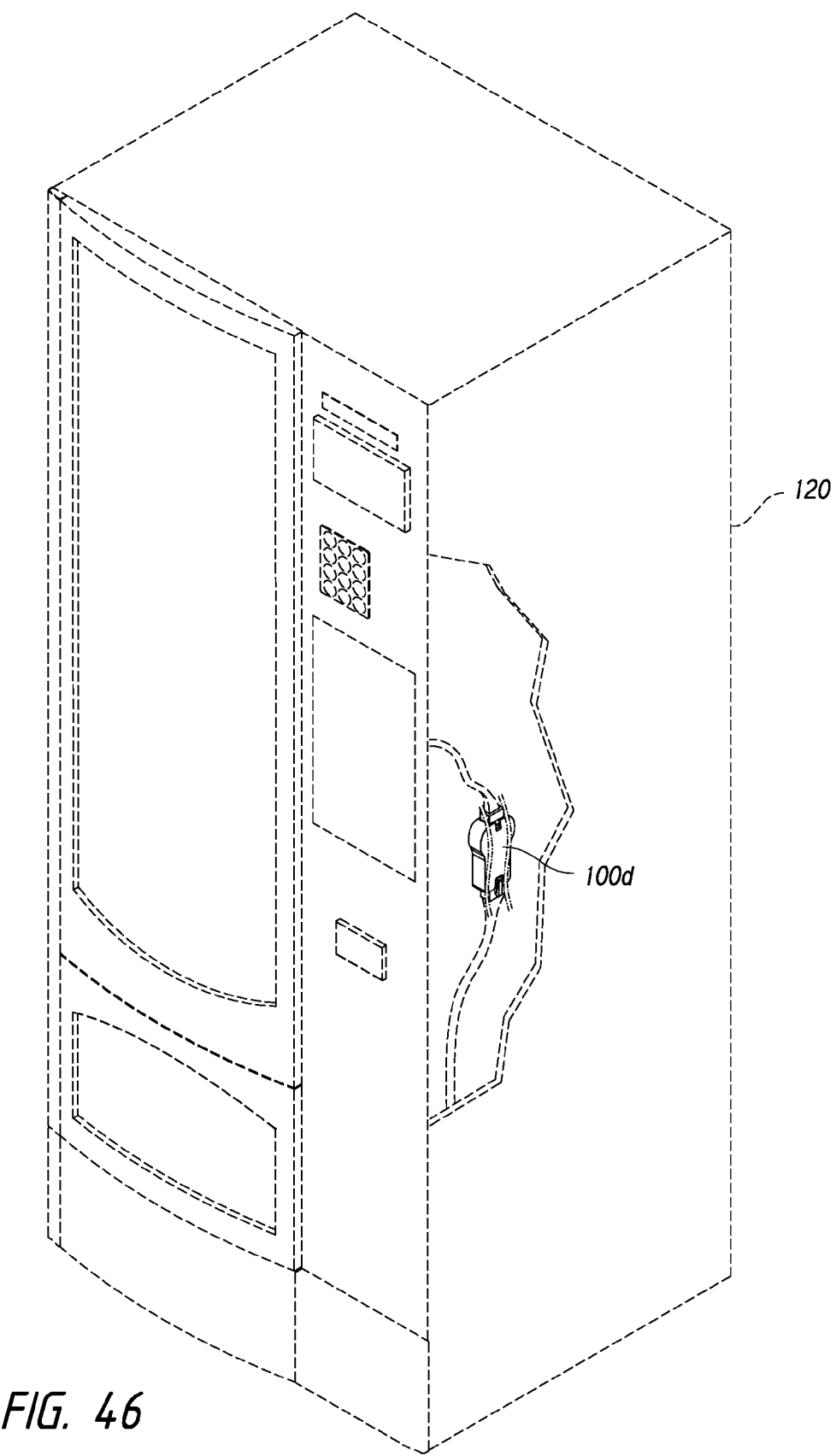
FIG. 46 is a perspective view of the in-line dongle adapter module of FIG. 38 within a vending machine.
Figure 48:
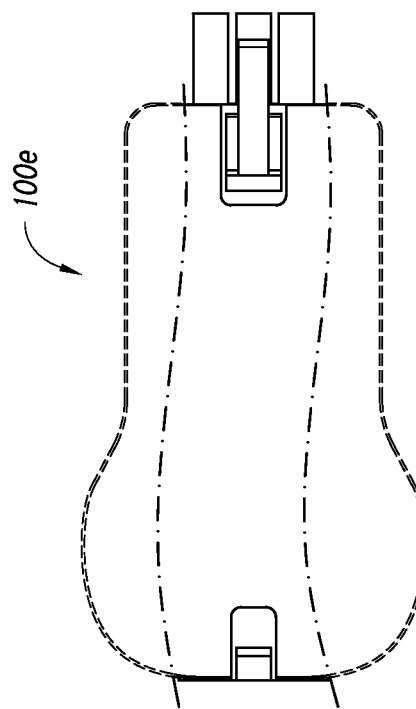
FIG. 48 is a front plan view of the in-line dongle adapter module of FIG. 47.
Figure 49:
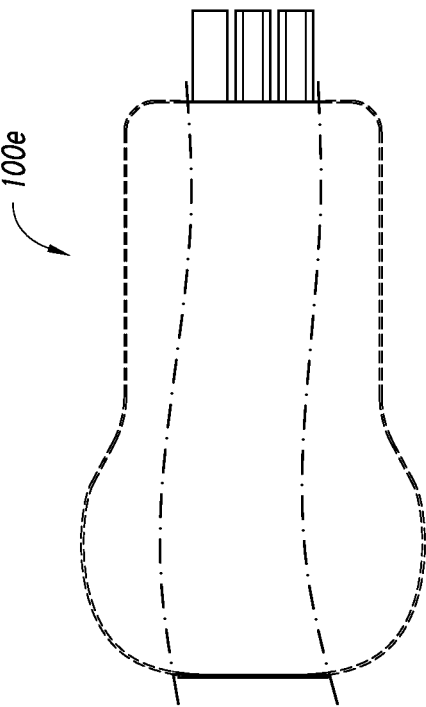
FIG. 49 is a back plan view of the in-line dongle adapter module of FIG. 47.
Figure 47:
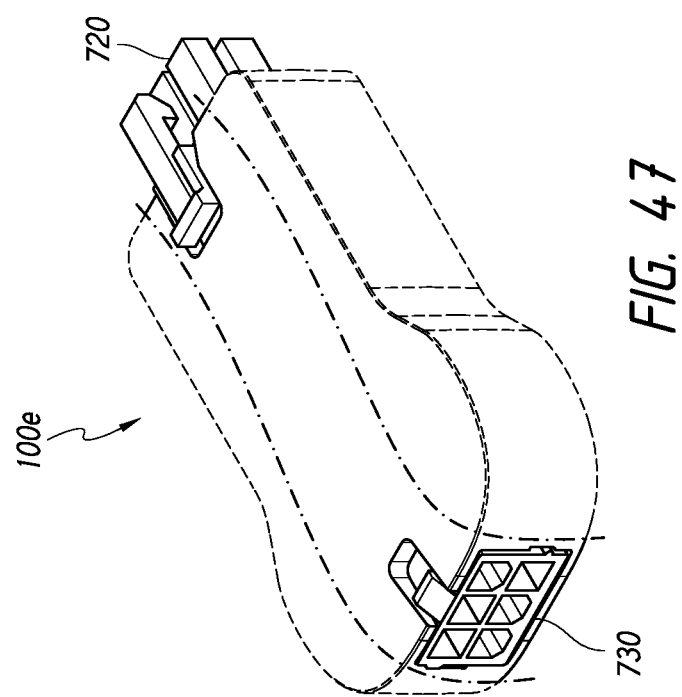
FIG. 47 is a perspective view of the exemplary fifth preferred in-line dongle adapter module and, specifically, the longitudinal center portion thereof, the dashed line depiction of the sides indicating the sides of the in-line dongle adapter module can be of any shape or curvature.
Figure 52:
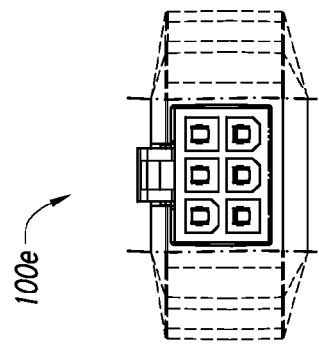
FIG. 52 is a second end view of a connector receptacle of the in-line dongle adapter module of FIG. 47.
Figure 50:
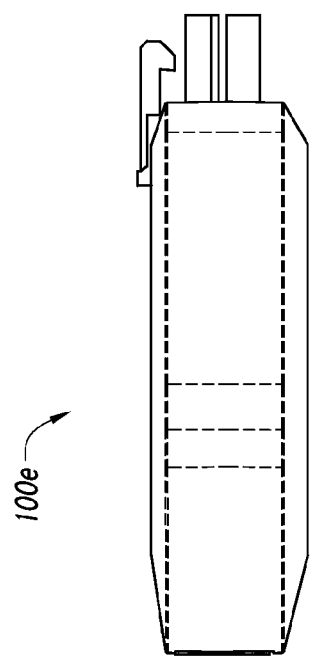
FIG. 50 is a side view of the in-line dongle adapter module of FIG. 47 in accordance with some implementations.
Figure 51:
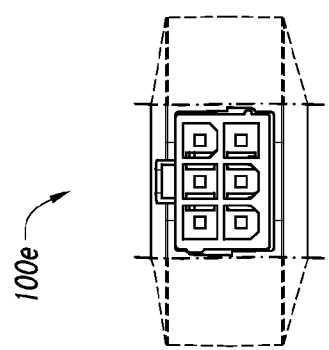
FIG. 51 is a first end view of a connector receptacle of the in-line dongle adapter module of FIG. 47.
Figure 53:
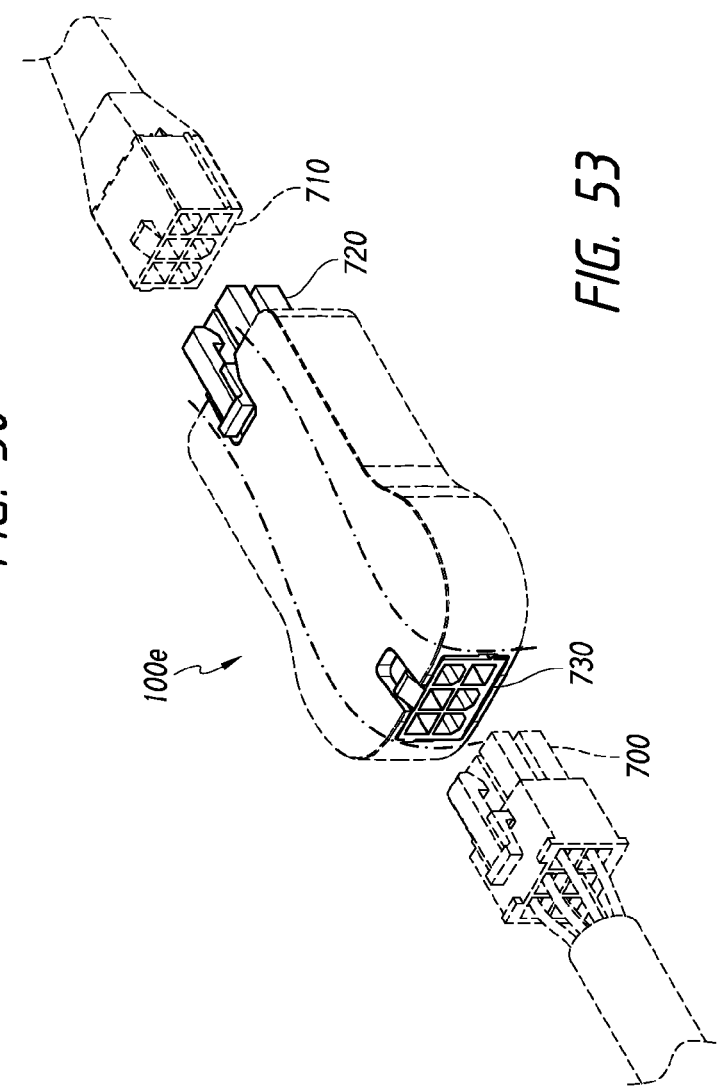
FIG. 53 is a perspective view taken from the first end of the in-line dongle adapter module of FIG. 47, the connectors and cables between which the in-line dongle adapter module is inserted being shown in broken lines for environmental purposes.
Figure 54:
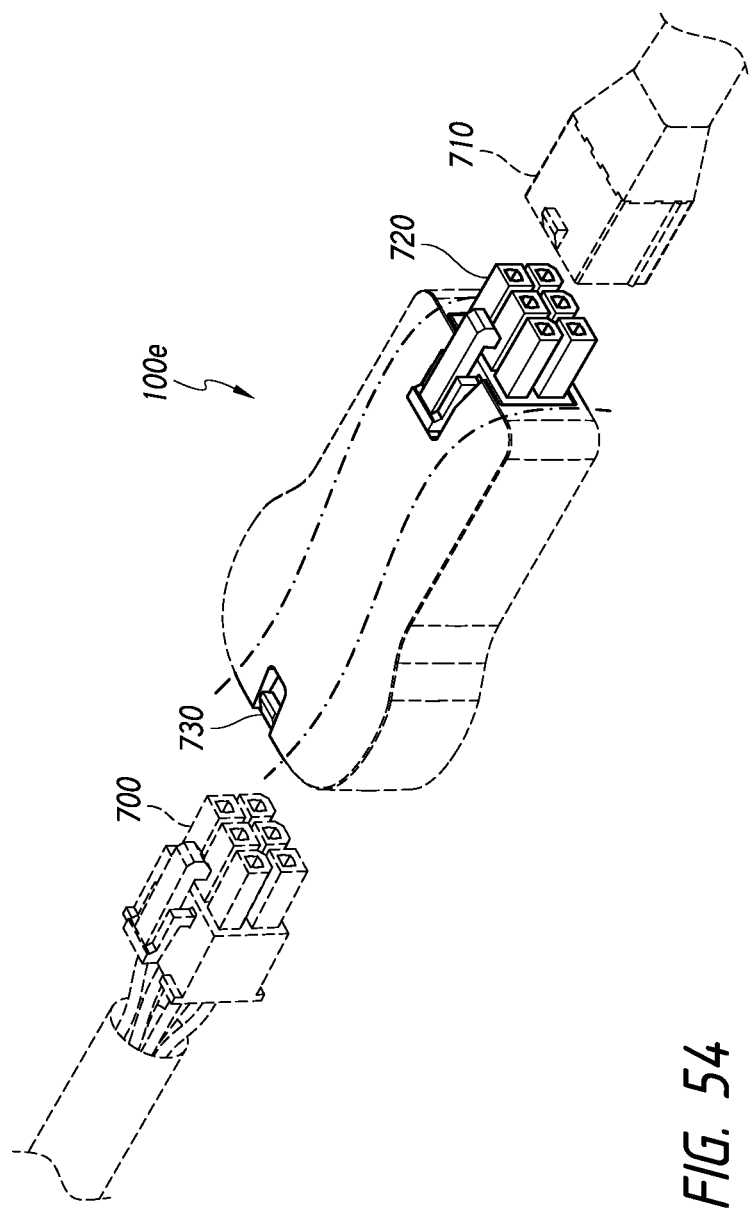
FIG. 54 is a perspective view taken from the second end of the in-line dongle adapter module of FIG. 47, the connectors and cables between which the in-line dongle adapter module is inserted being shown in broken lines for environmental purposes.
Figure 55:
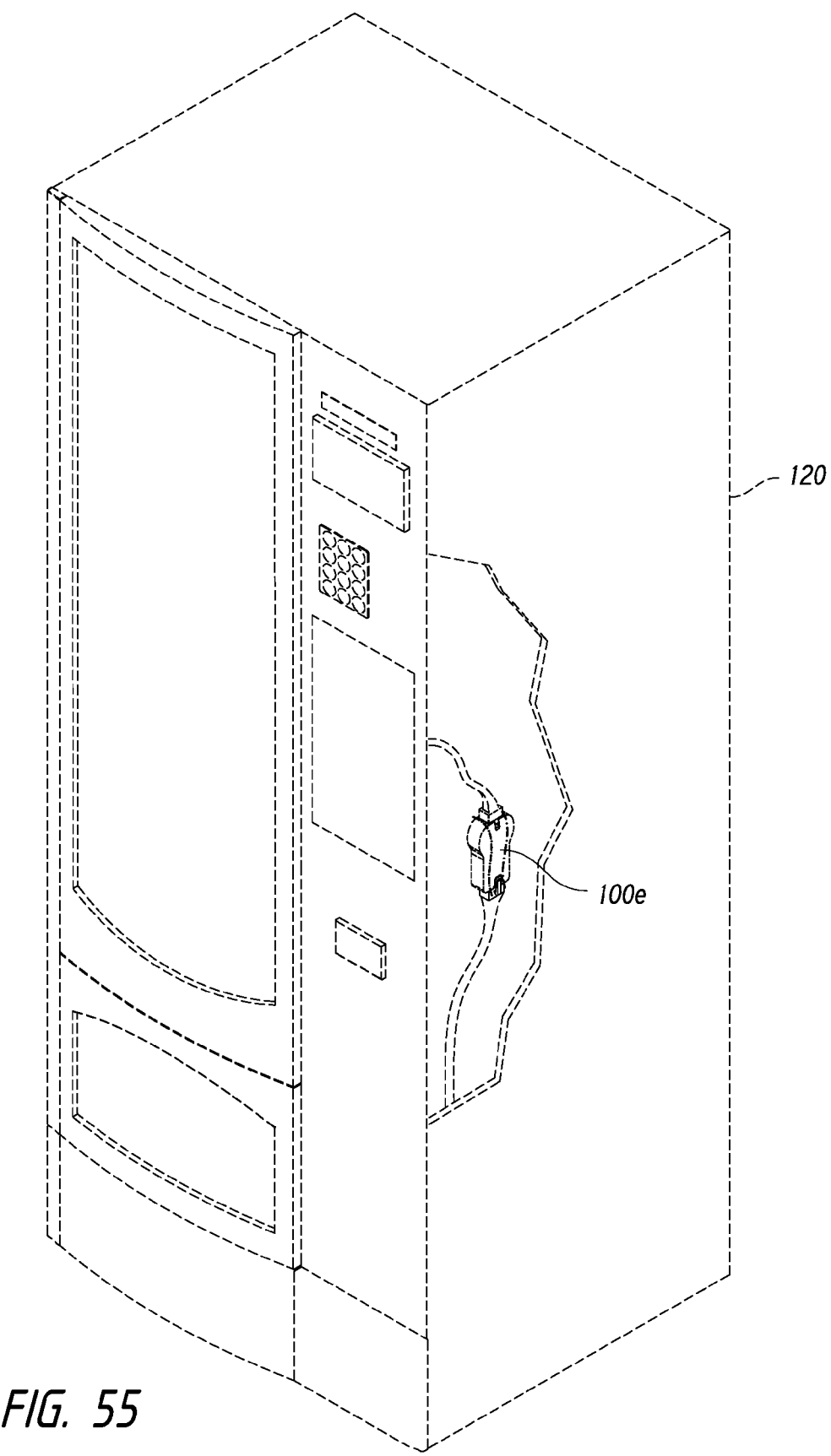
FIG. 55 is a perspective view of the in-line dongle adapter module of FIG. 47 within a vending machine.

The term "associated" is defined to mean integral or original, retrofitted, attached, connected (including functionally connected), positioned near, and/or accessible by. For example, if the user interface (e.g. a traditional display 122 (FIG. 19), a touch screen display 124 (FIG. 19), a key pad 126 (FIG. 19), buttons 126 (FIG. 19, shown as part of the key pad 126), a keyboard (not shown), and/or other input or output mechanism) is associated with a payment accepting unit 120, the user interface may be original to the payment accepting unit 120, retrofitted into the payment accepting unit 120, attached to the payment accepting unit 120, and/or a nearby the payment accepting unit 120. Similarly, adapter modules 100 may be associated with payment accepting units 120 in that the adapter modules 100 may be original to the payment accepting unit 120, retrofitted into the payment accepting unit 120, attached to the payment accepting unit 120, and/or a nearby the payment accepting unit 120.

It should be noted that relative terms are meant to help in the understanding of the technology and are not meant to limit the scope of the invention. Similarly, unless specifically stated otherwise, the terms used for labels (e.g. "first," "second," and "third") are meant solely for purposes of designation and not for order or limitation. The term "short" in the phrase "short-range" (in addition to having technology specific meanings) is relative to the term "long" in the phrase "long-range."

The terms "may," "might," "can," and "could" are used to indicate alternatives and optional features and only should be construed as a limitation if specifically included in the claims.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, or comprises A and B contains A and B, but optionally may contain C or additional components other than A and B). It should be noted that, unless otherwise specified, the singular forms "a," "an," and "the" refer to one or more than one, unless the context clearly dictates otherwise.

System Overview

Figure 5:
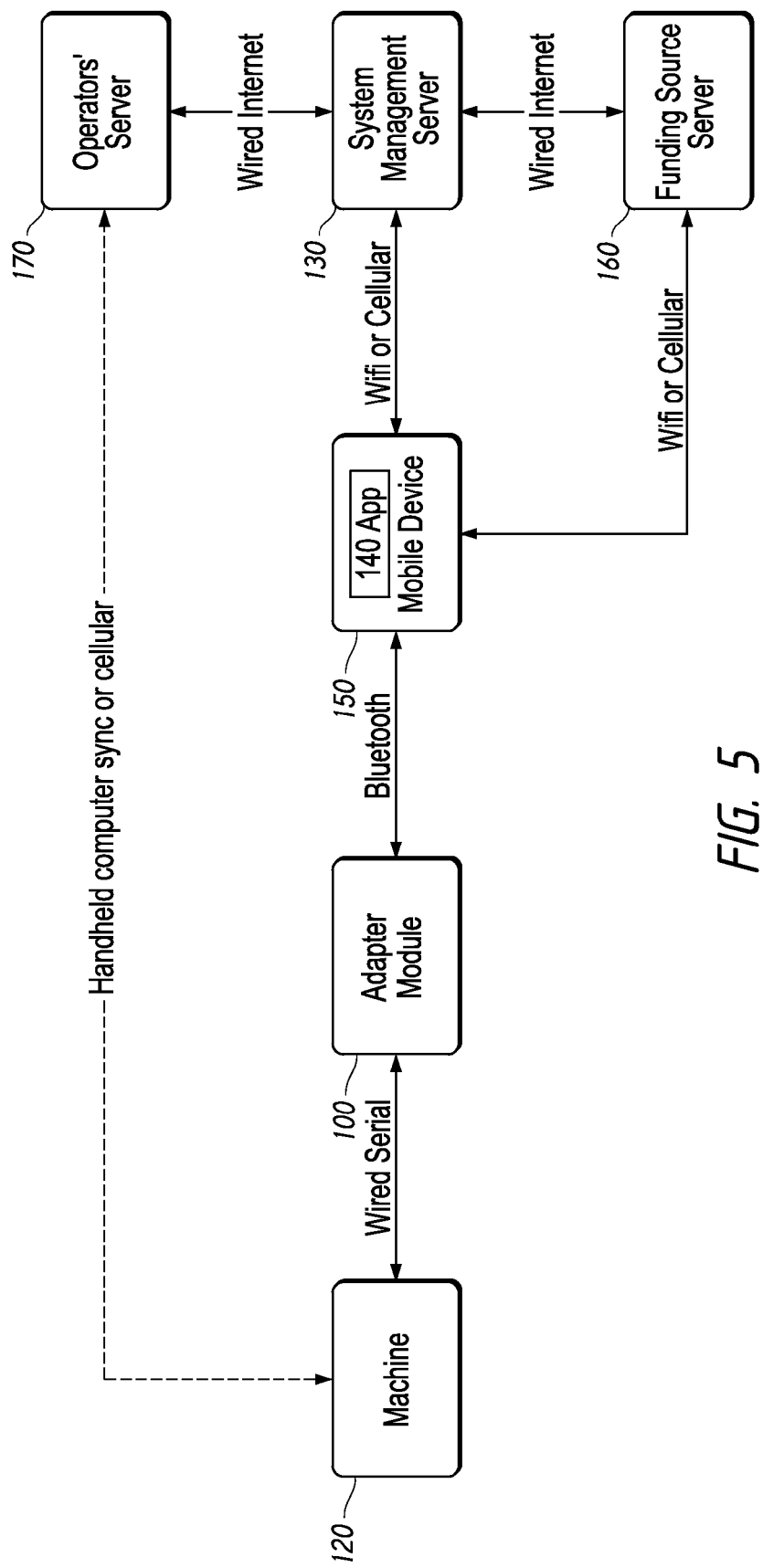
FIG. 5 is a block schematic that shows elements of the system including, but not limited to, the adapter module, the machine, the mobile device, and exemplary servers, as well as communications therebetween.
Figure 6:
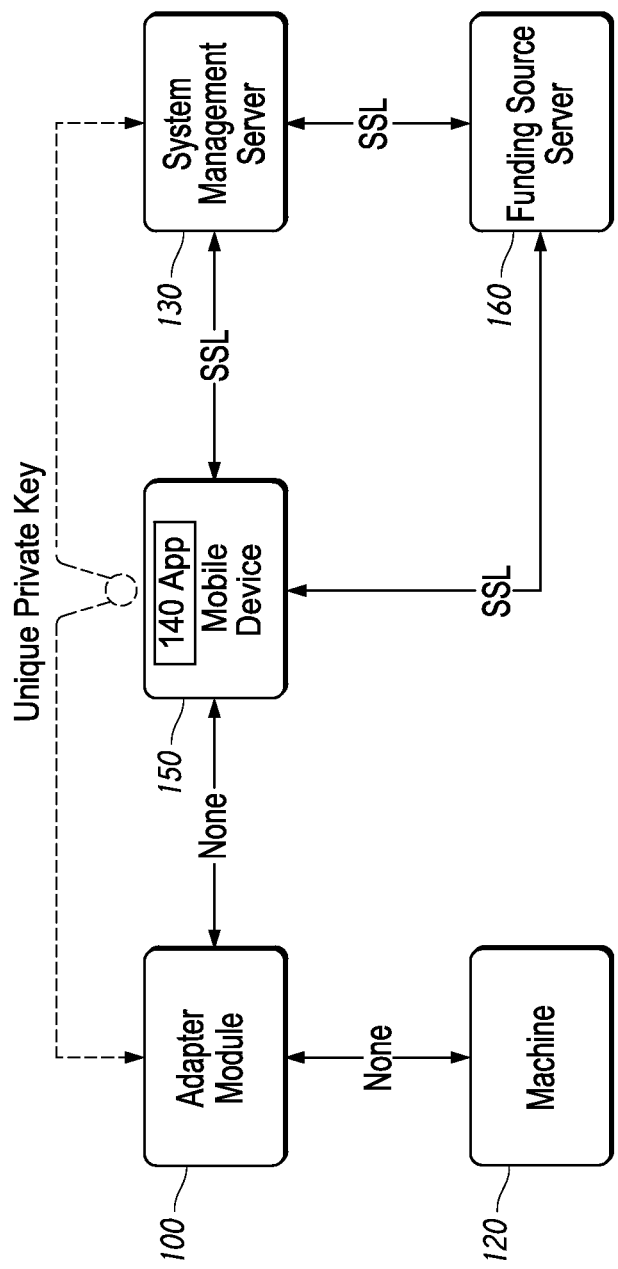
FIG. 6 is a block schematic that shows there are three areas of encryption used (each is bi-directional) between the adapter module, the machine, the mobile device, and/or exemplary servers.
Figure 7:
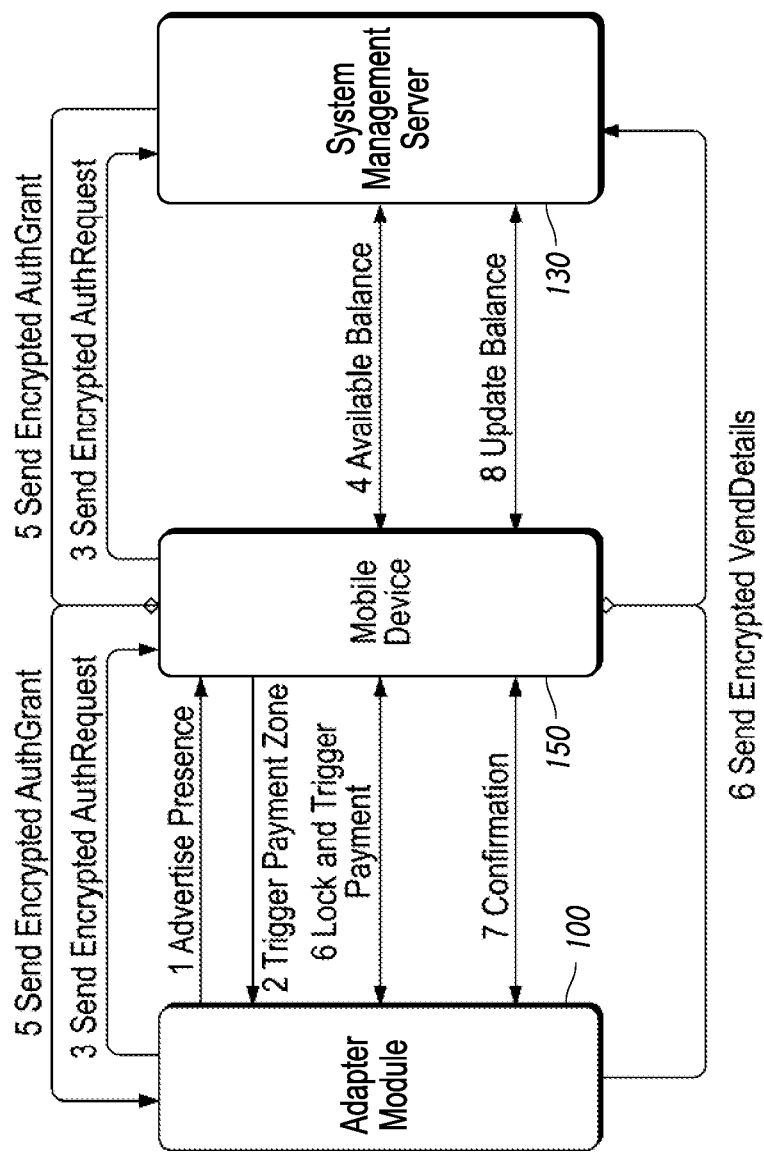
FIG. 7 is a block diagram that communications, messaging, vending sequence, and purchase flow between the adapter module, the mobile device, and a system management server.

FIGS. 5, 6, and 7 together show exemplary major components of the mobile-device-to-machine payment system and the interactions therebetwen.

As shown, the adapter module 100 functionally connected bi-directionally to the payment accepting unit 120 via a wired serial connection such that no security is necessary. The adapter module 100 is also functionally connected bi-directionally to the mobile device 150 (and its installed mobile application 140) via short-range communication technology (e.g. a Bluetooth connection). Because the mobile device 150 is not a "trusted" link (e.g. it could be hacked by a user), only secured communications (transmissions) are passed between the adapter module 100 and the mobile device 150. This keeps the passed communications secured and safe from hacking. The mobile device 150 (and its installed mobile application 140) is also functionally connected bi-directionally to a system management server 130 and/or a funding source server 160 via long-range communication technology (e.g. WiFi or Cellular connection) that preferably has appropriate security (e.g. SSL security). Security between the mobile device 150 and the system management server 130 has the advantage of protecting communications from the mobile device 150 to the system management server 130 that may include sensitive data and may not be encrypted. The system management server 130 and the funding source server 160 may be connected via a wired Internet connection with SSL security. The system management server 130 may be connected via a wired Internet connection with SSL security to an operators' server 170. Although not necessary to implement a purchase transaction, for other purposes (e.g. inventory), the operators' server 170 may be connected to the payment accepting unit 120 using a handheld computer sync or a cellular connection.

Also, a unique private key may be used to securely transmit encrypted messages between the adapter module 100 and the system management server 130 (although the encrypted transmissions would most likely be routed through the mobile device 150). The server 130 stores a private key for each adapter module 100, and this key is only known to the adapter module 100 and the server 130. No intermediary is privy to this key (especially not the mobile device 150). When the adapter module 100 and server 130 communicate messages (e.g. AuthRequest and AuthGrant), the security unit 755 of the adapter module 100 encrypts the message with its private key and passes the message to the mobile device 150. The mobile device 150 (which preferably cannot decrypt the message) passes the encrypted message to the server 130. The server 130 is able to decrypt the message using the security unit 955 of the adapter module 100 and the unique private key. The security unit 955 of the server 130 uses this same unique private key to encrypt messages to the adapter module 100 and sends the message to the mobile device 150 to relay to the adapter module 100 that is able to decrypt the message using the security unit 755 of the adapter module 100 and the unique private key.

FIG. 7 shows specific exemplary communications and messaging with an exemplary vending sequence (the numbers to the left of the communications and messaging) between the adapter module 100, the mobile device 150, and the system management server 130. These communications are discussed in more detail in the discussion pertaining to the timing schematics (FIGS. 8A-8G) and the flow charts (FIGS. 9A-9E).

It should be noted that FIGS. 5, 6, and 7 are meant to be exemplary and to help in the understanding of the mobile-device-to-machine payment system. For example, the shown long-range communications technology may be replaced with alternative long-range communications technology known or yet to be discovered, the shown short-range communication technology may be replaced with alternative short-range communication technology known or yet to be discovered, and the shown security may be replaced with alternative security known or yet to be discovered. The shown connections are meant to be exemplary in that, for example, there may be intermediaries that are not shown. The shown components have been simplified in that, for example, only one mobile device 150 (or machine 120, adapter module 100, or server 130) is shown where many may be included. Finally, the order of the steps may be changed and some steps may be eliminated.

Adapter Module

FIGS. 11-55 show exemplary adapter modules 100*a*-100*e* (referred to generally as adapter modules 100). These are relatively low cost hardware that are pre-configured to work with industry standard a multi-drop bus (MDB). On machines without MDB technology, the adapter module 100 can be configured or designed to work with other serial protocols or activate a switch. In essence the adapter module 100 simulates establishing payment on payment accepting unit 120 in much the same manner as other alternative forms of payment (e.g. cash).

The shown exemplary adapter modules 100 are preferably designed to be used as an in-line dongle for in-line insertion within, for example, a MDB of a machine 120. The wire used in MDB technology uses male and female connection ends or adapters to allow the attachment of peripherals. In the case of a vending machine, the wire with the connection ends or adapters would be present to allow the attachment of a payment receiving mechanism (e.g. a coin mechanism). The MDB male and female adapters 700, 710 may be separated (as shown in FIGS. 17, 18, 26, 27, 35, 36, 44, 45, 53, and 54). The adapter modules 100 have male and female adapters 720, 730. The adapter module may be plugged (inserted) in serial ("in-line") with the wire. For example, the MDB female adapter 710 may be connected to the male adapter 720 of the adapter module 100 and the MDB male adapter 700 may be connected to the female adapter 730 of the adapter module 100. The resulting in-line configuration is shown in FIGS. 19, 28, 37, 46, and 55. It should be noted that the adapter modules 100 are designed to allow pass-through communications so that if the mobile-device-to-machine payment systems is not enabled (e.g. for a particular purchase or simply turned off) the MDB functions as though the adapter module 100 is not there and the machine 120 can function normally.

Hands-Free

Summarily, if it is available, a hands-free mode, from the user's perspective, would allow the user to approach a favorite payment accepting unit 120 and notice that the display (e.g. the displays 122 or 124 shown in FIG. 19) associated with the payment accepting unit 120 shows funds available (e.g. the wallet balance), he would select the product or service using input mechanisms (e.g. buttons 126 or a touch screen display 124 shown in FIG. 19) associated with the payment accepting unit 120, and he would retrieve his dispensed services or products.

During an initial handshake with the mobile device 150 (when the user is within range), the adapter module 100 reports to the mobile device 150 whether or not hands-free mode is available. If it is available, the installed mobile application 140 automatically connects to the payment accepting unit 120 without the user having to interact with the mobile device 150. The user observes that funds are available on the display 122, 124 of the payment accepting unit 120 and completes the purchase transaction as if cash was inserted in the machine 120 by inputting his selection on the payment accepting unit 120. The payment accepting unit 120 dispenses the product or service. After the selection is made, the change is returned to the mobile device 150.

Whether hands-free payment is available is determined by factors including, but not limited to whether if other mobile devices 150 are in range, if other adapter modules 100 are in range, if there are any alerts, if the payment trigger threshold is having wide variances and so deemed unstable, or if the payment accepting unit operator (e.g. a vending machine operator) has opted to disable hands-free mode for the payment accepting unit 120. In the latter instance, operators can disable via a maintenance mobile device 150, as well as through the operators' server 170 and/or the system management server 130.

FIG. 3 is a table that showing exemplary considerations, conditions, or factors that may be used to determine whether the hands-free pay feature is available. Starting at the "Favorite?" column, this indicates whether the payment accepting unit 120 is a favorite machine. Preferably the hands-free pay feature is only available for use with "favorite" payment accepting units 120 (e.g. a vending machine at work or school). The "Alert" column has to do with whether there is some reason (e.g. there are too many users in range) that the hands-free pay feature should not work and, if there is such a reason, the user will be notified (alerted) and may be able to use the manual mode to resolve the alert and/or complete the transaction. FIG. 3 shows situations in which a user is or is not able to make hands-free purchases from a machine 120 using a mobile application 140 on his mobile device 150. It should be noted that the shown interface is meant to be exemplary. For example, some of the features could be automated or pre-selected. (It should be noted that the left hand column, the "Tab" column, relates to whether the selected tab on the mobile application 140 is "all" or "favorite." FIGS. 10A-10D all show these tabs. Unlike the other columns in FIG. 3, this column has more to do with the functionality and view of the application 140 than specifically with the hands-free feature. The tabs would allow a user to select whether he wanted to be alerted when he was in range of all payment accepting units 120 or just "favorite" payment accepting units 120 and the application 140 would show the appropriate view.)

Balance Display: An optional feature of the mobile-device-to-machine payment system that is particularly helpful in the hands-free mode (although it may be available in the manual mode and/or in a multiple-vend scenarios) is when the user's mobile device 150 sends "credit" to the payment accepting unit 120 (either via hands-free payment or through a manual swipe), the wallet balance is sent to the payment accepting unit 120 that is then displayed to the user on a display 122, 124 of the machine 120. This is particularly beneficial during hands-free mode when the user does not retrieve the mobile device 150 and, therefore, may not know the balance. Also, in a multiple-vend scenario the user would not have to calculate a remaining balance.

An exemplary hands-free and multiple-vend scenario with a balance display might be as follows: The user has $5.00 in his virtual wallet as that is the amount that has been authorized (the AuthGrant being stored on the mobile device 150). He walks up to the payment accepting unit 120 and $5.00 is displayed on the display 122, 124 of the payment accepting unit 120 since hands-free mode was enabled and credit was sent (e.g. via short-range communication technology) to the payment accepting unit 120. The user makes a selection of $1.50 by interacting (e.g. pressing buttons) with the machine 120. The item (product or service) is dispensed and the "change" is "returned" (e.g. via short-range communication technology) to the virtual wallet. But since user is still standing in the payment zone 102, the remaining wallet balance of $3.50 is sent to the payment accepting unit 120 and displayed so that the user can now see he has a $3.50 balance. (It should be noted that the authorized funds may remain on the machine 120 and not be transferred back to the mobile device 150 between transactions.) The user decides to purchase a $1.50 item, and the transaction is completed as usual (e.g. by interacting with the machine 120). Now the user is still standing in the payment zone 102 and he sees the wallet balance of $2.00 on the display 122, 124 of the payment accepting unit 120. Deciding he does not wish to purchase anything else, the user walks away. As he walks out of the payment zone 102, the credit is cleared from the machine 120. But he is left with the knowledge that his wallet balance is $2.00 even though he never touched the mobile device 150. Communications between the payment accepting unit 120 and the adapter module 100 (via the mobile device 150) handle the accounting incidental to the transaction. The remaining balance ($2.00) is technically stored on the server 130, and may be reflected on the application 140 on the mobile device 150.

Multiple Distinct Zones

As shown in FIGS. 1 and 2, the functions performed by the adapter module 100 can be divided into distinct zones: a first "communication zone" (e.g. "Bluetooth range" 106), a second "authorization zone" 104, and a third "payment zone" 102. The payment zone 102 (that can not be zero) is smaller than or equal to (overlapping completely) the authorization zone 104. (Put another way, the payment zone 102 is within or coextensive with the authorization zone 104.) The payment zone 102 is a subset of the authorization zone 104 with a ratio of the payment zone 102 to the authorization zone 104 ranging from 0.01:1 to 1:1. It is not necessarily a fixed ratio and can vary between different payment accepting units 120, different mobile devices 150, different users, and over time. While the zones 102, 104, 106 are depicted as having a uniform shape, the zones may not necessarily be uniform (or constant over time) in that the shape can vary. For example, the shape of the Bluetooth range 106 may vary depending on environmental conditions such as obstacles in the room and payment accepting unit 120 door/wall materials.

Bluetooth Range 106: The outermost range is the Bluetooth range 106. This is the area in which the adapter module 100 is able to broadcast its presence. In most situations, the Bluetooth range 106 is a passive range in that no actual data is exchanged between the mobile device 150 and the adapter module 100. While in the Bluetooth range 106, the mobile device 150 monitors the RSSI (Received Signal Strength Indicator).

Authorization Zone 104: The middle region is the authorization zone 104. This is a computed area based on the RSSI. As mentioned, the mobile device 150 monitors the RSSI while it is in the Bluetooth range 106. When the RSSI reaches a certain predetermined threshold based on In-Range Heuristics, the mobile device 150 can be considered to be in the authorization zone 104. In the authorization zone 104 the mobile device 150 establishes a connection to the adapter module 100 (e.g. a Bluetooth connection (FIG. 5) with SSL protection (FIG. 6)) and informs the adapter module 100 of its presence. After a successful handshake with the adapter module 100, the mobile device 150 registers the adapter module 100 and the adapter module 100 requests an authorization to the server 130 via the mobile devices' network connection (e.g. a WiFi or cellular connection (FIG.

5) with SSL protection (FIG. 6)). It is important to note the mobile device 150 and the adapter module 100 have a non-exclusive relationship at this point. The adapter module 100 may collect registrations for all mobile devices 150 that are within the authorization zone 104.

An authorization occurs in preparation for when the user enters the payment zone 102. An authorization expires in a set period of time (for example, five minutes), so if the mobile device 150 is still in the authorization zone 104 at the time of expiration, the adapter module 100 submits for and receives another authorization. This will continue for a set number of times (for example, the limit may be three times to limit cases of numerous authorizations for a mobile device that may remain in the authorization zone 104 for an extended period of time without completing a transaction). Should authorization fail (for instance if the limit had been reached) prior to the user entering the payment zone 102, the adapter module 100 will request authorization when the mobile device 150 enters the payment zone 102 (which adds a few seconds to the experience).

Payment Zone 102: As a user enters the payment zone 102, the mobile device 150 establishes exclusive control of the adapter module 100. Once established, any other user in the payment zone 102 is put into a "waiting" status.

In the payment zone 102, the payment can be triggered automatically if the system has and is in hands-free mode. In such instances, the mobile device 150 is running the app 140 in background mode and will send credit to the payment accepting unit 120 without any explicit user interaction. The user completes the transaction on the payment accepting unit 120 in much the same manner as if cash had been inserted into the payment accepting unit 120 to establish credit. After the user completes the transaction (that may include one or more purchases), details of the transaction are preferably returned to the mobile device 150 and server 130 in separate messages. The message to the server 130 is preferably encrypted with the adapter module's 100 private key (FIG. 6) to ensure data integrity. As shown in FIG. 7, the "private key" coded message (Encrypted VendDetails) is preferably sent via the mobile device 150. The message to the mobile device 150 may be sent solely for the purpose of closing the transaction. The transaction history and balance are updated server-side via the encrypted message sent to the server 130.

The other mode of operation is manual mode. In manual mode, the user launches the mobile device 150 and is able to swipe to send payment to the payment accepting unit 120. The user can also swipe back to cancel the payment. Like in hands-free mode, the purchase transaction is completed on the payment accepting unit 120 in the same manner as if cash were inserted into the payment accepting unit 120. The mobile device 150 is only used to send payment. Selection is made directly on the payment accepting unit 120.

Self-Calibrating Zone Threshold: A key, but optional feature, of the system is a self-calibrating payment zone RSSI threshold. Because RSSI can vary machine to machine, environment to environment, and device to device, having a fixed threshold at which payment is triggered can be problematic. The approach suggested herein is the creation of a self-calibrating threshold. When the user is interacting with the payment accepting unit 120 (such as when he makes his selection on the payment accepting unit 120), the payment accepting unit 120 notifies the adapter module 100 and the adapter module 100 logs the conditions such as RSSI, type of user mobile device 150, accelerometer data, and other information. It is at this point that it can be ascertained safely that the user is within arms-length from the payment accepting unit 120 (by necessity the user is arms-length because he is making some physical interaction with the payment accepting unit 120). This is the only point in the entire transaction in which it can be certain that the user is within arms-length from the payment accepting unit 120.

FIG. 4 shows a simplified set of exemplary steps involved when users enter the payment zone 102. Specifically, FIG. 4 shows that credit is established 200 (this may have been done in the authorization zone 104, but if not it would be handled in the payment zone 102), that the user makes a selection using the machine 202, that the machine notifies the adapter module of the selection 204, that the adapter module (optionally) logs the RSSI 206, and that the purchase process(es) continues 208. Using the historically logged RSSI data, the adapter module 100 calculates one of several "average" RSSI using various mathematical models. This "average" could be a traditional average, a moving average, a weighted average, a median, or other similar summary function. The adapter module 100 could pre-process the historical data before running the function, such as to eliminate top and bottom data points, suspect data points, etc.

Optionally, during the handshake between the mobile device 150 and the adapter module 100, the information transmitted to the adapter module 100 may include, for example, the model of the mobile device 150. Using the received information pertaining to the mobile device models, the adapter module 100 can create multiple payment thresholds, one for each mobile device model. This allows for variances that may be inherent in different types of Bluetooth radios. An alternative to this method is for the adapter module 100 to broadcast a baseline payment zone threshold, and the mobile device 150 can use an offset from this baseline based on its specific model type. The payment zone thresholds (or baseline offsets) can be unique to specific types of mobile devices (e.g. by manufacturer, operating system, or component parts), models of mobile devices, or individual mobile devices (unique to each user).

In a typical scenario in which the payment zone threshold has been calibrated, the adapter module 100 advertises its presence along with the threshold at which it considers any mobile device 150 to be in the authorization zone 104. This is a one-way communication from adapter module 100 to mobile device 150. Once the mobile device 150 enters the authorization zone 104, there is a handshake that is established between the adapter module 100 and the mobile device 150. During this handshake, the mobile device 150 can share its model information with the adapter module 100, and the adapter module 100 can return the payment zone 102 threshold for that specific model.

Optionally, in addition to calibrating the payment zone threshold, the adapter module 100 can apply the self-calibrating model to the authorization zone 104 to calibrate the authorization zone threshold. As with the payment zone thresholds, the authorization zone thresholds can be unique to specific types of mobile devices, models of mobile devices, or individual mobile devices. In this scenario, the adapter module 100 would broadcast multiple thresholds by device type and the mobile device 150 would determine which threshold to apply (or alternatively broadcast a baseline and the mobile device 150 uses an offset based on its device model). Even in this scenario, the authorization zone 104 is a one-way communication.

Optionally, along with the threshold that is calculated (in the payment and/or the authorization zone(s)), a safety margin can be added to minimize scenarios in which a user is within range, but the mobile-device-to-machine payment systems do not recognize it because the threshold may not have been reached. For example, if the calculated RSSI for an iPhone 5 on machine 4567 is −68 db, the mobile-device-to-machine payment systems may add a safety margin of −5 db, and establish the threshold at −73 db. So when a user's phone is communicating with the adapter module 100 at an RSSI of −73 db or better, the mobile-device-to-machine payment systems will allow the mobile device 150 to credit the payment accepting unit 120. The safety margin can be set on the server 130 and downloaded to the adapter module 100, or set on the mobile device 150, or set on the adapter module 100 itself.

Optionally, in the payment zone threshold, the mobile device 150 can use other data to determine when to cancel the exclusive control of the payment accepting unit 120, to identify when the user is moving out of the payment zone 102. External data could include accelerometer data from the mobile device 150. Using that data, the mobile device 150 can determine whether the user is standing relatively still in front of the payment accepting unit 120, or if the user is in motion—effectively walking away from the payment accepting unit 120.

Signal Unavailability Adaptation

The mobile-device-to-machine payment systems described herein use a mobile device's 150 short-range communication technology (shown as Bluetooth mechanisms 876 in FIG. 57) and a mobile device's 150 long-range communications technology (shown as Cellular and/or WiFi mechanisms 872 in FIG. 57). The short-range communication technology 876 communicates with the adapter module's 100 short-range communication technology (shown as Bluetooth mechanisms 776 in FIG. 56). The long-range communications technology 872 communicates with the server's 130 communication technology (not shown). The mobile device 150 (with a mobile application 140 thereon) acts as a communication bridge between the adapter module 100 (associated with a payment accepting unit 120) and the server 130. This process is described herein and works properly if there is cellular or WiFi coverage within the payment zone 102.

One option if there is no cellular or WiFi coverage within the payment zone 102 is to determine whether there is cellular or WiFi coverage within the authorization zone 104 or the Bluetooth range 106. If there is, then the sizes of the zones 102, 104, 106 could be adapted and the timing could be adapted. For example, if the mobile devices 150 detected problems with the cellular or WiFi coverage within the payment zone 102, the user could carry his mobile device 150 into the other zones (or the mobile device 150 could use short-range communication technology to communicate with other mobile devices 150 within the authorization zone 104 or the Bluetooth range 106) to determine whether the zones have cellular or WiFi coverage. If they do have coverage, communication between the mobile device 150 and the server 130 can be advanced (conducted earlier when the mobile device 150 is further from the machine 120) or delayed (conducted later when the mobile device 150 is further from the machine 120). This can be thought of as changing the size or shapes of the zones 102, 104, 106. The timing would also have to be adjusted so that the authorization of funds (AuthGrant) does not expire before the user has a chance to make a purchase. It also means that balance updates to the server 130 may happen after the user has moved away from the machine 120 and has cellular or WiFi coverage again.

Another option if there is no cellular or WiFi coverage within any of the zones 102, 104, 106 is for the user to obtain authorization while outside of the zones in a place with cellular or WiFi coverage. This may occur, for example, if a user knows that he will be going to a place with a payment accepting unit 120 equipped with an adapter module 100 (perhaps to a favorite payment accepting unit 120) that does not have (or rarely has) cellular or WiFi coverage. A user may also use the mobile application 140 to query payment accepting units 120 in a given range (e.g. within 50 miles) or at a given location (e.g. at a campground or in a particular remote city) to determine whether there is cellular or WiFi coverage within the zones 102, 104, 106. The user can then obtain pre-authorization from the server 130 using the mobile application 140. Again, the timing would also have to be adjusted so that the authorization of funds (AuthGrant) does not expire before the user has a chance to make a purchase. It also means that balance updates to the server 130 may happen after the user has moved away from the machine 120 and has cellular or WiFi coverage again. A mobile-device-to-machine payment system having the ability to implement this option would be able to accept cashless payments without requiring any network connection near the payment accepting unit 120. Mobile-device-to-machine payment systems described herein that are located in a remote location where no signal is available, therefore, can accept cashless payments.

As an example of a situation in which there might be no cellular or WiFi coverage within any of the zones 102, 104, 106 of a particular payment accepting unit 120, the user (a teenager) may be traveling to a remote location to attend summer camp where there is no cellular or WiFi coverage. The camp may have several payment accepting units 120 (e.g. a machine that creates a dedicated "hot spot" that requires payment for use, vending machines, or machines for renting equipment (e.g. bikes, kayaks, or basket balls)). The camp facility might notify parents that the mobile-device-to-machine payment system is available. The parents, while at home, could obtain authorization for a particular amount (that could be doled out a certain amount per day or limited to type of machine or location) to be authorized and "loaded" into the user's mobile device 150 and specify that the authorization will not expire for a certain period or until a certain date. Thereafter, while at camp, the user could use the mobile application 140 on his mobile device 150 in a manner similar to those discussed elsewhere herein. Short-range communications may be used for communications between the adapter modules 100 (associated with the machines 120) and users' mobile devices 150.

One subtle but powerful component of the systems described herein is that they require internet network connection only in the authorization zone 104 and only for the time period required to send the AuthRequest and receive the AuthGrant. Once a valid AuthGrant is received by the mobile device 150, an internet network connection is not required by either the mobile device 150 or the adapter module 100 in the payment zone 102 as long as the AuthGrant is valid (unexpired). This mechanism allows the system to seamlessly handle authenticated transactions in (temporary) offline mode, with the deferred acknowledgement and transaction messages performing the bookkeeping and cleanup when network connection is regained. The alternatives described above provide a unique way to artificially extend the authorization zone to include any location where the mobile device 150 can communicate with the server 130.

Multiple User Resolution

As shown in FIG. 2, in likely practical scenarios, there will be multiple users in the zones 102, 104, 106. As shown, users 1, 2, and 3 are in the payment zone 102 near the machine 120, users 5 and 6 are shown as positioned between the authorization zone 104 and the Bluetooth range 106, users 4 and 7 are in the Bluetooth range 106, user 10 is positioned on the edge of the Bluetooth range 106, and users 8 and 9 are positioned outside of Bluetooth range 106. The mobile-device-to-machine payment systems provide for managing, and resolving issues pertaining to multiple users.

Users 4 and 7 are within the Bluetooth range 106 and user 10 is either entering or leaving the Bluetooth range 106. Within the Bluetooth range 106 the users' mobile devices 150 are able to see the adapter module's 100 advertisement. In this zone, the mobile device 150 preferably does not initiate a connection. The adapter module 100 is preferably unaware of the users in the Bluetooth range 106. All the adapter module 100 is doing is advertising its presence to any multitude of users that may be in Bluetooth range 106.

The adapter module 100 begins to log users as the users (and their respective mobile devices 150) enter the authorization zone 104 (shown in FIG. 2 as users 5 and 6). At this point, there is a non-exclusive connection initiated by the mobile device 150 to the adapter module 100. It does a handshake (e.g. to exchange information needed to obtain authorization and, optionally, to log information needed for a self-calibrating authorization zone threshold) and the mobile device 150 contacts the server 130 for an authorization (e.g. sending an AuthRequest and receiving an AuthGrant). The adapter module 100 registers all mobile devices 150 that have requested and received AuthGrants. The adapter module 100 continues communicating with any other mobile device 150 that enters the authorization zone 104. After initial contact, the adapter module 100 may provide the mobile device 150 with a deferral delay of when to check back in with the adapter module 100 allowing opportunity for other mobile devices 150 to communicate with the adapter module 100.

If there is only one user in the payment zone 102, a purchase transaction may be performed. If there are multiple users in the payment zone 102, the mobile-device-to-machine payment system must handle the situation.

One optional exemplary solution for handling the situation of the multiple users in the payment zone 102 is queuing users in the payment zone 102. Once any mobile device 150 enters the payment zone 102, it establishes exclusivity to a particular mobile device 150 (first come first serve). Technically, however, the adapter module 100 is not establishing an exclusive connection to the mobile device 150. The adapter module 100 can still perform a round-robin poll and communicate with and advertise to other mobile devices 150. Instead, the adapter module 100 establishes a queue prioritized by RSSI and time (e.g. who was first and whether the authorization has expired) and it notifies (e.g. alerts) other mobile devices 150 to wait. The earliest valid (unexpired) authorization takes precedence when there is any tie in the RSSI. Otherwise, for example, the strongest average RSSI takes priority. Preferably the queue is not a static measure of the RSSI but an averaged measure over the period of time in the queue. This compensates for a scenario in which a user may be walking around in the queue and then shows up at the payment accepting unit 120 just as the previous user is finishing. If another user was also in the payment zone 102 and stood there the entire time, but may have newer authorization, he could win out.

Anytime that the adapter module 100 cannot determine exactly which user is in the payment zone 102 in front of the payment accepting unit 120, the adapter module 100 will disable hands-free payment. The mobile device 150 will send an alert to the user and he can use swipe to pay (manual mode). All users in payment zone 102 will show "Connected" and the first to swipe payment to the payment accepting unit 120 then locks out other users.

Multiple Module Resolution

In the scenario where there are multiple modules present, determining which payment accepting unit 120 a user is in front of can be a challenge. The mobile-device-to-machine payment systems described herein allow for adapter modules 100 to communicate to other adapter modules 100 in range via Bluetooth. Each user receives authorization grants for specific payment accepting units 120. This means if there are multiple adapter modules 100 within the same authorization zone 104, there will be multiple authorization grants for the user. When the user enters the payment zone 102, it can be difficult to differentiate which payment accepting unit 120 the user is in front of if the payment zones 102 overlap.

To solve this problem, when the user enters the payment zone 102, the adapter modules 100 communicate with each other to determine the RSSI for the particular user (based on the signal from his mobile device 150) to triangulate which adapter module 100 (and the associated payment accepting unit 120) is closer to the user. Optionally, the inter-module communications can restrict the user to establishing an exclusive connection with only one payment accepting unit 120.

Optionally, when the user connects to a payment accepting unit 120, the mobile device 150 can send a communication to the payment accepting unit 120 for momentary display to the user on the display 122, 124 of the payment accepting unit 120. For example, the mobile device 150 can send a communication (e.g. "connected" or "Fred's Mobile Device Connected") to the payment accepting unit's display 122, 124 for a predetermined period of time (e.g. 1-3 seconds) so when the user is in payment zone 102, it is clear which payment accepting unit 120 the user is connected to prior to making a purchase (either in hands-free or manual mode).

In addition, when the user is in manual mode, the mobile device 150 can display (e.g. on the touch screen 152 as shown in FIGS. 10A-10D) a visual indication of the payment accepting unit 120 (e.g. a picture and/or a payment accepting unit ID of the payment accepting unit 120) for visual confirmation. If the user is in manual mode, the user can manually change the payment accepting unit 120.

Descriptive Scenario

FIG. 7, FIGS. 8A-8G, and 9A-E (as well as other figures) can be used to understand a detailed exemplary scenario of the mobile-device-to-machine payment systems described herein. An exemplary flow of communications and steps are loosely described below with reference to these (and other figures). It should be noted that alternative scenarios could include, for example, a modified order of the steps performed.

Prior to vending transactions, a user downloads a mobile app 140 onto his mobile device 150, creates an account, and configures a funding source via, for example, a funding source server 160. A funding source may be, for example, a debit card, a credit card, campus cards, rewards points, bank accounts, payment services (e.g. PayPal®) or other payment option or combination of payment options known or yet to be discovered. The funding sources may be traditional and/or nontraditional payment sources that are integrated into the ecosystem described herein and then used indirectly as a source of funds. Funds from the funding source are preferably held on the server 130 such that when an AuthRequest is received by the server 130, the server 130 can send an AuthGrant authorizing funds for a purchase.

The user can specify one or more "favorite" adapter module(s) 100 (that has a one-to-one relationship to the payment accepting unit 120) that he may visit regularly, such as a vending machine at school or work. Favorite adapter modules 100 appear on a pre-filtered list and allow for additional rich features such as hands-free payment.

Figure 8A:
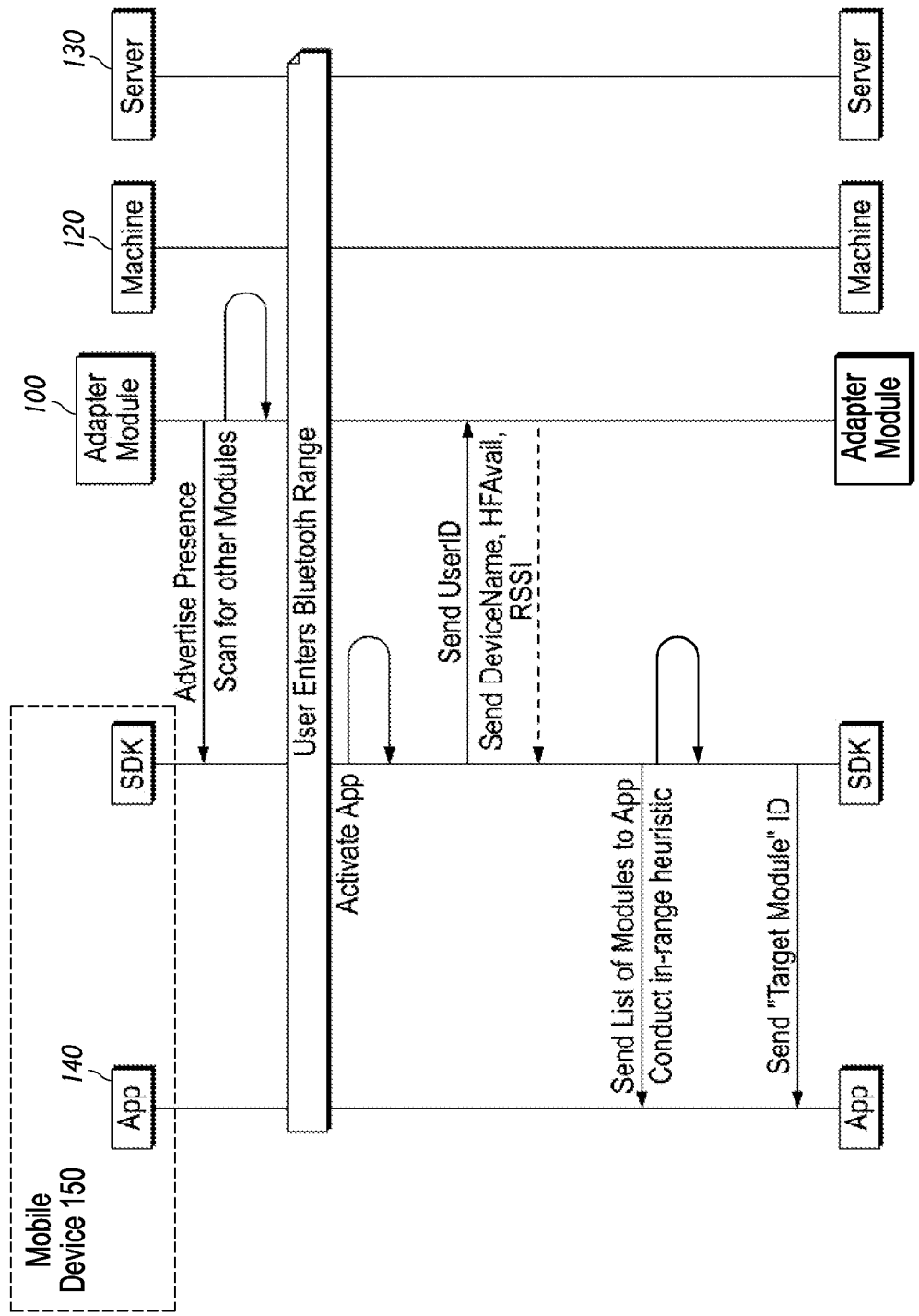
FIG. 8A is a timing schematic diagram that shows additional elements and features of the system including, but not limited to, communications medium, messaging, vending sequence, and purchase flow, when the user enters the communication zone (Bluetooth Range).

The payment accepting unit 120 may be equipped with an adapter module 100 that is constantly advertising its availability via Bluetooth (or other "signals," "communications," and/or "transmissions"). This ongoing advertising and scanning for adapter modules is shown in FIG. 8A. As shown, the mobile device 150 is continuously scanning for any adapter module 100 within Bluetooth (or other "signal," "communication," and/or "transmission") range. When the user is within range of that adapter module 100, the mobile device 150 tracks and monitors the signal strength until a predetermined "authorization zone" threshold is achieved.

Figure 8B:
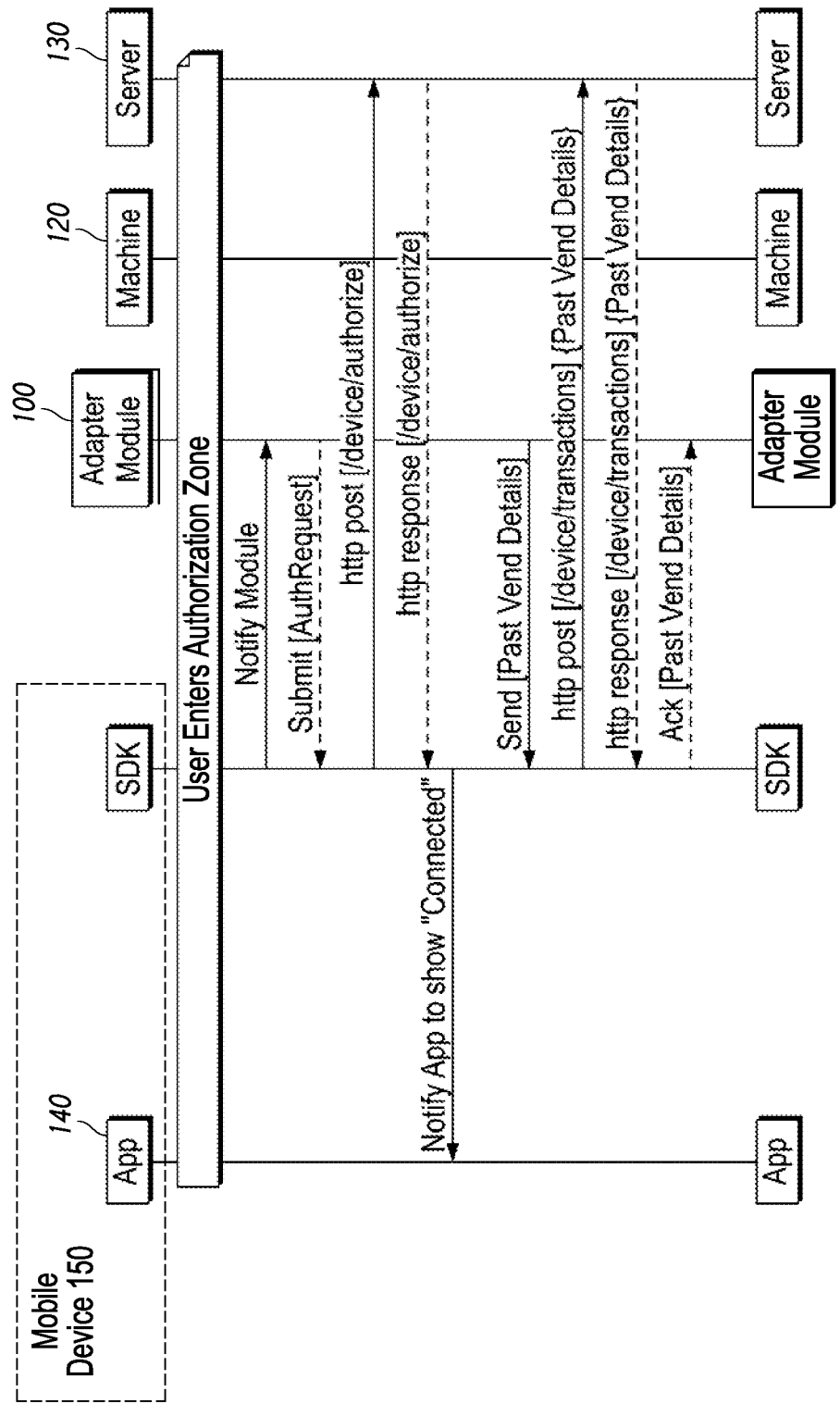
FIG. 8B is a timing schematic diagram that shows additional elements and features of the system including, but not limited to, communications medium, messaging, vending sequence, and purchase flow, when the user enters the Authorization Zone.
Figure 9A:
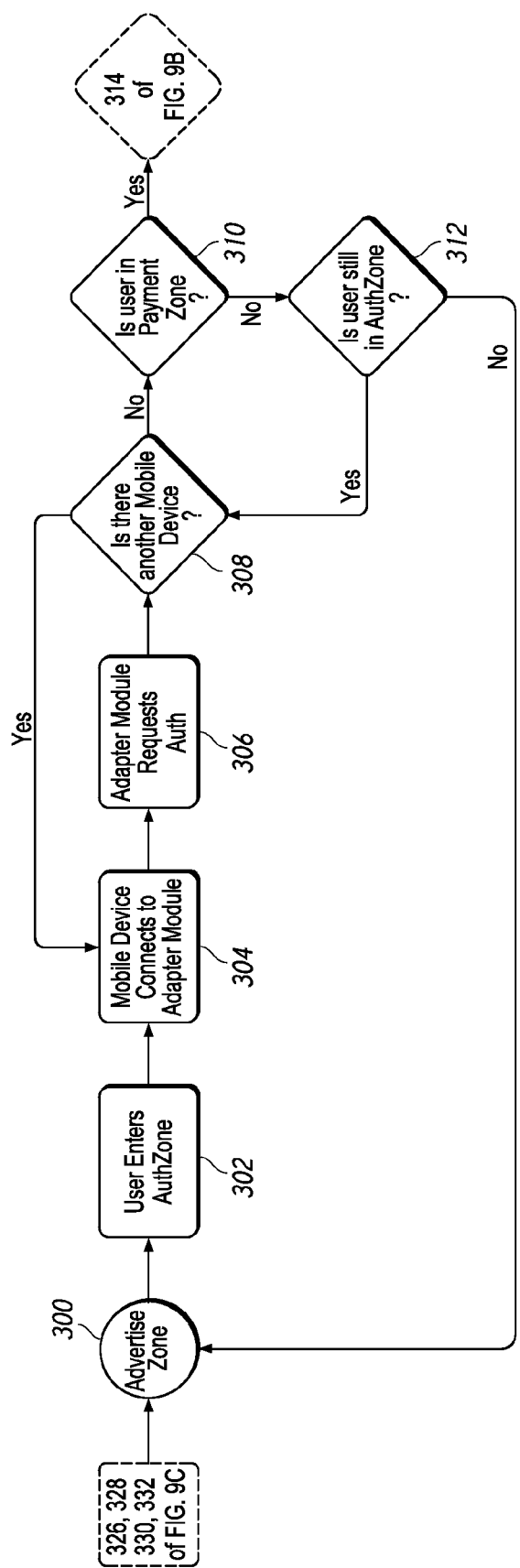
FIGS. 9A-9E are flow charts that show exemplary steps and features of the system including, but not limited to, communications, messaging, vending sequence, and purchase flow.

FIGS. 8B and 9A generally show that when the authorization zone threshold is reached, the mobile device 150 enters the authorization zone (block 302) and registers the adapter module 100. The mobile device 150 connects to the server 130 (block 304). The app 140 on the mobile device 150 creates a request for authorization (AuthRequest) and passes the AuthRequest to the server 130 using appropriate communication technology (e.g. cellular or WiFi) (block 306). The server 130 responds with an authorization grant (AuthGrant) encrypted with the specific adapter module's private key (block 306). This authorization token may minimally include the User1 D, Apparatus1 D (for the adapter module 100), authorization amount, and expiration time. The mobile device 150 receives the AuthGrant from the server 130, and retains it until the mobile device 150 is ready to issue payment to an adapter module 100. The mobile device 150 collects all pending AuthGrants that may be one or more depending on how many adapter modules 100 are in-range. Unused AuthGrants that expire are purged from the mobile device 150 and the server 130. It is important to note that the mobile device 150 is unable to read the AuthGrant because it is encrypted with the adapter module's unique private key that is only known to server 130 and adapter module 100. This provides a preferred key element of security in the system as the adapter module 100 only trusts AuthGrants that are issued by the server, and the AuthGrants cannot be read or modified by the mobile device 150 or any other party in between the server and the adapter module 100. Additional mobile devices 150 may enter the authorization zone 104 (block 308).

As the user approaches a specific adapter module 100, the user enters the payment zone 102 and an event threshold is triggered based on heuristics performed by the mobile device 150. Blocks 310 and 312 show the loop steps of waiting for a mobile device 150 from the authorization zone 104 to enter the payment zone 102. If the user leaves the authorization zone 104 without entering the payment zone 102, the adapter module 100 returns to advertising its presence (block 300).

Figure 8C:
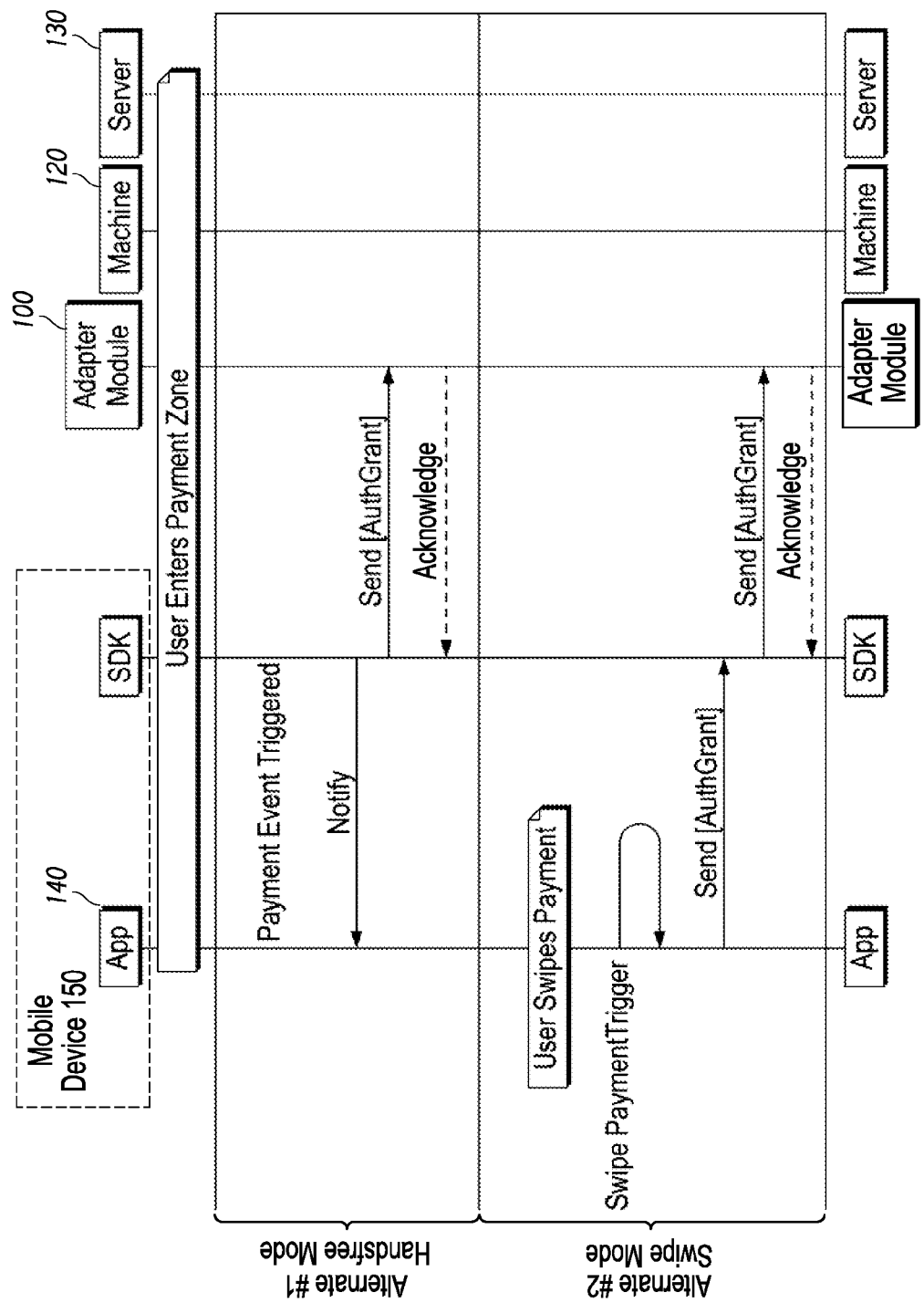
FIG. 8C is a timing schematic diagram that shows additional elements and features of the system including, but not limited to, communications medium, messaging, vending sequence, and purchase flow, when the user enters the Payment Zone and, in particular, detailing the hands-free mode alternative and the swipe mode alternative.
Figure 9B:
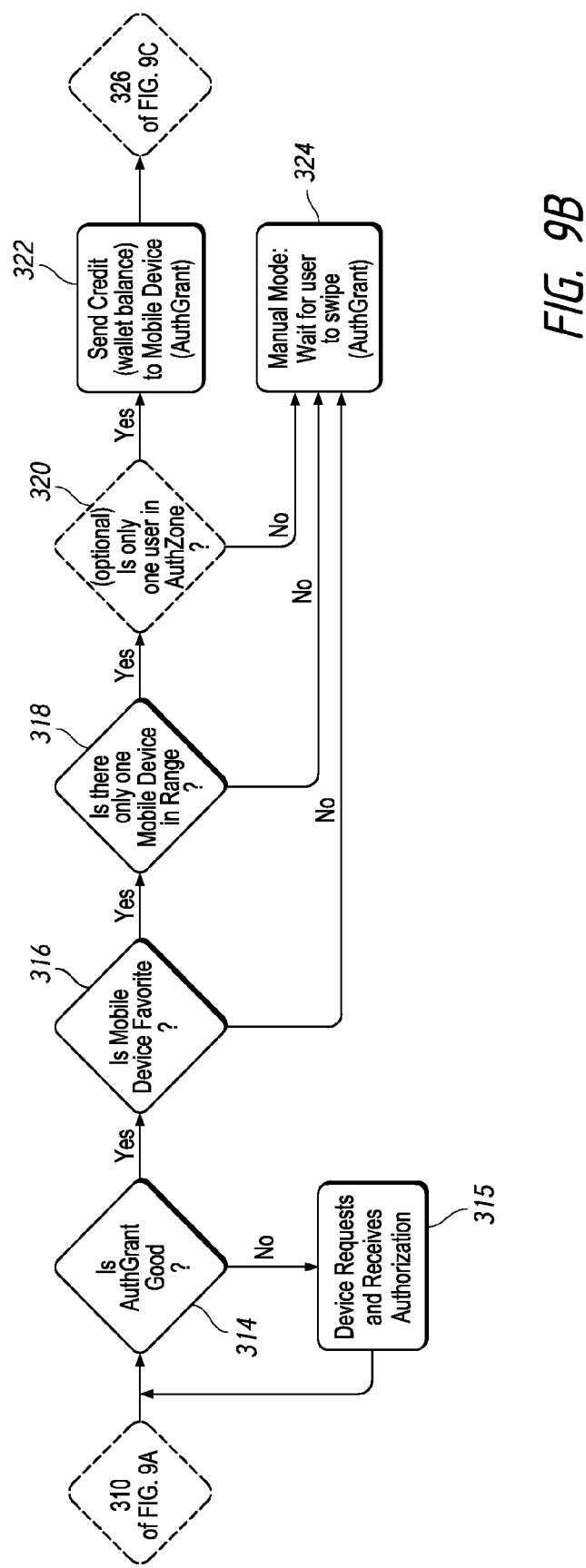

FIGS. 8C and 9B generally show the user entering the payment zone. The mobile device 150 verifies that it has an unexpired and valid AuthGrant. If the AuthGrant is not good, it may be requested again, repeating the Auth Request process (block 315). If the AuthGrant is good, the mobile device 150 sends the valid AuthGrant (including the wallet balance (block 322)) to the adapter module 100 to initiate a transaction. The mobile device 150 may issue the AuthGrant automatically without specific user interaction if the hands-free mode is supported (and the device is a favorite (block 318), there is only one device in the payment zone 102 (block 318), and (optionally) there is only one user in the authorization zone 104 (block 320). If any of these factors are not present, the mobile device 150 will prompt and/or wait for the user to begin the transaction manually (block 324).

Figure 8D:
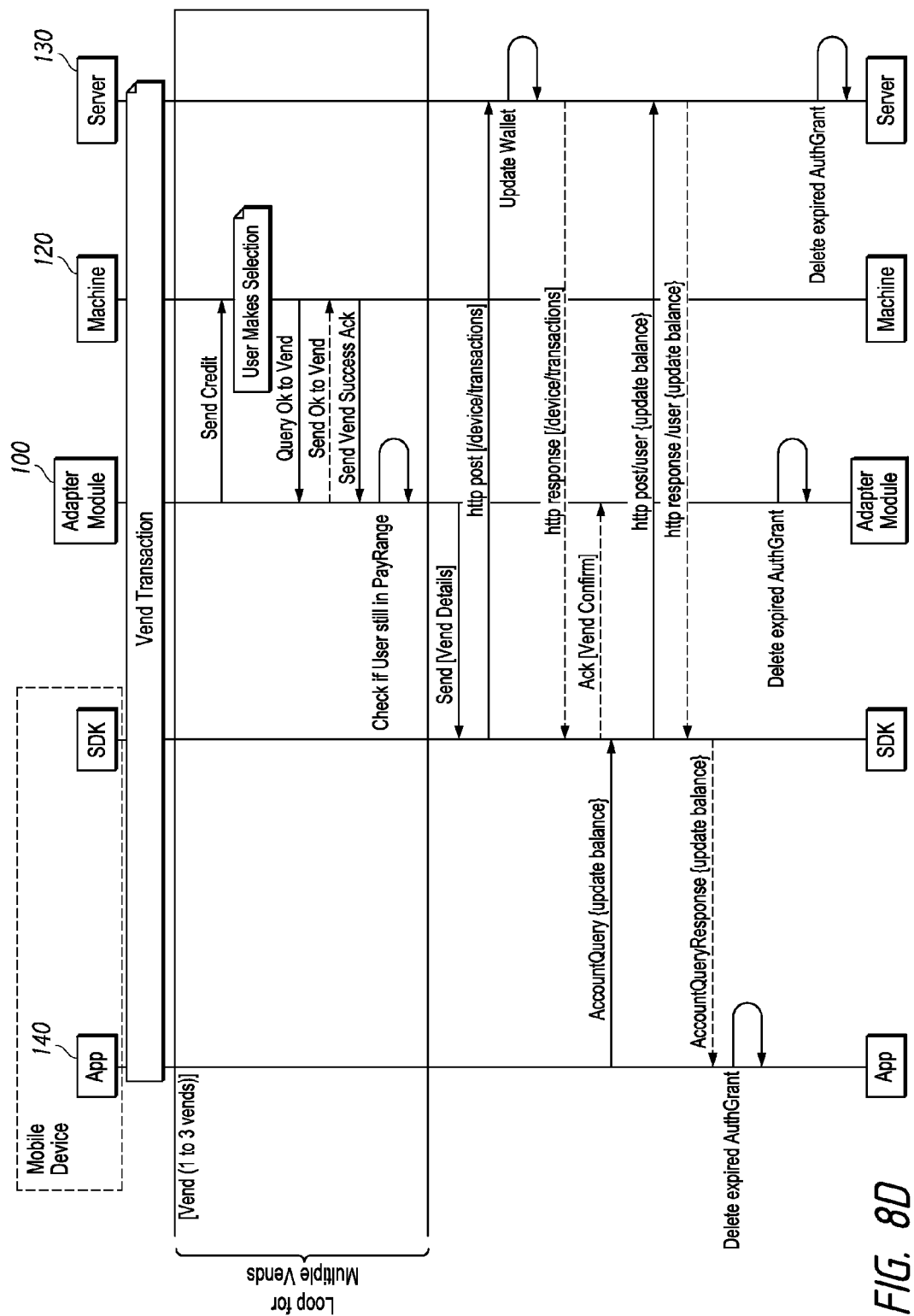
FIG. 8D is a timing schematic diagram that shows additional elements and features of the system including, but not limited to, communications medium, messaging, vending sequence, and purchase flow, in a vending transaction including a loop for multiple transactions.
Figure 9C:
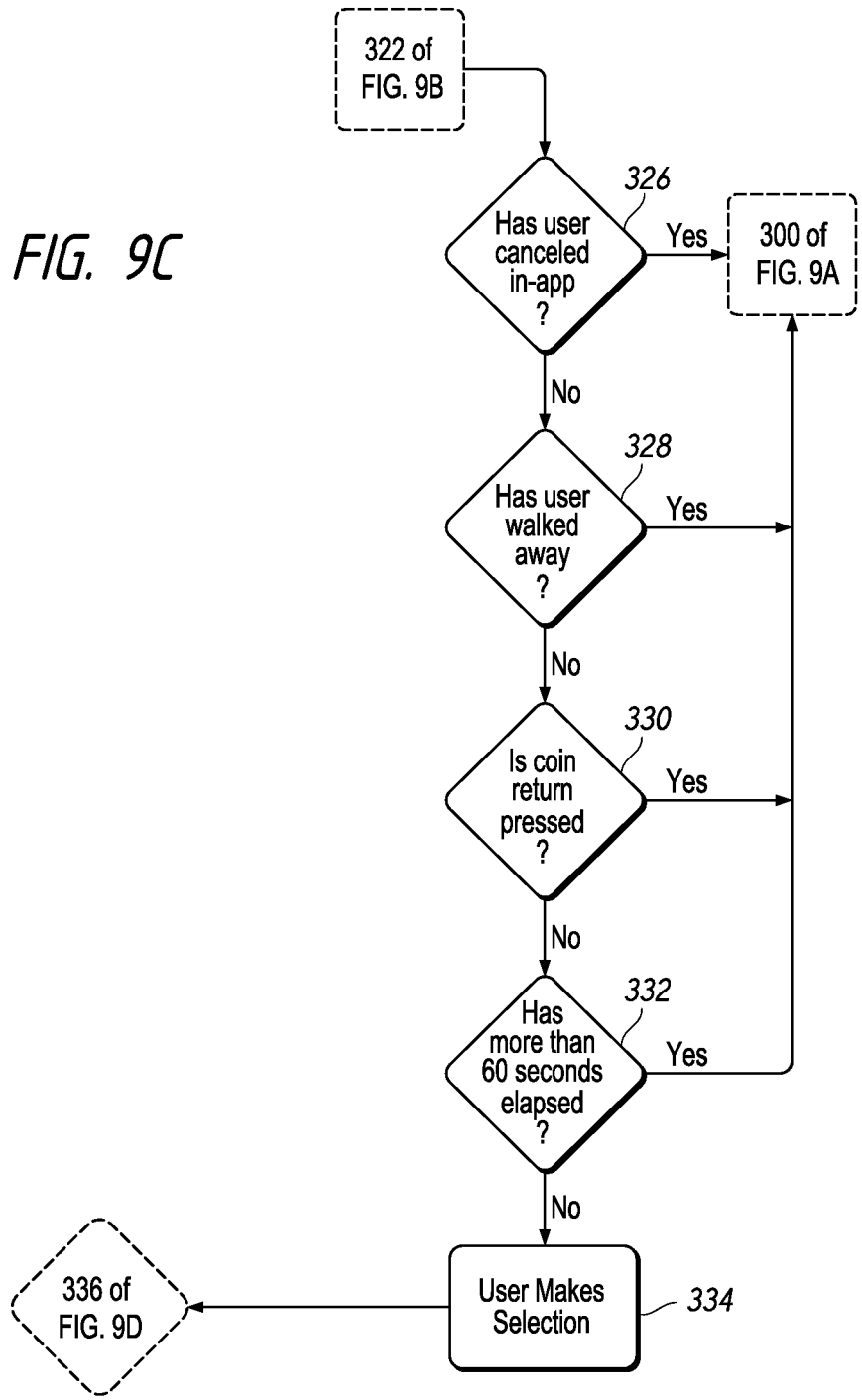
Figure 9D:
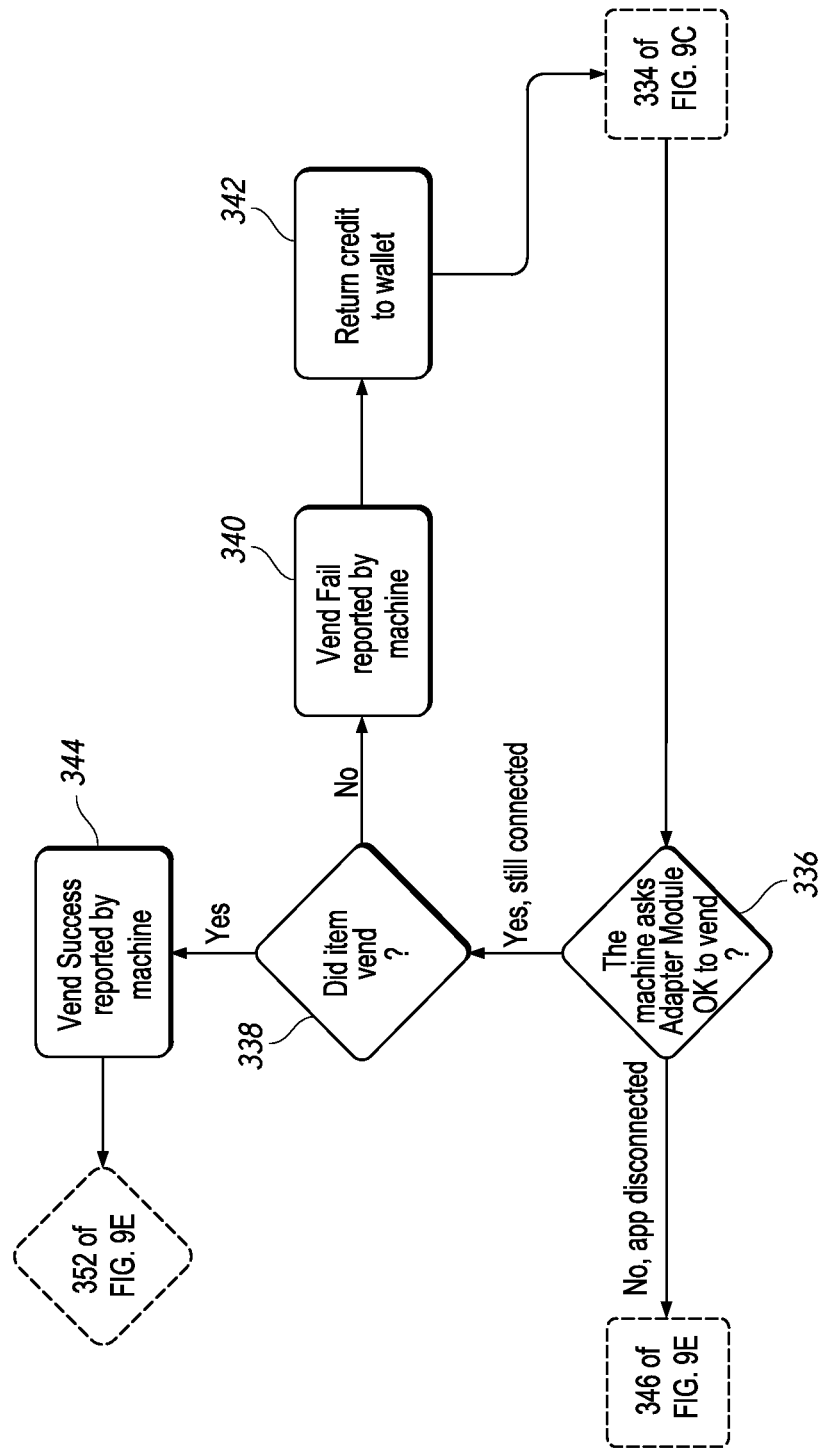

FIGS. 8D, 9C, and 9D generally show the transaction process. As shown in FIG. 9C, the adapter module 100 runs through a series of questions to determine if there are any issues that would prevent vending including: has the user canceled in-app? (block 326), has the user walked away? (block 328), is the coin return pressed? (block 330), has more than a predetermined period of time elapsed? (block 332). If the answer to any of these questions is "yes," the transaction does not proceed. If the answers to all of these questions is "no," the user makes a selection (block 334) on the payment accepting unit 120 in the same or similar manner as compared to if cash or credit were presented to the payment accepting unit 120. If the machine 120 is able to vend (block 336), it attempts to release the product. If the vend fails (block 338) it is reported by the machine (block 340) and a credit is returned to the virtual wallet (block 342). If the vend is successful (block 338) it is reported by the machine (block 344). Put another way, after the transaction is complete, the adapter module 100 returns to the mobile device 150 the details of the transaction as well as an encrypted packet containing the vend details to be sent to the server 130 via the mobile device 150. Optionally, the adapter module 100 can pass additional information not directly related to the transaction such as payment accepting unit health, sales data, error codes, etc.

Figure 9E:
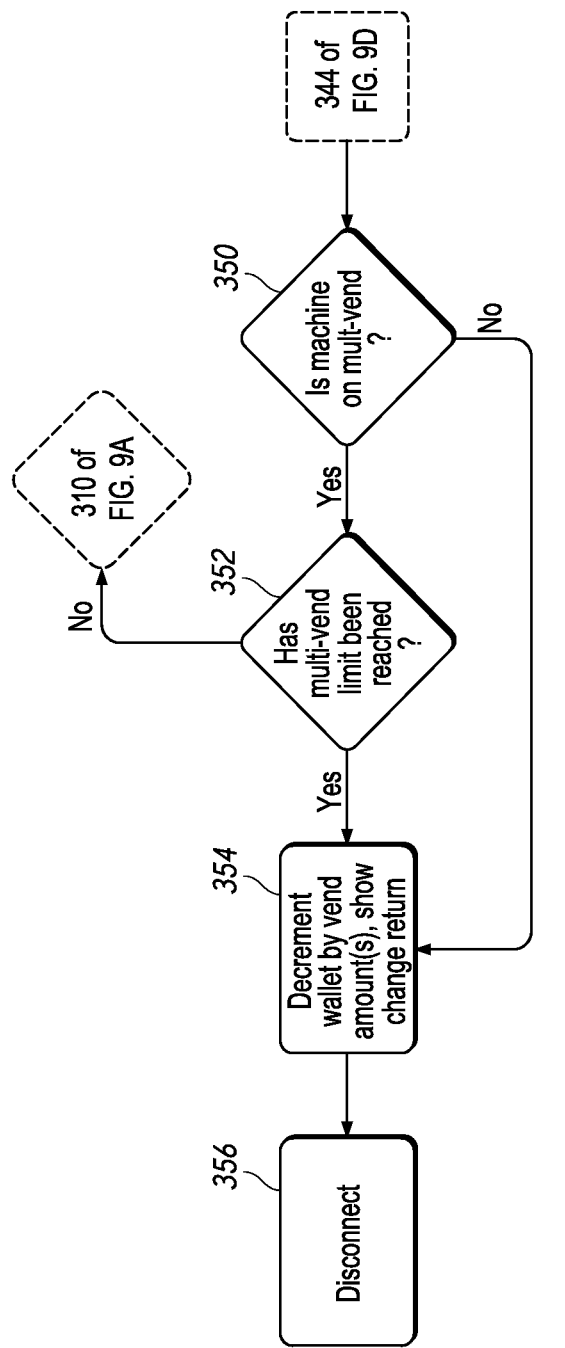
Figure 10A:
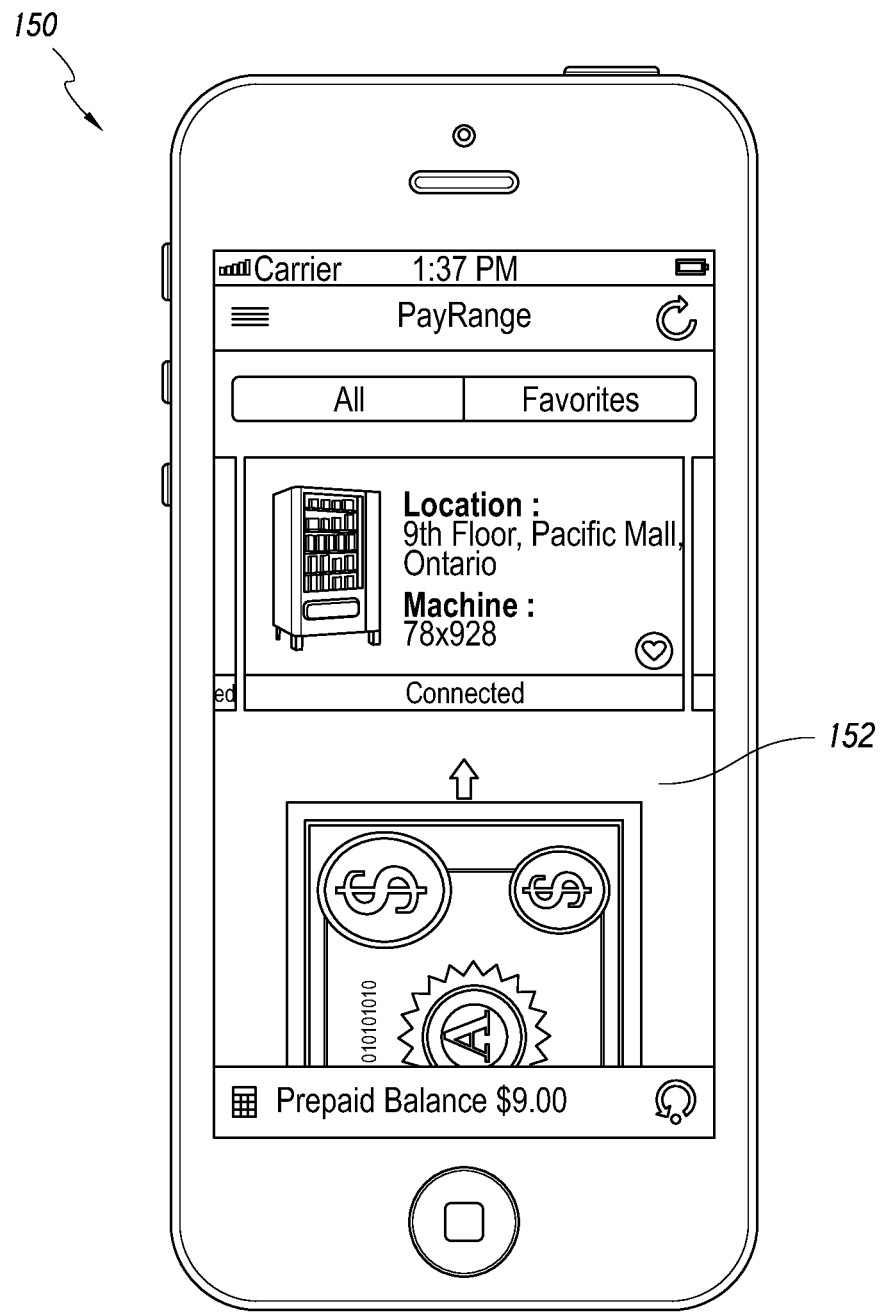
FIGS. 10A-10D show an exemplary mobile device with a graphical representation of an exemplary mobile application shown thereon, the mobile application being used as part of the mobile-device-to-machine payment systems.
Figure 10B:
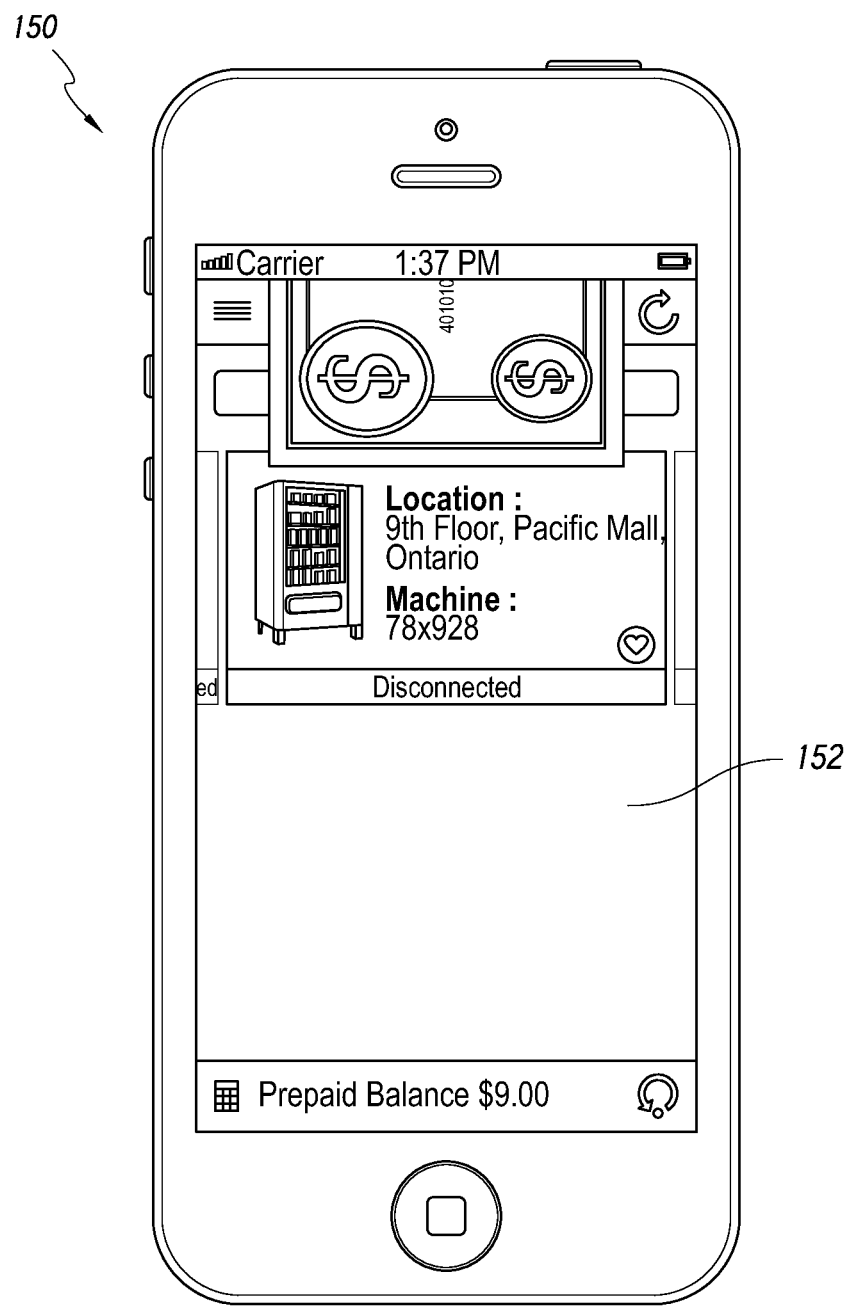
Figure 10C:
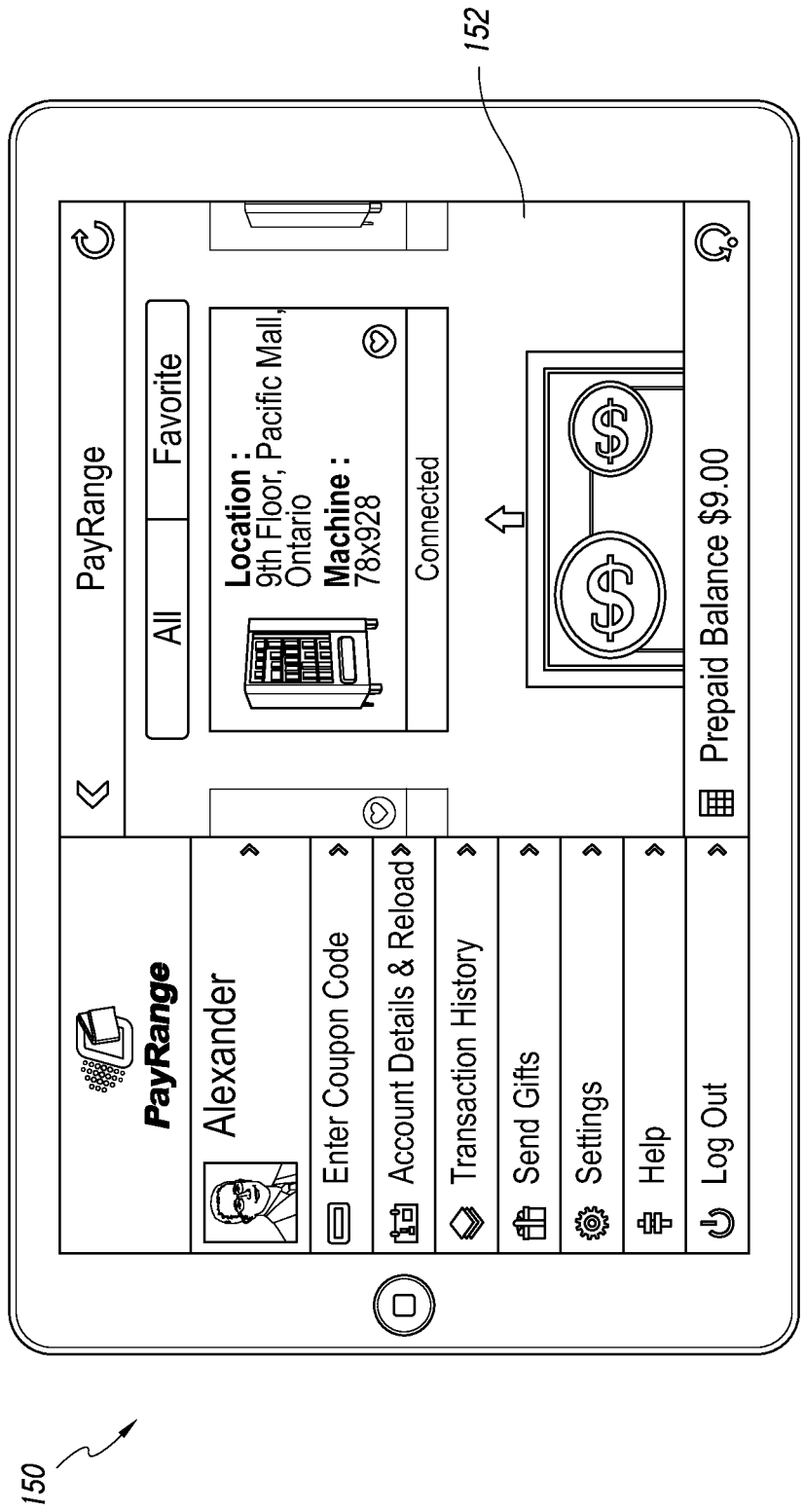
Figure 10D:
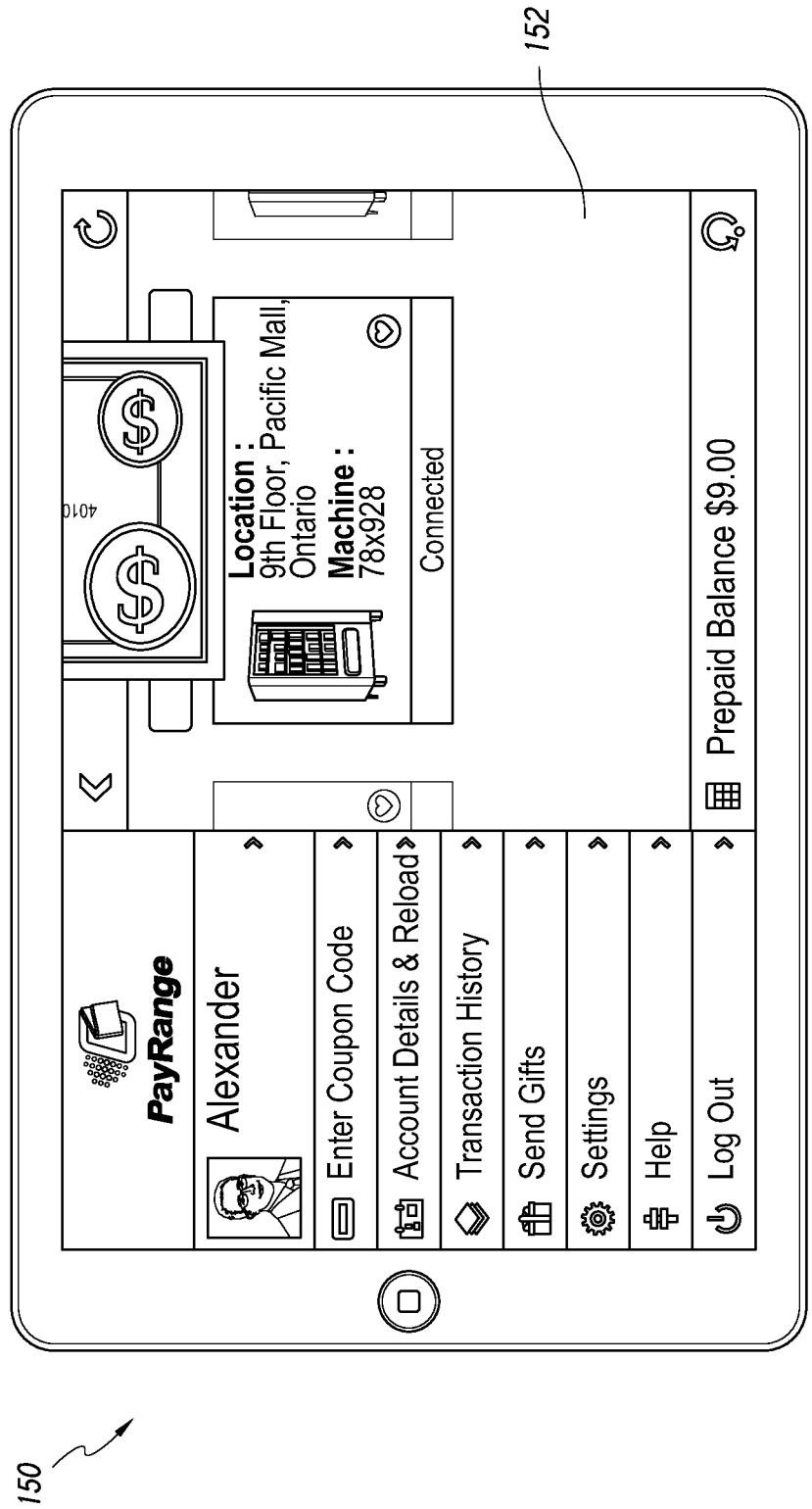

FIGS. 8D and 9E generally show the multi-vend function. If the machine has enabled multi-vend capabilities (block 350) and the multi-vend limit has not been reached, the process returns to the question of whether the user is in the payment zone (block 310 of FIG. 9A). If the machine does not have enabled multi-vend capabilities (block 350) or the multi-vend limit has been reached, the wallet is decremented by the vend amount(s) and "change" is returned to the virtual wallet (block 354) and the process ends (block 356).

Figure 8E:
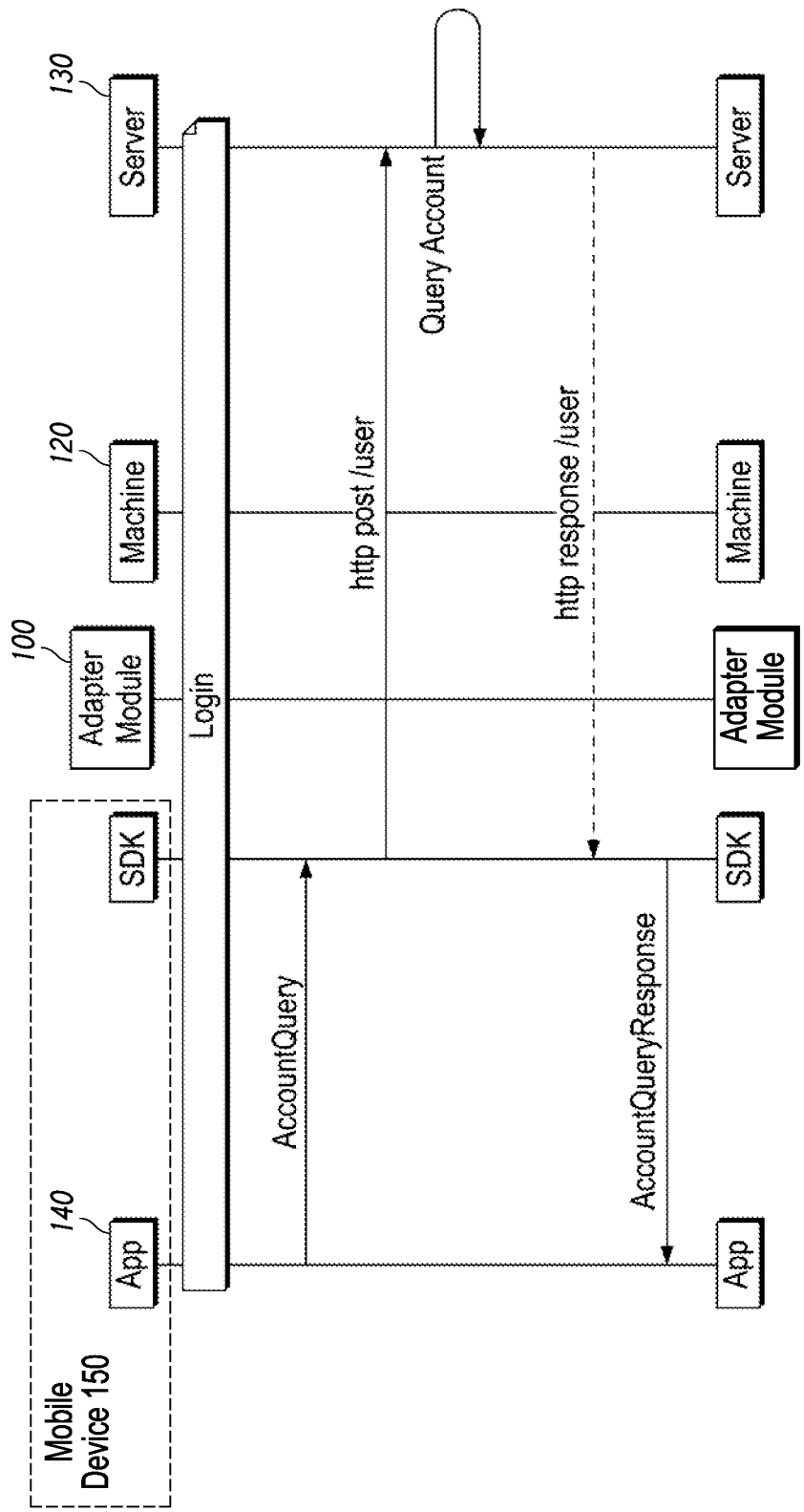
FIG. 8E is a timing schematic diagram that shows additional elements and features of the system including, but not limited to, communications medium, messaging, vending sequence, and purchase flow, in the Login mode.
Figure 8F:
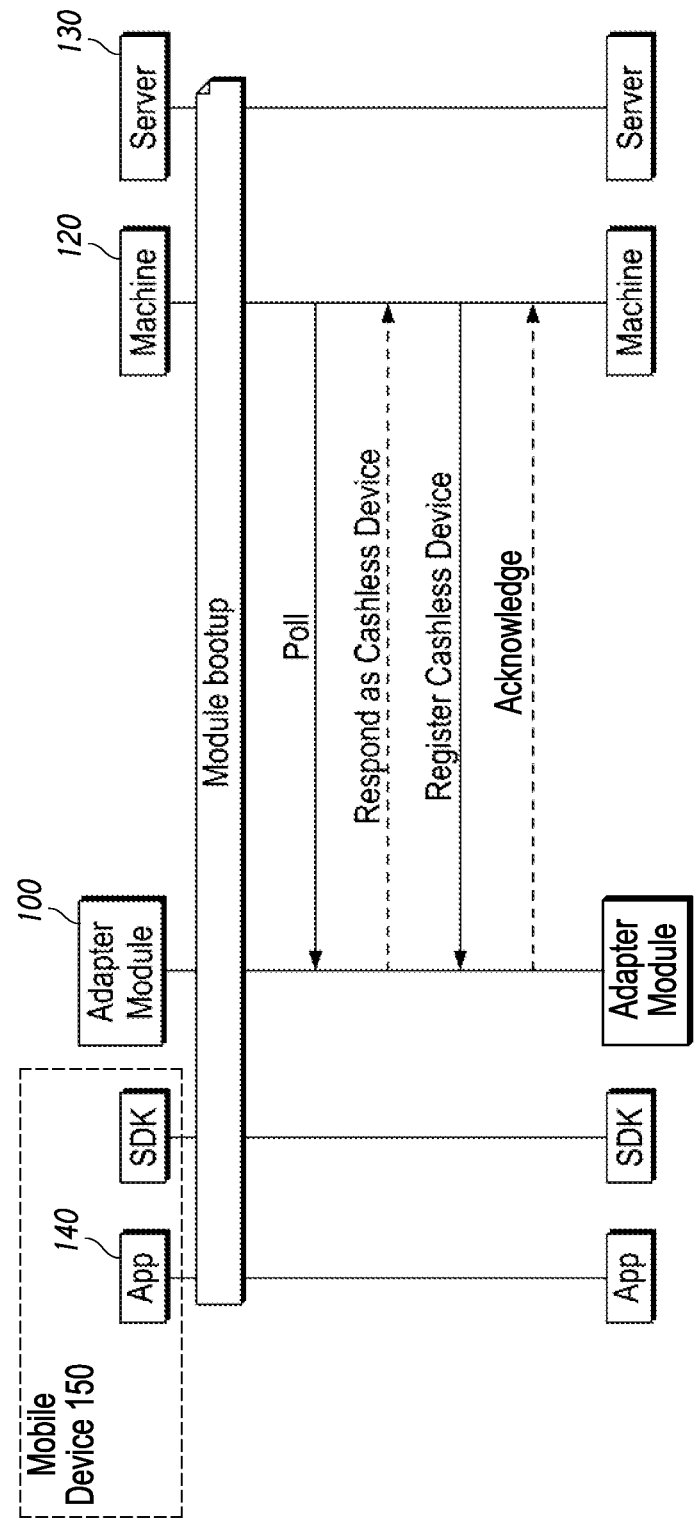
FIG. 8F is a timing schematic diagram that shows additional elements and features of the system including, but not limited to, communications medium, messaging, vending sequence, and purchase flow, during Module bootup.
Figure 8G:
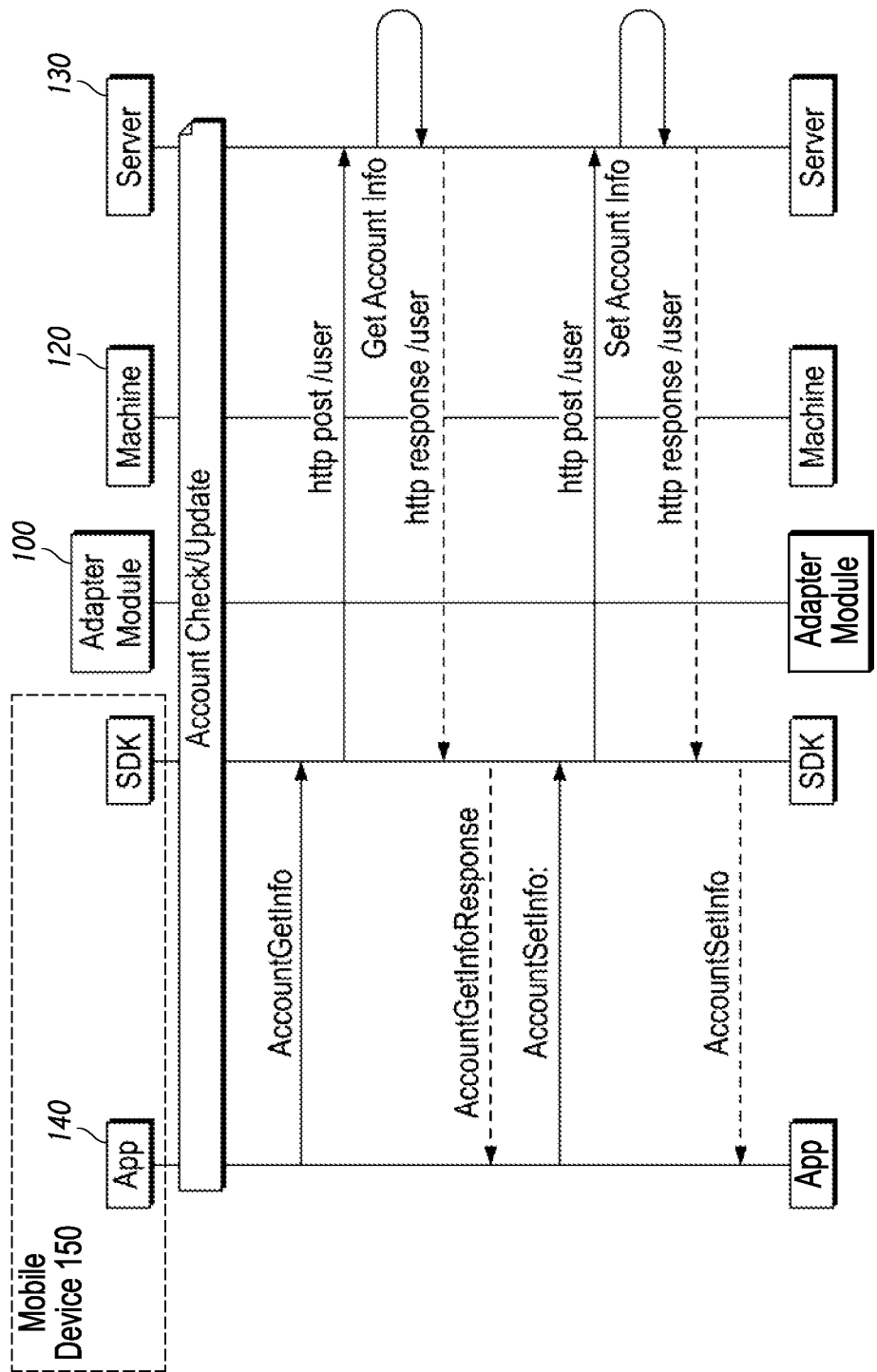
FIG. 8G is a timing schematic diagram that shows additional elements and features of the system including, but not limited to, communications medium, messaging, vending sequence, and purchase flow, during Account Check/Update.

FIG. 8E is a timing schematic showing an exemplary Login process. FIG. 8F is a timing schematic showing an exemplary bootup process. FIG. 8G is a timing schematic showing an exemplary Account Check/Update process.

Several of the figures are flow charts (e.g. FIGS. 9A-9E) illustrating methods and systems. It will be understood that each block of these flow charts, components of all or some of the blocks of these flow charts, and/or combinations of blocks in these flow charts, may be implemented by software (e.g. coding, software, computer program instructions, software programs, subprograms, or other series of computer-executable or processor-executable instructions), by hardware (e.g. processors, memory), by firmware, and/or a combination of these forms. As an example, in the case of software, computer program instructions (computer-readable program code) may be loaded onto a computer to produce a machine, such that the instructions that execute on the computer create structures for implementing the functions specified in the flow chart block or blocks. These computer program instructions may also be stored in a memory that can direct a computer to function in a particular manner, such that the instructions stored in the memory produce an article of manufacture including instruction structures that implement the function specified in the flow chart block or blocks. The computer program instructions may also be loaded onto a computer to cause a series of operational steps to be performed on or by the computer to produce a computer implemented process such that the instructions that execute on the computer provide steps for implementing the functions specified in the flow chart block or blocks. Accordingly, blocks of the flow charts support combinations of steps, structures, and/or modules for performing the specified functions. It will also be understood that each block of the flow charts, and combinations of blocks in the flow charts, may be divided and/or joined with other blocks of the flow charts without affecting the scope of the invention. This may result, for example, in computer-readable program code being stored in whole on a single memory, or various components of computer-readable program code being stored on more than one memory.

Distinction from Known Systems

Many of the known systems and methods require that the payment accepting unit be persistently (continuously) connected to and/or connectable on demand to some sort of remote server in order to function. As an example, the Carlson reference describes a system and a method for using a portable consumer device. Described embodiments include a consumer using the portable consumer device to dial a number to purchase an item (product or service) in a vending machine, to send an SMS to purchase an item in a vending machine, or to use a mobile wallet to purchase an item in a vending machine. It is mentioned in one embodiment that the consumer may launch an application in the portable consumer device or, alternatively, the portable consumer device may automatically detect the vending machine and prompt the consumer to enter information associated with the vending machine. It should be noted, however, that even when there is automatic detection, the user is prompted to enter information (e.g. a machine alias, payment information, or a PIN) and it can be inferred that this is entered on the portable consumer device. Once connected to a payment processing network, the authorization process begins using a payment processing network and/or payment server. Significantly, all of the embodiments described in the Carlson reference specify that the payment server sends an authorization response message to the vending machine. This means that, unlike the mobile-device-to-machine payment systems described herein, a persistent network connection is required for the Carlson system to function. Other references that disclose systems that require a persistent network connection include the Khan reference (the MicroAdapter having the persistent connection), the Garibaldi reference, and the Weiner reference.

Many of the known systems and methods require the user to significantly interact with their mobile devices. As an example, the Whigham reference is directed to a system that eliminates the need for currency for a vending machine and also eliminates the need for a dedicated online connection between the vending machine and the issuer of a credit card or a debit card. Instead the Whigham system and method allows a consumer to purchase a product from an automatic vending machine by using the consumer's cellular telephone, personal digital assistant (PDA), or similar wireless communication device as a link between the provider of the products in the vending machine and the vending machine. The Whigham reference, however, sets forth a system and method requires significant interaction between the consumer and his telephone including dialing a telephone number to a server (that, in turn, provides a vend code to the consumer), requesting a specific product (e.g. by dialing additional digits, although this step is optional if a unique number was dialed for a specific product), and transmitting a vend code to the vending machine. (Other references that disclose systems that require user interaction with the phone include the Offer reference, the Khan reference, the Belfer reference, and the Carlson reference.) In addition to other differences, some of the mobile-device-to-machine payment systems described herein do not require the user to interact with his mobile device at all, which can be contrasted to known systems and methods that require the consumer to, for example, dial a telephone number, enter a machine identification, and/or enter a product identifier using the mobile device to purchase a product.

In some implementations, the authorization grant token 1140 further includes the authorization code 1104 that was included in the authorization request 1130. In some implementations, when the authorization code 1104 is the hash value, the server 130 encrypts the authorization grant token 1140 including the hashed value with the shared secret encryption key associated with payment module 100. Subsequently, when mobile device 150 sends the authorization grant token 1140 to payment module 100 after detecting a trigger condition, the payment module 100 decrypts the authorization grant token 1140 using the secret key known only to server 130 and payment module 100 (which authenticates the message and the authorization grant), and then matches the hash value included in the decrypted authorization grant token 1140 to previously broadcast valid (unexpired) hash values (i.e., auth codes) to determine validity of the hash value (which was known only by payment module 100).

Miscellaneous

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not.

All references (including, but not limited to, foreign and/or domestic publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A method of payment processing, the method comprising:

at a mobile device with one or more processors, memory, and a communications unit:

identifying a vending machine based at least in part on a transmission received from a payment module of the vending machine;

initiating pre-authorization for a cashless vending transaction with the vending machine by sending a first communication via the communications unit of the mobile device to the payment module;

in response to sending the first communication, obtaining, from the payment module, an authorization request via the communications unit of the mobile device;

sending, to a server, the authorization request via the communications unit of the mobile device;

in response to sending the authorization request, obtaining, from the server, authorization information via the communications unit of the mobile device, the authorization information including information identifying an authorized amount for use in conjunction with the cashless vending transaction with the vending machine, the authorization information being associated with a predetermined time period within which the authorized amount is valid for use; and after obtaining the authorization information, detecting a trigger condition to perform the cashless vending transaction with the vending machine; and in response to detecting the trigger condition, determining whether the authorized amount is available for use, including determining based at least in part on the predetermined time period whether the authorized amount is available for use;

in accordance with a determination that the authorized amount is available for use, sending, to the payment module, the information identifying the authorized amount to enable completion of the cashless vending transaction at the vending machine.

2. The method of claim 1,
wherein the transmission at least includes authorization zone threshold criterion; and
after receiving the transmission, initiating a handshake process with the payment module, wherein the handshake process includes:
sending, to the payment module, device information at least including user identification information corresponding to the user of the mobile device via the first transceiver; and
receiving, from the payment module, payment module information, wherein the payment module information at least includes an identifier corresponding to the payment module.

3. The method of claim 2, wherein the sending the first communication comprises:
in accordance with a determination that the authorization zone threshold criterion is satisfied, sending the first communication to the payment module via the first transceiver, wherein the first communication indicates that the authorization zone threshold criterion is satisfied; and
wherein the device obtains the authorization request in response to sending the first communication.

4. The method of claim 2, wherein the payment module information further includes an indication that hands-free mode is available and payment zone threshold criterion.

5. The method of claim 4, wherein the device information further includes device identification information corresponding to a model type of the mobile device; and
wherein the payment zone threshold criterion is based at least in part on the device identification information.

6. The method of claim 4, wherein detecting the trigger condition comprises:
determining whether the payment zone threshold criterion is satisfied; and in accordance with a determination that the payment zone threshold criterion is satisfied, detecting the trigger condition without interaction from a user of the mobile device.

7. The method of claim 1, wherein detecting the trigger condition comprises:
detecting a user input from a user of the mobile device; and
in response to detecting the user input, detecting the trigger condition to perform the cashless vending transaction with the vending machine.

8. The method of claim 1, further comprising:
in response to obtaining the authorization information, presenting a notification to a user of the mobile device that a connection has been established with the payment module.

9. The method of claim 8, wherein the notification further indicates an authorized amount for the transaction.

10. The method of claim 1, wherein the authorization information includes an identifier corresponding to the payment module, an identifier corresponding to the user of the mobile device, an authorized amount, an authorization grant token, and an expiration period for the authorization grant token.

11. The method of claim 10, wherein at least a portion of the authorization request and the authorization grant token are encrypted with a unique encryption key corresponding to the payment module.

12. The method of claim 1, wherein:
the mobile device includes a touch-sensitive display, and
detecting the trigger condition includes detecting a swipe gesture from a user at the touch-sensitive display of the mobile device.

13. The method of claim 12, wherein:
the swipe gesture is performed by the user over a user interface object that is displayed on the touch-sensitive display of the mobile device, and
the user interface object is specific to the vending machine.

14. A device, comprising:
a first transceiver corresponding to a short-range communication mode, and a second transceiver, distinct from the first transceiver, corresponding to a long-range communication mode distinct from the short-range communication mode;
one or more processors; and
memory storing one or more programs to be executed by the one or more processors, the one or more programs comprising instructions for:
identifying a vending machine based at least in part on a transmission received from a payment module of the vending machine;
initiating pre-authorization for a cashless vending transaction with the vending machine by sending a first communication via the communications unit of the mobile device to the payment module;
in response to sending the first communication, obtaining, from a payment module, an authorization request via the communications unit of the mobile device;
sending, to a server, the authorization request via the communications unit of the mobile device;
in response to sending the authorization request, obtaining, from the server, authorization information via the communications unit of the mobile device, the authorization information including information identifying an authorized amount for use in conjunction with the cashless vending transaction with the vending machine, the authorization information being associated with a predetermined time period within which the authorized amount is valid for use; and after obtaining the authorization information, detecting a trigger condition to perform the cashless vending transaction with the vending machine; and in response to detecting the trigger condition, determining whether the authorized amount is available for use, including determining based at least on the predetermined time period whether the authorized amount is available for use;

in accordance with a determination that the authorized amount is available for use, sending, to the payment module, the information identifying the authorized amount to enable completion of the cashless vending transaction at the vending machine.

15. The device of claim 14, wherein the transmission at least includes authorization zone threshold criterion; and after receiving the transmission, initiating a handshake process with the payment module, wherein the handshake process includes:

sending, to the payment module, device information at least including user identification information corresponding to the user of the mobile device via the first transceiver; and receiving, from the payment module, payment module information, wherein the payment module information at least includes an identifier corresponding to the payment module.

16. The device of claim 15, wherein the sending the first communication comprises:

in accordance with a determination that the authorization zone threshold criterion is satisfied, sending the first communication to the payment module via the first transceiver, wherein the first communication indicates that the authorization zone threshold criterion is satisfied; and wherein the mobile device obtains the authorization request in response to sending the first communication.

17. The device of claim 15, wherein the payment module information further includes an indication that hands-free mode is available and payment zone threshold criterion.

18. The device of claim 17, wherein the device information further includes device identification information corresponding to a model type of the mobile device; and wherein the payment zone threshold criterion is based at least in part on the device identification information.

19. The device of claim 17, wherein detecting the trigger condition comprises:

determining whether the payment zone threshold criterion is satisfied; and in accordance with a determination that the payment zone threshold criterion is satisfied, detecting the trigger condition without user input from a user at the mobile device.

20. The device of claim 14, wherein detecting the trigger condition comprises:

detecting a user input from a user of the mobile device; and in response to detecting the user input, detecting the trigger condition to perform the cashless vending transaction with the vending machine.

21. A non-transitory computer readable storage medium storing one or more programs, the one or more programs comprising instructions, which, when executed by a device with one or more processors and a first transceiver corresponding to a short-range communication mode, and a second transceiver, distinct from the first transceiver, corresponding to a long-range communication mode distinct from the short-range communication mode, cause the device to perform operations comprising:

identifying a vending machine based at least in part on a transmission received from a payment module of the vending machine;

initiating pre-authorization for a cashless vending transaction with the vending machine by sending a first communication via the communications unit of the mobile device to the payment module;

in response to sending the first communication, obtaining, from the payment module, an authorization request via the communications unit of the mobile device;

sending, to a server, the authorization request via the communications unit of the mobile device;

in response to sending the authorization request, obtaining, from the server, authorization information via the communications unit of the mobile device, the authorization information including information identifying an authorized amount for use in conjunction with the cashless vending transaction with the vending machine, the authorization information being associated with a predetermined time period within which the authorized amount is valid for use; and after obtaining the authorization information, detecting a trigger condition to perform the cashless vending transaction with the vending machine; and in response to detecting the trigger condition, determining whether the authorized amount is available for use, including determining based at least in part on the predetermined time period whether the authorized amount is available for use;

in accordance with a determination that the authorized amount is available for use, sending, to the payment module, the information identifying the authorized amount to enable completion of the cashless vending transaction at the vending machine.

22. The non-transitory computer readable storage medium of claim 21, wherein the transmission at least includes authorization zone threshold criterion; and after receiving the transmission, initiating a handshake process with the payment module, wherein the handshake process includes:

sending, to the payment module, device information at least including user identification information corresponding to the user of the mobile device via the first transceiver; and receiving, from the payment module, payment module information, wherein the payment module information at least includes an identifier corresponding to the payment module.

23. The non-transitory computer readable storage medium of claim 22, wherein the sending the first communication comprises:

in accordance with a determination that the authorization zone threshold criterion is satisfied, sending the first communication to the payment module via the first transceiver, wherein the first communication indicates that the authorization zone threshold criterion is satisfied; and wherein the mobile device obtains the authorization request in response to sending the first communication.

24. The non-transitory computer readable storage medium of claim 22, wherein the payment module information further includes an indication that hands-free mode is available and payment zone threshold criterion.

25. The non-transitory computer readable storage medium of claim 24, wherein the device information further includes device identification information corresponding to a model type of the mobile device; and
   wherein the payment zone threshold criterion is based at least in part on the device identification information.

26. The non-transitory computer readable storage medium of claim 24, wherein detecting the trigger condition comprises:
   determining whether the payment zone threshold criterion is satisfied; and
   in accordance with a determination that the payment zone threshold criterion is satisfied, detecting the trigger condition without user input from a user at the mobile device.

27. The non-transitory computer readable storage medium of claim 21, wherein detecting the trigger condition comprises:
   detecting a user input from a user of the mobile device; and
   in response to detecting the user input, detecting the trigger condition to perform the cashless vending transaction with the vending machine.

\* \* \* \* \*

UNITED STATES PATENT AND TRADEMARK OFFICE
CERTIFICATE OF CORRECTION

PATENT NO. : 9,547,859 B2  
APPLICATION NO. : 14/335762  
DATED : January 17, 2017  
INVENTOR(S) : Patel et al.

Page 1 of 1

It is certified that error appears in the above-identified patent and that said Letters Patent is hereby corrected as shown below:

In the Claims

Claim 6, Column 34, Line 3, please delete "without interaction from a user of the" and insert --without user input from a user at the--;

Claim 9, Column 34, Line 18, please delete "indicates an authorized" and insert --indicates the authorized--;

Claim 14, Column 34, Line 58, please delete "from a payment" and insert --from the payment--.

Signed and Sealed this  
Fourth Day of April, 2017

Michelle K. Lee  
*Director of the United States Patent and Trademark Office*